US008914389B2

(12) United States Patent
Nagasaka

(10) Patent No.: US 8,914,389 B2
(45) Date of Patent: Dec. 16, 2014

(54) INFORMATION PROCESSING DEVICE, INFORMATION PROCESSING METHOD, AND PROGRAM

(75) Inventor: Hideo Nagasaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 641 days.

(21) Appl. No.: 12/476,653

(22) Filed: Jun. 2, 2009

(65) Prior Publication Data
US 2009/0300036 A1 Dec. 3, 2009

(30) Foreign Application Priority Data

Jun. 3, 2008 (JP) .................................. 2008-146008

(51) Int. Cl.
G06F 17/30 (2006.01)
G11B 27/034 (2006.01)
G11B 27/10 (2006.01)
G11B 27/32 (2006.01)

(52) U.S. Cl.
CPC ........ *G06F 17/30038* (2013.01); *G11B 27/034* (2013.01); *G11B 27/105* (2013.01); *G11B 27/322* (2013.01); *Y10S 707/914* (2013.01)
USPC .......................................... 707/758; 707/914

(58) Field of Classification Search
None
See application file for complete search history.

(56) References Cited

U.S. PATENT DOCUMENTS

| 5,521,841 A | | 5/1996 | Arman et al. | |
|---|---|---|---|---|
| 5,875,446 A | * | 2/1999 | Brown et al. | 1/1 |
| 6,704,729 B1 | * | 3/2004 | Klein et al. | 1/1 |
| 6,738,759 B1 | * | 5/2004 | Wheeler et al. | 707/741 |
| 7,043,488 B1 | | 5/2006 | Baer et al. | |
| 7,716,572 B2 | | 5/2010 | Beauregard et al. | |
| 7,805,129 B1 | | 9/2010 | Issa et al. | |
| 8,189,685 B1 | * | 5/2012 | Choudhry et al. | 375/240.26 |
| 8,495,099 B2 | * | 7/2013 | Maim | 707/794 |
| 2002/0101518 A1 | | 8/2002 | Suda | |

(Continued)

FOREIGN PATENT DOCUMENTS

EP 1 434 435 A1 6/2004
EP 1 708 200 A1 10/2006

(Continued)

OTHER PUBLICATIONS

Gyongyi et al. Web Spam Taxonomy http://www.itleadership.org/sites/www.itleadership.org/files/gyongyi.pdf published 2005.*

(Continued)

*Primary Examiner* — Kevin L Young
(74) *Attorney, Agent, or Firm* — Wolf, Greenfield & Sacks, P.C.

(57) ABSTRACT

An information processing device includes: a subsidiary content storage unit configured to store and manage a subsidiary content which is created by editing processing secondarily using at least one content as editing material and which includes a main unit portion which is data for reproducing the actual content of the subsidiary content, and directly used content information which is added information, indicating what the directly used content, which is a content directly secondarily used at the time of creating the subsidiary content, is; and an importance setting unit configured to set importance based on secondary usage state of the directly used content regarding which importance is to be set, by other subsidiary contents, by using the directly used content information, so as to set importance regarding at least subsidiary contents stored and managed by the subsidiary content storage unit.

24 Claims, 36 Drawing Sheets

(56) References Cited

U.S. PATENT DOCUMENTS

| | | |
|---|---|---|
| 2004/0068505 A1 | 4/2004 | Lee et al. |
| 2004/0073924 A1 | 4/2004 | Pendakur |
| 2005/0120371 A1 | 6/2005 | Kimura et al. |
| 2005/0276571 A1 | 12/2005 | Miyajima et al. |
| 2006/0008256 A1 | 1/2006 | Khedouri et al. |
| 2006/0047678 A1 | 3/2006 | Miyazaki et al. |
| 2006/0080178 A1 | 4/2006 | Lee |
| 2006/0080356 A1 | 4/2006 | Burges et al. |
| 2006/0143236 A1 | 6/2006 | Wu |
| 2006/0195480 A1 | 8/2006 | Spiegelman et al. |
| 2006/0233063 A1 | 10/2006 | Inoue et al. |
| 2007/0156594 A1 | 7/2007 | McGucken |
| 2007/0276821 A1 | 11/2007 | Aravamudan et al. |
| 2007/0297755 A1* | 12/2007 | Holt et al. .................. 386/52 |
| 2008/0027796 A1 | 1/2008 | Chaves |
| 2008/0089657 A1 | 4/2008 | Shibata et al. |
| 2008/0091717 A1 | 4/2008 | Garbow et al. |
| 2008/0120325 A1* | 5/2008 | Davis .................. 707/102 |
| 2008/0120501 A1 | 5/2008 | Jannink et al. |
| 2008/0147608 A1* | 6/2008 | Sarukkai .................. 707/3 |
| 2008/0147711 A1 | 6/2008 | Spiegelman et al. |
| 2008/0183794 A1 | 7/2008 | Georgis et al. |
| 2008/0190271 A1 | 8/2008 | Taub et al. |
| 2008/0208823 A1 | 8/2008 | Hicken |
| 2008/0222295 A1 | 9/2008 | Robinson et al. |
| 2008/0235268 A1 | 9/2008 | Miyoshi et al. |
| 2008/0235356 A1 | 9/2008 | Miyoshi et al. |
| 2008/0257134 A1 | 10/2008 | Oppenheimer |
| 2008/0259745 A1 | 10/2008 | Miyajima et al. |
| 2008/0270532 A1 | 10/2008 | Billmaier et al. |
| 2008/0301173 A1 | 12/2008 | Ryu et al. |
| 2008/0304807 A1* | 12/2008 | Johnson et al. ............ 386/52 |
| 2008/0310267 A1 | 12/2008 | Hattori et al. |
| 2009/0018915 A1 | 1/2009 | Fisse |
| 2009/0106261 A1 | 4/2009 | Nagasaka et al. |
| 2009/0119273 A1 | 5/2009 | Nagasaka et al. |
| 2009/0150947 A1 | 6/2009 | Soderstrom |
| 2009/0164378 A1 | 6/2009 | West et al. |
| 2009/0183210 A1* | 7/2009 | Andrade .................. 725/87 |
| 2009/0187829 A1 | 7/2009 | Brownholtz et al. |
| 2009/0204594 A1 | 8/2009 | Akkiraju et al. |
| 2009/0292376 A1 | 11/2009 | Kazem et al. |
| 2009/0292685 A1* | 11/2009 | Liu et al. .................. 707/5 |
| 2009/0297128 A1 | 12/2009 | Nagasaka et al. |
| 2009/0299823 A1 | 12/2009 | Nagasaka et al. |
| 2009/0299981 A1 | 12/2009 | Nagasaka et al. |
| 2010/0031366 A1 | 2/2010 | Knight et al. |
| 2010/0267331 A1 | 10/2010 | Ingrassia et al. |

FOREIGN PATENT DOCUMENTS

| | | |
|---|---|---|
| EP | 1 818 930 A1 | 8/2007 |
| EP | 1 959 427 A1 | 8/2008 |
| EP | 1973304 A1 | 9/2008 |
| GB | 2 455 392 A | 6/2009 |
| JP | 2000-113066 A | 4/2000 |
| JP | 2000-349725 A | 12/2000 |
| JP | 2002-109102 A | 4/2002 |
| JP | 2003-250136 A | 9/2003 |
| JP | 2004-072502 | 3/2004 |
| JP | 2004-206679 A | 7/2004 |
| JP | 2004-264898 A | 9/2004 |
| JP | 2004-355070 A | 12/2004 |
| JP | 2005-339732 A | 12/2005 |
| JP | 2006-050469 A | 2/2006 |
| JP | 2006-518888 A | 8/2006 |
| JP | 2006-313537 A | 11/2006 |
| JP | 2007-172523 A | 7/2007 |
| WO | WO 2007/066813 A1 | 6/2007 |
| WO | WO 2008/008563 A2 | 1/2008 |
| WO | WO 2008/137289 A2 | 11/2008 |
| WO | WO 2009/006054 A2 | 1/2009 |

OTHER PUBLICATIONS

Recommends videos based on relationships between the tiers.
McDonald et al. A comparison of Score, Rank and Probability-Based Fusion Methods for Video Shot Retrieval, 2005 Springer.*
[No Author Listed], Mixmatcher help. Mixmatcher.com. Retrieved Jul. 24, 2006 from http://web.archive.org//web/20041013054115/http://www.mixmatcher.com/help.asp. Oct. 13, 2004. 2 pages. XP002391688.
[No Author Listed], Siren systems—soundflavor engine. Siren Systems, Inc. Retrieved Jul. 24, 2006 from http://web.archive.org/web/2041024002734/http://www.sirensystems.com/sf-engine-2.html. Oct. 24, 2004. 1 page. XP002391687.
Ito et al., SmartCourier: an annotation system for adaptive information sharing. Transactions of the Japanese Society for Artificial Intelligence. May 1, 2002;17(3):301-12.
Miura et al., Web contents evolution based on the behavior of visitors. Technical Report of IEICE. The Institute of Electronics Information Communication Engineers. Mar. 21, 2001;100(713):23-8.
Wikipedia Online Definition, "MASHUPS (music)", Jul. 9, 2011, http://en.wikipedia.org/wiki/Mashup_(music), p. 1.
Yamamoto et al., A video annotation system based on community activities. Transactions of the Information Processing Society of Japan. Dec. 2007;48(12):3624-3636.
Yasukawa et al., A personal archiving system for collection and reuse of web contents. Transaction of the Information Processing Society of Japan. Jan. 24, 2003;2003(5):139-46.

* cited by examiner

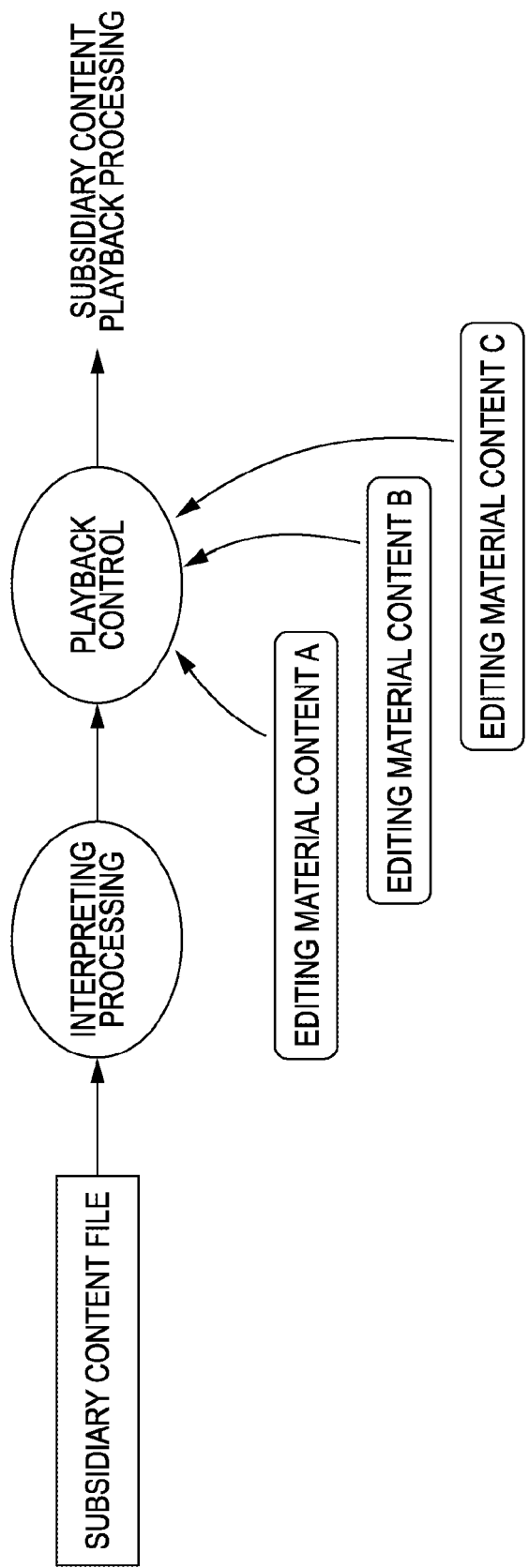

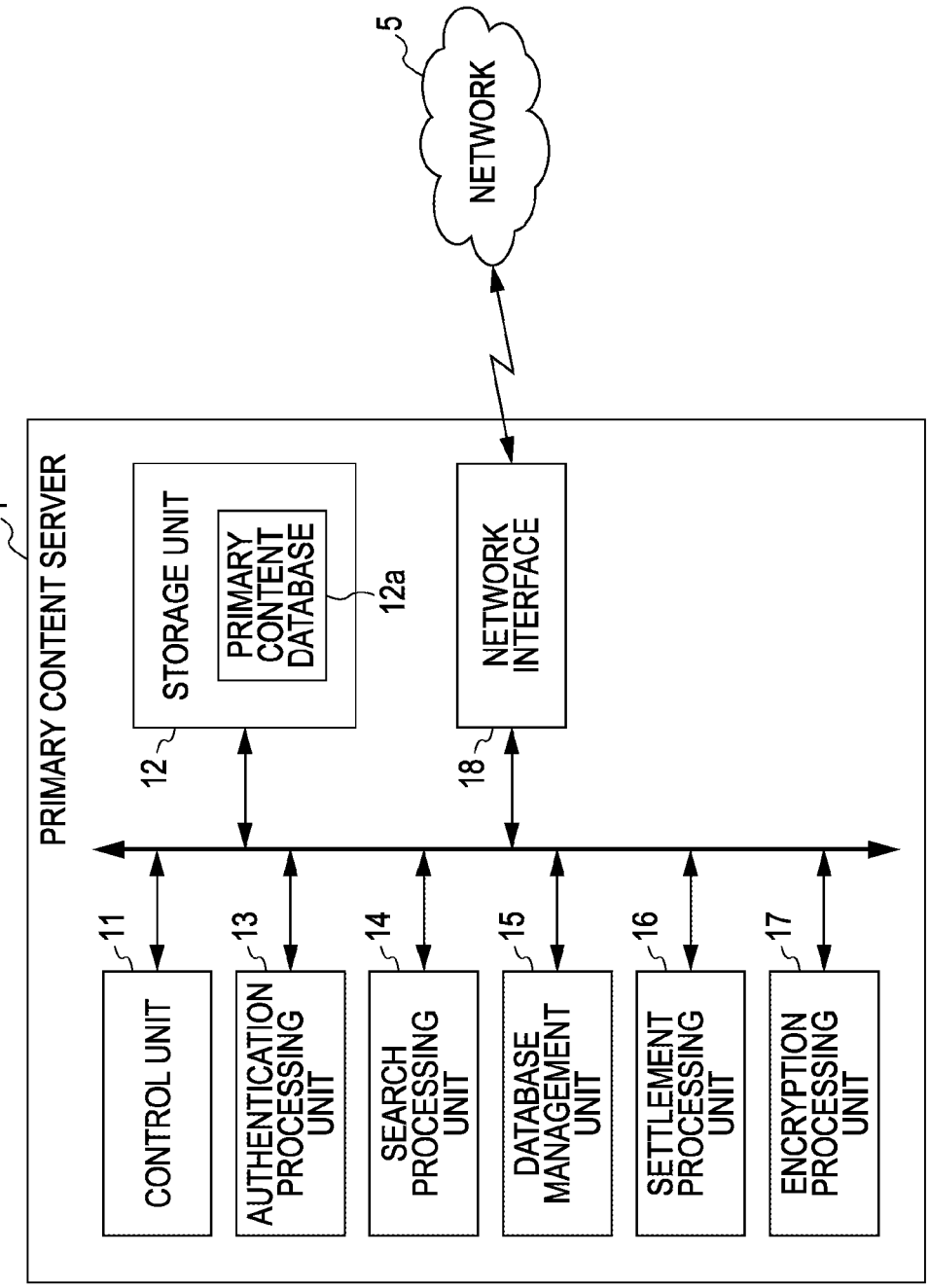

FIG. 16

| | | CONTENT ID | AAAAAA |
|---|---|---|---|
| UNIT FILE INFORMATION | | CREATOR | - - - - |
| | | TITLE | - - - - |
| | | GENERATION | (1 TO N) |
| | USAGE AGREEMENT RANGE INFORMATION | USAGE ITEM 1 | PERMITTED |
| | | USAGE ITEM 2 | NOT PERMITTED |
| | | ⋮ | ⋮ |
| | | USAGE ITEM n | PERMITTED |
| UNIT FILE INFORMATION | | CONTENT ID | BBBBBB |
| | | CREATOR | - - - - |
| | | TITLE | - - - - |
| | | GENERATION | (1 TO N) |
| | USAGE AGREEMENT RANGE INFORMATION | USAGE ITEM 1 | PERMITTED |
| | | USAGE ITEM 2 | USAGE PERMITTED FOR ONE GENERATION ONLY |
| | | ⋮ | ⋮ |
| | | USAGE ITEM n | NOT PERMITTED |
| UNIT FILE INFORMATION | | CONTENT ID | CCCCCC |
| | | CREATOR | - - - - |
| | | TITLE | - - - - |
| | | GENERATION | (1 TO N) |
| | USAGE AGREEMENT RANGE INFORMATION | USAGE ITEM 1 | NOT PERMITTED |
| | | USAGE ITEM 2 | PERMITTED |
| | | ⋮ | ⋮ |
| | | USAGE ITEM n | PERMITTED |

FIG. 17

[
file_id = AAAAAA
time = 00:00 - 00:10
position = vv - zz
]
[
file_id = AAAAAA
time = 00:10 - 00:15
position = ss - tt
]
[
file_id = BBBBBB
time = 00:15 - 00:20
position = pp - uu
]

| SUBSIDIARY CONTENT ID | EVALUATION VALUE (NUMBER OF DIRECT CHILDREN) |
|---|---|
| α1 | 1 |
| α2 | 1 |
| β1 | 4 |
| γ1 | 0 |
| γ2 | 0 |
| γ3 | 0 |
| γ4 | 0 |

FIG. 29

| SUBSIDIARY CONTENT ID | EVALUATION VALUE (NUMBER OF OFFSPRING) |
|---|---|
| α1 | 1 |
| α2 | 5 |
| β1 | 4 |
| γ1 | 0 |
| γ2 | 0 |
| γ3 | 0 |
| γ4 | 0 |

FIG. 30

| SUBSIDIARY CONTENT ID | EVALUATION VALUE (NUMBER OF DIRECT CHILDREN) | EVALUATION VALUE (NUMBER OF OFFSPRING) |
|---|---|---|
| α1 | 1 | 1 |
| α2 | 1 | 5 |
| β1 | 4 | 4 |
| γ1 | 0 | 0 |
| γ2 | 0 | 0 |
| γ3 | 0 | 0 |
| γ4 | 0 | 0 |

FIG. 33

| SUBSIDIARY CONTENT ID | EVALUATION VALUE (NUMBER OF DIRECT CHILDREN) |
|---|---|
| α1 | 1 |
| α2 | 1 |
| β1 | 3 |
| γ1 | 0 |
| γ2 | 0 |
| γ3 | 0 |
| γ4 | 0 |

FIG. 34

| SUBSIDIARY CONTENT ID | EVALUATION VALUE (NUMBER OF OFFSPRING) |
|---|---|
| α1 | 1 |
| α2 | 3 |
| β1 | 3 |
| γ1 | 0 |
| γ2 | 0 |
| γ3 | 0 |
| γ4 | 0 |

FIG. 37

| CONTENT ID |
| TOTAL NUMBER OF DOWNLOADS |
| TOTAL RATE |
| TOTAL NUMBER OF TIMES PLAYED |
| DATE-AND-TIME OF UPLOAD |

TOTAL NUMBER OF DOWNLOADS, TOTAL RATE, TOTAL NUMBER OF TIMES PLAYED } TOTAL USAGE INFORMATION

FIG. 38

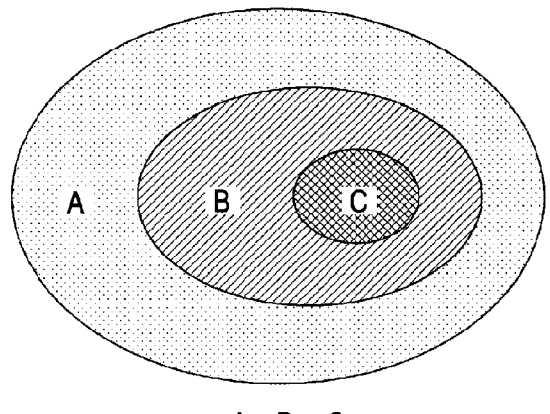

A ⊃ B ⊃ C

A  ALL SUBSIDIARY CONTENTS STORED IN THE SUBSIDIARY CONTENT SERVER
B  SUBSIDIARY CONTENTS OF WHICH AT LEAST ONE OF THE USED SOURCE EDITING MATERIALS IS A HELD PRIMARY CONTENT
C  SUBSIDIARY CONTENTS OF WHICH ALL OF THE USED SOURCE EDITING MATERIALS ARE HELD PRIMARY CONTENTS

INFORMATION PROCESSING DEVICE, INFORMATION PROCESSING METHOD, AND PROGRAM

CROSS REFERENCE TO RELATED APPLICATIONS

The present application claims priority under 35 U.S.C. §119 to Japanese Patent Application no. JP 2008-146008, filed in the Japan Patent Office on Jun. 3, 2008, the entire contents of which are incorporated herein by reference.

BACKGROUND OF THE INVENTION

1. Field of the Invention

The present invention relates to, for example, an information processing device used in creating contents, and sharing of the created contents, over a network, and to a method thereof. The present invention also relates to a program which the information processing device executes.

2. Description of the Related Art

As for one form of network usage, so-called content distribution and sharing of audio, video, and so forth, has widely come to be performed. For example, with a content distribution system, a great number of data files serving as contents to be distributed are saved and managed at a server. A user having an information processing terminal device such as a personal computer operates application software (client software) having a client function corresponding to content distribution, so as to download the desired content from the server. The data file serving as content that has been downloaded in this way is normally managed by being stored and saved in a storage device within the information processing terminal device by the client software. Subsequently, the user can listen to/view and enjoy this as sound and/or video, by performing an operation at the client software for playing the data file serving as the content stored in the information processing terminal device.

Also, with a content sharing system, a user of an information processing terminal, for example, uploads to a server data files serving as contents such as audio, video, and so forth. A server of such a sharing system has a site (Web page) for posting uploaded contents. A user of a general information processing terminal device can access this site and search for contents he/she is interested in, for example. Contents found by this searching are accessed and played, so as to be viewed/listened to, and thus are shared.

On the other hand, there is application software (editing software) capable of taking in audio data and video data and the like as material, so as to be modified, edited, and a new tune can be created, and in recent years in particular, there is widespread use thereof, from that which is easy to operate to complicated, by also common users as well.

As described above, such editing software can execute processing for changing actual data (audio/video data and so forth) serving as contents, for editing thereof. Accordingly, in the case of audio for example, modifying and editing or the like by taking in a part of an already-existing tune as material, such with as so-called sampling, mash-ups, and so forth, can be easily performed. In fact, many tunes created by such techniques have been released by professional musicians or the like, for example. Description of such related art can be found in Japanese Unexamined Patent Application Publication No. 2000-113066 and Japanese Unexamined Patent Application Publication No. 2004-72502.

SUMMARY OF THE INVENTION

With a background such as described above, it can be thought that there would be a considerable number of common users who desire not only to simply play and enjoy the data of contents which can be obtained by content distribution and content sharing and so forth, but also creating new works by performing secondary editing using editing software, and publicly presenting (posting) the work.

Accordingly, the present invention proposes configuring a content sharing system on a network whereby general users for example can perform secondary use of contents held at the user terminal side and perform editing to create subsidiary contents, and can publicly present contents created in this way, by way of a server or the like. Thus, with this content sharing system, subsidiary contents existing on the network will be managed for content sharing. Enabling setting of the importance of each subsidiary content as one way of such managing would enable better service of the content sharing system, which would be advantageous.

An information processing device according to an embodiment of the present invention includes: a subsidiary content storage unit configured to store and manage a subsidiary content which is created by editing processing secondarily using at least one content as editing material, the subsidiary content including a main unit portion which is data for reproducing the actual content of the subsidiary content, and directly used content information which is added information, indicating what the directly used content, which is a content directly secondarily used at the time of creating the subsidiary content, is; and an importance setting unit configured to set importance based on secondary usage state of the directly used content regarding which importance is to be set, by other subsidiary contents, by using the directly used content information, so as to set importance regarding at least subsidiary contents stored and managed by the subsidiary content storage unit.

With the above configuration, first, the content regarding which importance is to be set is a subsidiary content. The subsidiary content is created by secondary usage of one or more content. Also, the subsidiary content here includes at least directly used content information as added information. The directly used content information stores information whereby identification can be made regarding what the directly used content is, that was secondarily used directly at the time of creating the relevant subsidiary content. Using the directly used content information enables the importance to be set based on the secondary usage state of the relevant subsidiary content by other subsidiary contents.

The importance can be set for each subsidiary content with the above configuration, and is based on the secondary usage state of the subsidiary content, which is a secondary creation. That is to say, this importance is set for the subsidiary content using the nature of the subsidiary content that it is a unique secondary creation, and accordingly reliability is high. Thus, useful service using importance, for example, can be provided.

BRIEF DESCRIPTION OF THE DRAWINGS

FIG. 4 is a diagram schematically illustrating the flow of subsidiary content playing according to the embodiment;

FIG. 6 is a diagram illustrating an internal configuration example of a primary content server;

FIG. 16 is a diagram illustrating a structural example of used source editing material content information and used editing material content information in a subsidiary content playback control file;

FIG. 17 is a diagram illustrating an example of what is in playback control information in a subsidiary content in a subsidiary content file;

FIG. 28 is a diagram illustrating an example of what is in generation related information, in relation to FIG. 26;

FIG. 29 is a diagram illustrating an example of what is in generation related information, in relation to FIG. 27;

FIG. 30 is a diagram illustrating an example of what is in generation related information obtained by both FIGS. 26 and 27;

FIG. 33 is a diagram illustrating an example of what is in generation related information, in relation to FIG. 31;

FIG. 34 is a diagram illustrating an example of what is in generation related information, in relation to FIG. 32;

FIG. 37 is a diagram illustrating an example of the structure of content profile information;

FIG. 38 is a diagram schematically illustrating a basic concept regarding extraction of recommended contents with the embodiment;

DESCRIPTION OF THE PREFERRED EMBODIMENTS

Figure 1:
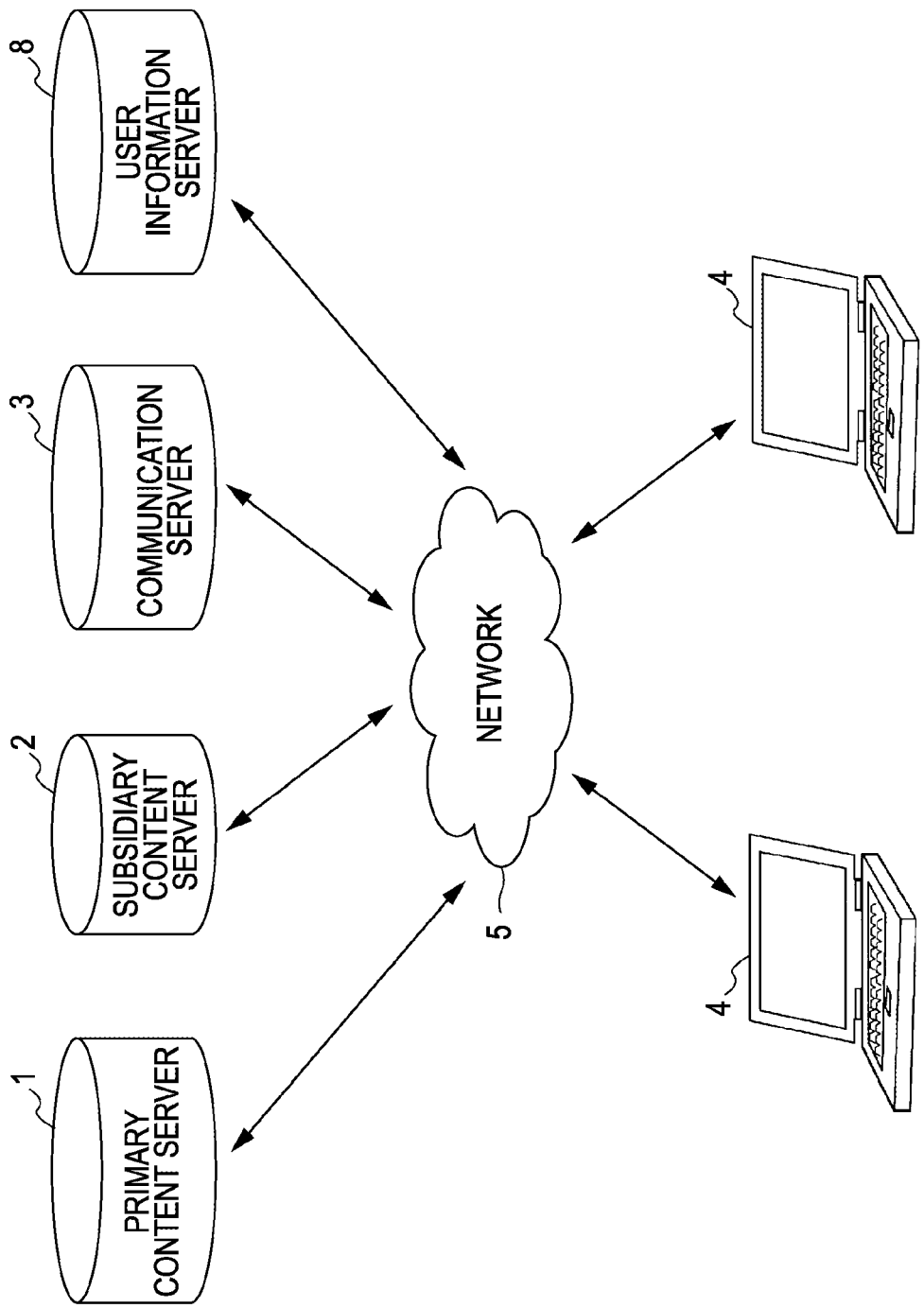
FIG. 1 is a diagram illustrating a configuration example of a content creating/sharing system corresponding to an embodiment of the present invention.

FIG. 1 illustrates a configuration example of an information processing system, having information processing devices, according to an embodiment of the present invention. Note that the information processing system according to the present embodiment handles primary content files and subsidiary content files as content files, as will be described later. In the following, content files will be referred to simply as "content files" in the event that primary content files and subsidiary content files do not have to be distinguished. Also, in the case of describing contents in accordance with abstract concepts, primary content files will also be referred to as "primary contents", and subsidiary content files will also be referred to as "subsidiary contents". Moreover, contents will be referred to simply as "contents" in the event that primary contents and subsidiary contents do not have to be distinguished.

As shown in this drawing, the information processing system according to the present embodiment can first be viewed as being formed by connecting a primary content server 1, a subsidiary content server 2, a communication server 3, a user information server 8, and a great number of user terminal devices 4, connected by a network 5. The information processing system according to the present embodiment realizes a content creating/sharing system by such a device configuration. That is to say, so-called content distribution (distribution of primary contents) and sharing of contents created by users (subsidiary contents) among users, on a network, are realized.

Note that "contents" as used here primarily refer to audio corresponding to music, songs, and the like, or video which is moving images. Further, the content types of video may be considered to include still images, such as photographs and the like. Also, document data, programs to be executed by the information processing device, and so forth, can be handled as contents.

The primary content server 1 stores and manages in a database a great number of content data, in a predetermined format, as primary contents. The primary content server 1 is configured so as to externally transmit data which is specified primary contents to the requesting user terminal devices 4, in response to download requests from the user terminal devices 4 via the network. Note that the primary contents here are, for example, videos or tunes or the like which artists and the like have created, provided from an affiliated record label.

The subsidiary content server 2 is capable of storing and managing data of a great number of subsidiary content files, which is data serving as subsidiary contents, in a database. As described later, a subsidiary content file is uploaded from a user terminal device 4 to the subsidiary content server 2 via the network. The subsidiary content server 2 stores the subsidiary content file uploaded in this way, handling as subsidiary contents. Also, a specified subsidiary content file is transmitted and output by the subsidiary content server 2 to a requesting user terminal device 4, in response to a download request from the user terminal device 4 via the network.

The communication server 3 is a server having functions for providing inter-user communication services, such as for example, SNS (Social Networking Service), services for individuals to put information out which is also widely recognized as CGM (Consumer Generated Media) such as blogs, and so forth.

The user information server 8 stores information of predetermined contents relating to a user of a user terminal device 4 participating in the content creating/sharing system according to the present embodiment (user profile information), as a database for example. AS described later, the user information server 8 operates collaboratively with other servers and the like to execute predetermined operations for realizing a content recommending service. An example of user profile information will be described later.

A user terminal device 4 is a network device which a general user uses, and actually is a personal computer provided with network communication functions such as LAN or the like, for example. These user terminal devices 4 have installed an application program serving as a content creating/sharing application 100, as described later. The user operates this content creating/sharing application 100, and thus is enabled to perform such as downloading primary content files from the primary content server 1, creating new subsidiary content due to editing work using the downloaded primary content file (and subsidiary content file), uploading the created subsidiary content file to the subsidiary content server 2, downloading subsidiary content files from the subsidiary content server 2, using SNS services, writing/browsing blogs using the communication server 3, and so on.

Next, an example of basic operations relating to content distribution, of the information processing system according to the present embodiment assuming the configuration shown in FIG. 1 described above, will be described with reference to FIG. 2, following a basic usage form example by a user of a user terminal device 4. Note that in the description in FIG. 2, description will be made following the numbers of procedures and operations indicated by alphanumeric characters in the brackets [ ]. Also, here, user terminal devices 4A and 4B are shown as being used by two users A and B, respectively, as user terminal devices 4. In this drawing, the network 5 which exists between the primary content server 1, subsidiary content server 2, communication server 3, and user terminal devices 4 is omitted from the drawings. Further, with the present embodiment, the user information server 8 is also omitted from the drawing, since the user information server 8 does not function in an indispensable manner in basic distribution of contents.

Procedure 1

First, the user A accesses a content download site on the primary content server 1 with the user terminal device 4A (content creating/sharing application 100), and then searches the content download side for primary contents which the user wants to download, and performs operations for downloading the searched primary contents. In response to this operation, the user terminal device 4A transmits a download request to the primary content server 1.

Now, we will say that with the content creating/sharing system according to the present embodiment, the downloading of primary contents is basically charged for, with the user A performing proper purchasing procedures at the time of transmitting a download request to the primary content server 1. As far as purchasing procedures go, for example, this may be payment procedures for charges set individually in increments of contents or in increments of albums or the like, or may be subscriptions which have become widespread as of recent. Also, an arrangement may be conceived wherein primary contents are provided free of charge, an in this case, there are no purchasing procedures for the user A.

Upon receiving a download request as described above, the primary content server 1 first performs authentication regarding the requesting user for example, and so forth, and determines whether or not this is a legitimate download request. In the event that determination is made that this is a legitimate download, the primary contents (primary content file) specified at the time of the download request are searched for from the primary contents stored within itself, and data of the file serving as the searched primary contents is transmitted to the requesting user terminal device 4.

Note that the actual entity of the primary content file which the primary content server 1 stores while managing in a database here is of a structure wherein main information serving as actual content data has header information attached thereto. "Actual content data" in this case refers to audio data, moving image data, and still image data according to a predetermined format (data for playing the actual content of the primary contents), as what the content of the contents is. That is to say, the primary content data according to the present embodiment is that from which contents can be played by performing audio signal processing and video signal processing and so forth. Also, header information includes, besides a unique identifier (content ID) for each content file, various types of metadata (tile, artist, title of album to which the data belongs, genre, data format, data size, etc.).

The primary content data transmitted from the primary content server 1 as described above is received at the user terminal device 4A. The user terminal device 4A (content creating/sharing application 100) stores and saves this received primary content data in a storage medium such as an internal HDD or the like. The content creating/sharing application 100 has functions for managing the primary content stored and saved in this way according to a predetermined form based on the header information for example, and executing playback control in accordance with user operations.

Thus, with this arrangement, primary content data stored in the primary content server 1 can be downloaded to user terminal devices 4, by being purchased by the user as a general principle. That is to say, for procedure 1, so-called content distribution is performed.

Note that the primary content data stored and saved at the user terminal device 4A can be played by the content creating/sharing application 100, and output as images, audio, etc., with an AV (Audio-Visual) device or the like connected to the user terminal device 4A, for example.

Procedure 2

Now, generally, with content distribution via network, usage of contents following downloading is restricted to use such as playback, with a certain level of copy restrictions of data being provided. In other words, a user who has obtained contents by downloading is normally only permitted usage within a certain range, and is not provided with rights to create new contents as secondary creations by performing editing based on the obtained audio contents that have been acquired, for example.

In comparison to this, with the present embodiment, the primary content is content regarding which using as material for secondary creation within a range set beforehand (secondary usage, secondary editing) has been permitted, as a matter of principle. Note that secondary usage of the primary content in the present embodiment is set within the range of rights which the writer of the primary content has authorized.

The content creating/sharing application 100 is capable of creating audio contents as a new tune, by executing editing processing in accordance with user operations to perform secondary usage of the primary contents managed in itself (locally stored and saved) as editing material. Also, at the time of editing such contents for example, plug-in data corresponding to predetermined special effects provided at an effect database 6 can be obtained, and editing performed using this. Also, in the same way, material such as audio, images, etc., provided at a material database 7 can be obtained, and editing performed by adding this. Note that the effect database 6 and material database 7 may be situated on a network, or may exist locally on the user terminal device 4A.

With the present embodiment, contents created in this way are called subsidiary contents, and are distinguished from primary contents. As for the procedure 2, a certain subsidiary content is created by operating operations as to the user terminal device 4A on which the content creating/sharing application 100 is running.

Note that the actual entity of the data serving as the subsidiary content created by this procedure 2 is not the digital audio data and video data having the tune content as with the primary content, but rather is generated with playback control information. That is to say, this is playback control information describing specification of effects (special effects), such as instructions of what portion of the digital audio data and digital video data serving as the secondarily used primary contents (editing material contents) is to be played and output at which timing.

Now, FIG. 5 illustrates a concept of creating subsidiary contents with the content creating/sharing application 100. As schematically illustrated in FIG. 5, the editing material contents A, B, and C which are objects of secondary use are used, and the user performs editing operations as to the content creating/sharing application 100 which reflect the intent of editing of the user. The content creating/sharing application 100 performs editing processing corresponding to the editing operations, and creates and outputs a subsidiary content file as a result. The structure of the subsidiary content file created in this way has the above-described playback control information as the main entity of the data.

The subsidiary content data serving as this playback control information (i.e., the subsidiary content playback control information) can be made markedly smaller in data size as compared to video data or audio data or the like, for example. Accordingly, the storage capacity of the storage medium such as the HDD or the like to store the subsidiary content data at the subsidiary content server 2 can be conserved and effectively used. Also, the amount of transmitted data is smaller at the time of transmission/reception of the subsidiary content data on the network, and accordingly does not make traffic heavier, for example.

Performing editing with already-existing contents as material, as with the secondary editing with the present embodiment, to create a secondary work as a new content, is called sampling, mash-up, and so forth, with professional musicians and the like also often performing this. In light of such, it is naturally conceivable that there is desire and demand of general people to create contents as secondary works in the same way. However, in reality, it is extremely difficult for general people to create contents as secondary works upon having properly cleared copyright issues.

Accordingly, as for the content creating/sharing system according to the present embodiment, an attempt has been made to increase the entertainment nature for the user, by first enabling general users to legally perform secondary editing using distributed contents.

To this end, the primary contents according to the present embodiment have been positioned as contents regarding which a user which has downloaded (purchased) is permitted to use secondarily in the range of rights which the copyright holder has authorized. That is to say, the content distribution service with the primary content server 1 according to the present embodiment is for distributing contents regarding which secondary usage has been proactively permitted. However, in the case of the present embodiment, the editing work which is secondary use of primary contents should be limited to user operations at the content creating/sharing application 100 developed for the content creating/sharing system according to the present invention at the least, and should be arranged such that the editing work is not performed by other editing software or the like unrelated to the content creating/sharing system according to the present embodiment.

Procedure 3

The data of the subsidiary content file created by the user A as described in Procedure 2 above is saved only at the user terminal device 4A, with playback processing being performed by the playback functions of the content creating/sharing application 100 as described later with FIG. 4, and images/audio of the contents can be played as the subsidiary content.

With this in mind, the present embodiment further enables users who have the services of the content creating/sharing application 100 according to the present embodiment to share the subsidiary contents created by users, by making public on a network.

Now, let us say that the user A desires to share subsidiary contents created by the above Procedure 2. Accordingly, the user A performs predetermined operations as to the content creating/sharing application 100, so as to upload the data of the subsidiary content file created by the Procedure 2 to the subsidiary content server 2.

This is Procedure 3.

Procedure 4

The subsidiary content server 2 saves the subsidiary content file transmitted as an upload as described above, so as to be newly registered in a database. At this time, the subsidiary content server 2 sets the saving location thereof (e.g., represented by an address such as a URL (Uniform Resource Locator)), and then performs saving processing of the subsidiary content file and registration thereof in the database.

Note that the subsidiary content server 2 has publishing functions with regard to the subsidiary content registered in the database. That is to say, the subsidiary content registered in Procedure 4 is subsequently published at the subsidiary content server 2, can be downloaded in response to download requests from the user terminal device 4 (content creating/sharing application 100).

Procedure 5

Upon saving and managing the subsidiary content file as described above, the subsidiary content server 2 transmits, to the upload requesting user terminal device 4A, an address indicating the saving location of the subsidiary content (subsidiary content file) that has been uploaded (saving location address), to notify the saving location thereof.

The content creating/sharing application 100 of the user terminal device 4A receives the above saving location address, and stores and saves, and manages this in a predetermined storage medium. The user A can, at any time, output the saving location address of the subsidiary content which he/she has uploaded by Procedure 2, by performing a predetermined operation as to the content creating/sharing application 100.

Procedure 6

As described earlier, the subsidiary content server 2 has a publishing function regarding the subsidiary contents registered in the database. Accordingly, the subsidiary content which the user A has created and uploaded this time can be browsed by users of an indeterminate number of user terminal devices 4 (content creating/sharing applications 100) accessing the content publishing site provided by the subsidiary content server 2, as a general principle. Also, with the present embodiment, the user terminal devices 4 of all users can download desired subsidiary contents, as a general principle. With this understanding, the user A which has obtained the saving location address in Procedure 5 can announce to other users in several ways that his own subsidiary contents have been published at the subsidiary content server 2. Procedure 6 corresponds to one of the publishing announcement methods, and is carried out by accessing the communication server 3 as shown in the drawing, and writing to his own page in an SNS, or his own blog or the like, for example, that the subsidiary contents created by himself have been published. At this time, the URL serving as the saving location address obtained in Procedure 5 is also copied in so as to be written in.

Procedure 7

Upon a user B for example operating the content creating/sharing application 100 installed in the user terminal device 4B after the user A has written in as described above with Procedure 6 and accessing and browsing the page of the user A in the SNS or the blog of the user A, he/she knows that subsidiary content of the user A has been newly published. That is to say, in this case, the user B has indirectly received the announcement regarding the new publishing of the subsidiary content created by the user A, via the SNS or blog.

Procedure 7 indicates such indirect announcement of subsidiary content publishing being performed.

Procedure 8

Procedure 8 will be given as another way for publishing announcement. As for this Procedure 8, the user B side is notified that the subsidiary content created by the user A has been disclosed by creating and transmitting mail using a mail function provided to the SNS, for example. This is a more direct form of announcement, as compared to the announcement according to the flow of the above-described Procedure 6 and Procedure 7.

Also, in the event of announcing by e-mail and so forth in this way, the saving location address of the subsidiary content is copied into the body for example, so as to be listed.

Procedure 9

In this way, the user B can indirectly or directly receive announcement and know that the subsidiary content created by the user A has been newly published. In the event that the user B desires to enjoy the subsidiary content of the user A that has been newly published, first, the subsidiary content is downloaded by the content creating/sharing application 100. This is Procedure 9.

At the time of downloading the subsidiary content, a clicking operation or the like is performed as to the saving location address shown as a link in the body of the SNS diary page or blog, for example. Note that at the time of writing to an SNS diary page or blog, in the event the address information such as a URL is written in, this text string portion is presented as a link.

In response to performing a clicking operation as to the saving location address as described above, the content creating/sharing application 100 accesses this saving location address. That is to say, of the addresses on the subsidiary content server 2, an address indicating the location where the file of the subsidiary content which the user A has created and published (subsidiary content file) has been saved, is accessed. The subsidiary content file saved at that saving location is then sent out to the user terminal device 4B. The subsidiary content file set out in this way as received at the user terminal device 4B, and saving and management is performed under control of the content creating/sharing application 100. Accordingly, subsidiary content is downloaded.

Procedure 10

Upon the subsidiary content of the user A being saved and managed as described above, playing of the subsidiary content by the content creating/sharing application 100 of the user terminal device 4B becomes available. Procedure 10 is a procedure for playing subsidiary content file, so that the content of the subsidiary contents are output as video, sound, and so forth, in accordance with playback instruction operations as to the content creating/sharing application 100 by the user B.

FIG. 4 shows a playback concept of subsidiary contents with the content creating/sharing application 100. At the time of playing the subsidiary content, first, the content creating/sharing application 100 performs interpretation processing of the playback control information of the subsidiary content file which is the actual data. As a result of this interpretation, the content creating/sharing application 100 can recognize first, for example, which primary content file has the actual content data to be played (source editing material content), and also in the playing sequence, which portion of the actual content data (video data, audio data, etc.) of the source editing material contents have been used in what manner at what playing time, and so forth, for example.

In this diagram, an example of results is shown in a case that recognition has been made that source editing material contents A, B, and C have been used. Following the recognition results thereof, the content creating/sharing application 100 uses the actual contents of the primary content files serving as the source editing material contents A, B, and C, to execute playback control. Consequently, the content of the contents serving as the subsidiary content is played as images and sound.

According to the description of FIG. 4 above, playing of the subsidiary content uses the actual content data of the source editing material content used for creating the subsidiary content. That is to say, with the present embodiment, in order to play subsidiary content file, the data of the source editing material contents has to exist at the same local location as the content creating/sharing application 100, however temporarily. Accordingly, in the event that the source editing material contents are not locally saved as a primary content file at the time of attempting to play the subsidiary content, this should be obtained locally.

Procedure 11

Accordingly, in such a case as described above, procedures are performed for downloading and acquiring any editing material contents which are not locally available. Procedure 11 in FIG. 2 is a procedure to be performed to this end in the process of playing contents with Procedure 10.

As can be understood from the description so far, the source editing material contents are actual content data, so as a principle, the source editing material contents are primary contents. Accordingly, in Procedure 11, the primary content server 1 is accessed by the user terminal device 4B (content creating/sharing application 100) and primary contents used for playing the subsidiary content in this Procedure 10 but not existing locally are downloaded. Due to this downloading, the source editing material contents used for playing the subsidiary content all exist locally, and playback output can be properly executed as described with FIG. 4.

Note that several forms of data of the primary contents existing locally due to the downloading in Procedure 11 can be conceived. First, a form can be conceived wherein this is made to exist locally, in a state of being stored in saved as to an auxiliary storage device such as an HDD, in the same way as with the case of a normal download according to Procedure 1. As for another, a form can be conceived wherein this is temporarily held in a main storage device such as RAM, and is erased in response to the content creating/sharing application 100 no longer being in a state wherein the playback operation of the subsidiary content can be performed, for example. While primary contents have been described as being basically charged for, for example, operations can be conceived wherein in the case of temporary storage, these are free of charge, or fees are set cheaper than normal downloads, or the like.

Figure 2:
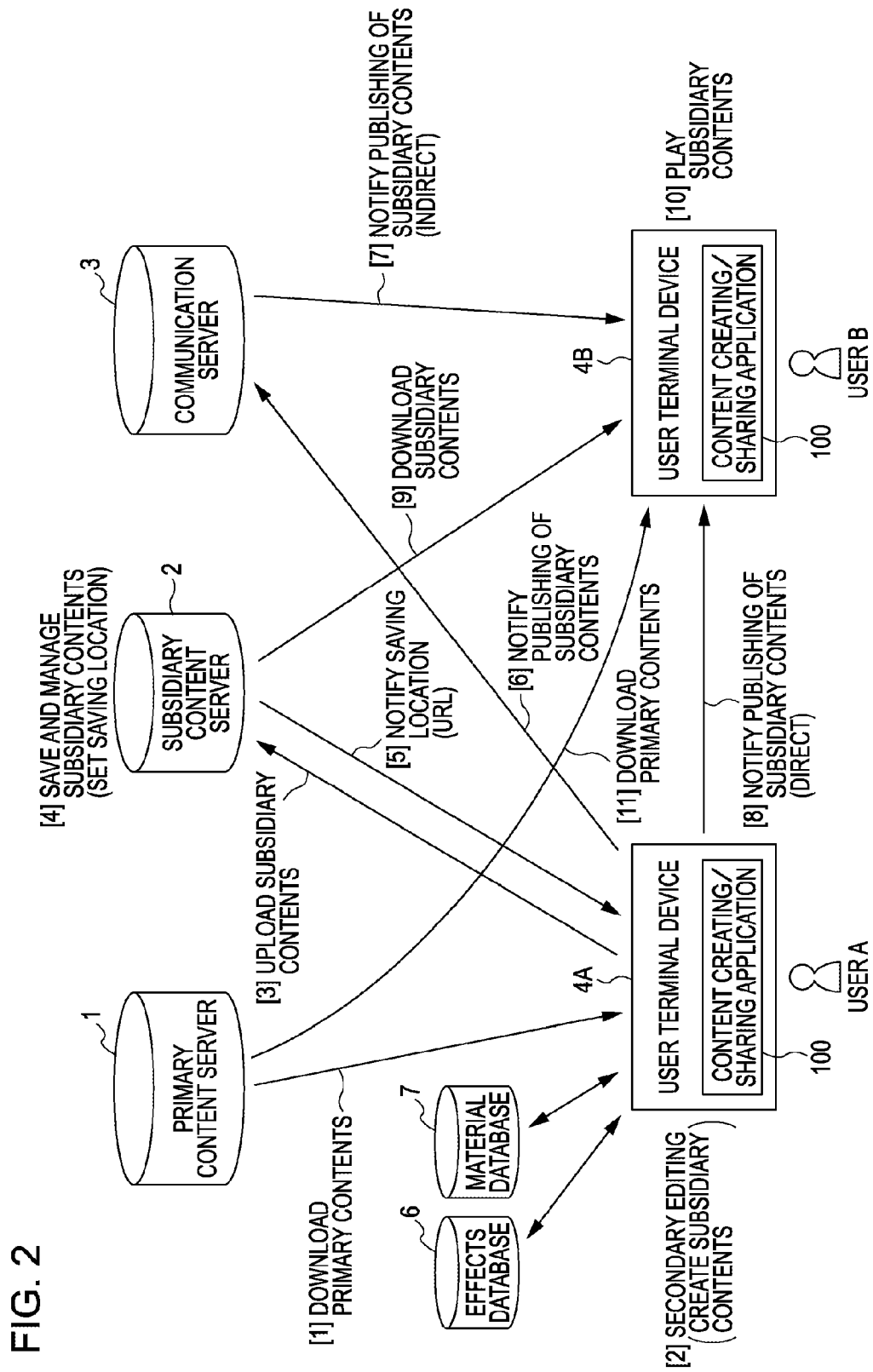
FIG. 2 is a diagram illustrating a basic usage form of a content creating/sharing system according to an embodiment of the present invention, and procedure examples of system operations corresponding thereto.

Also, according to the description of FIG. 2 above, with creating of subsidiary contents according to the present embodiment, primary contents are directly used as the contents of editing material (editing material contents), in a secondary usage manner. That is to say, the editing material contents in this case are primary contents of which the actual content data has to be used at the time of playing (also referred to as "source editing material contents").

However, not only primary contents but also subsidiary contents can be included as the editing material contents which are subjected to secondary usage in the present embodiment. This point will be supplemented with reference to FIGS. 5A through 5C, which each illustrate cases of creating one subsidiary content by editing with secondary usage of two editing material contents.

Figure 5A:
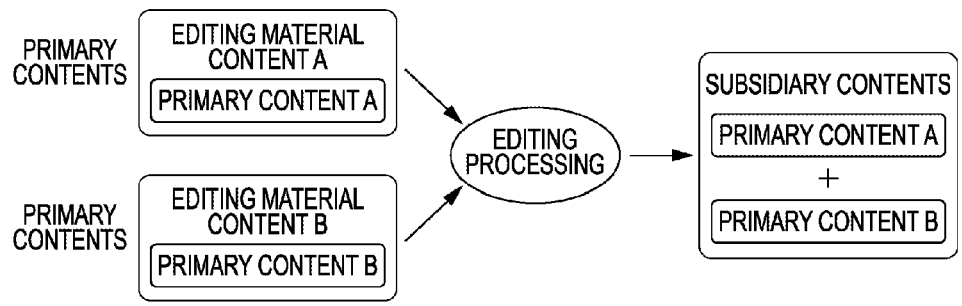
FIGS. 5A through 5C are diagrams illustrating a usage form example of editing material contents at the time of creating a subsidiary content.

First, FIG. 5A illustrates a case wherein the editing material contents A and B are each primary contents, in the same way as with the example of creating subsidiary content described with FIG. 2. That is to say, this shows creating of subsidiary content by executing editing processing with a primary content A taken as editing material content A, and a primary content B which is a different primary content taken as editing material content B. The subsidiary content in this case includes at least a part of the primary content A and primary content B as for the contents thereof, as shown in the drawing. That is to say, the primary contents A and B are used as the contents which are the original editing material (i.e., source editing material contents).

Figure 5B:
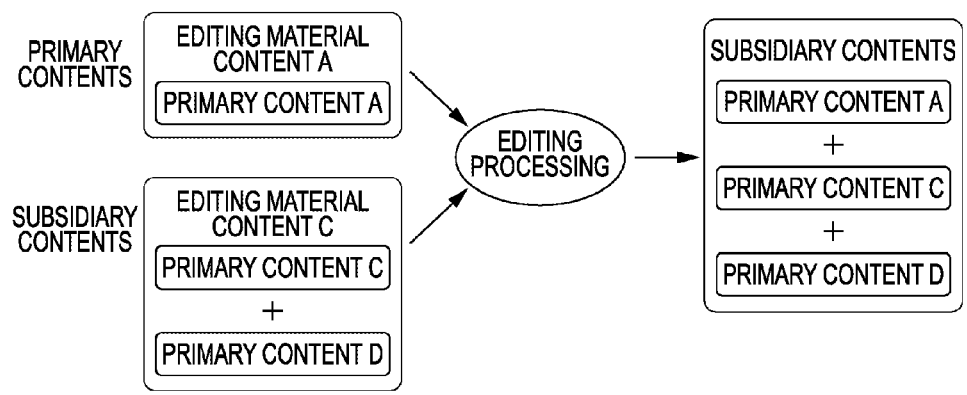

FIG. 5B illustrates creating a subsidiary content by editing with secondary usage of the editing material content A which is the same primary content as in FIG. 5A, and editing material content C which is subsidiary content created using primary contents C and D secondarily. The subsidiary content in this case includes at least a part of the primary content A included in the editing material content A, and at least a part of each of the primary contents included in the editing material content C, as for the content of the contents thereof. That is to say, the primary contents A, C and D are used as the original editing material content, and accordingly, in the event of playing the subsidiary content shown in FIG. 5B here, the primary contents A, D, and D should be locally situated.

Figure 5C:
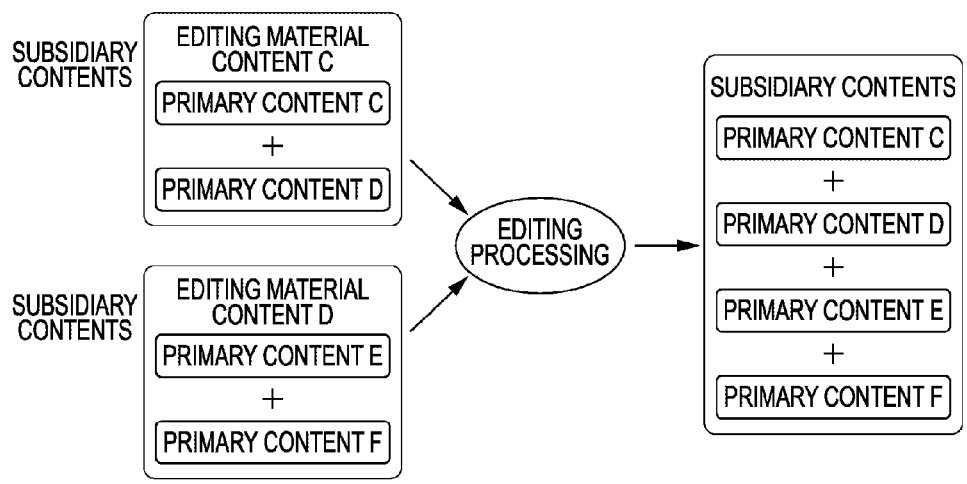

FIG. 5C illustrates creating a subsidiary content by secondary usage of the two editing material contents C and D which are subsidiary contents. The subsidiary content newly created in this case includes at least a part of each of the primary contents C and D included in the editing material content C, and a part of each of the primary contents E and F included in the editing material content D, as for the content of the contents thereof. Accordingly, the primary contents C, D, E, and F should be locally situated in the event of playing the subsidiary content shown in FIG. 5C.

Also, in the event of using subsidiary contents as editing material contents for creating subsidiary content as in the above FIGS. 5B and 5C, first, the user performs download for example, and stores and saves at the user terminal device 4, in order to situate the subsidiary content serving as the editing material contents locally, in the same way as with handling primary content as editing material content.

Also, in the event of the subsidiary content server 2 performing transmission of subsidiary content data in response to the download request for subsidiary content, in according with Procedure 9 in FIG. 2, the subsidiary content is encrypted. This encryption can be decrypted by an authorized content creating/sharing application 100, but the content creating/sharing application 100 is arranged to operate such that only subsidiary content data decrypted by this encryption processing is played, and subsidiary content data not encrypted to begin with for example, or subsidiary content data encrypted by another format or algorithm, is not played. That is to say, the content creating/sharing application 100 only plays that downloaded and obtained from the subsidiary content server 2 with regard to externally-obtained subsidiary content data.

Accordingly, for example, even in the event that users directly exchange subsidiary content files between user terminal devices by direct communication such as P2P (Peer-to-Peer) network communication or e-mail file attachment or FTP (File Transport Protocol) or the like, or by direct exchange using removable media, files obtained by users in this way will not play properly since there is no encryption by the subsidiary content server 2. That is to say, with the present embodiment, subsidiary content of others will not play properly unless downloaded from the subsidiary content server 2. Accordingly, with the content creating/sharing system according to the present embodiment, circulation and reproduction of illegal subsidiary contents violating copyrights over the network is avoided. Thus, protection of the rights of copyright holders of the primary contents and subsidiary contents can be implemented.

As can be understood from the description in FIGS. 2 through 5C, with the content creating/sharing system according to the present embodiment, first, primary contents are downloadable. That is to say, users can download (purchase) and enjoy contents which they like by normal content distribution. Based on this, usage rights are set whereby secondary usage to take the primary contents as editing materials is enabled, so users can perform editing with the primary contents as materials and create their own works. Further, subsidiary contents which are works created in this way can be publicly published using communication techniques such as SNSs and blogs and so forth. That is to say, general users can edit contents with copyrights as material and create new contents (subsidiary contents) and further publicly publish the subsidiary contents, in a proper manner, which has heretofore been considered legally difficult due to problems such as copyrights and so forth.

Also, with the present embodiment, the actual entity of the subsidiary contents are playback control information, formed including at least description instructing playing of primary contents which are the original editing material used by the subsidiary contents.

The content creating/sharing application 100 has playback functions of the subsidiary content, but also has editing functions for creating the subsidiary content. Accordingly, as a form of playback of the subsidiary contents, the content creating/sharing application 100 can not only execute processing for simple audio playback, but also reflect the editing history of the subsidiary content being played in the user interface of the editing function described above, for example. That is to say, as a benefit of the actual entity of the subsidiary content being taken as the playback control information, the user can use the editing functions of the content creating/sharing application 100 to find out in detail how the downloaded subsidiary content has been edited.

Next, an example of a technical configuration for realizing the operations as the content creating/sharing system according to the present embodiment described so far, will be described.

First, FIG. 6 illustrates an internal configuration example of the primary content server 1. As shown in this drawing, the primary content server 1 includes a control unit 11, a storage unit 12, an authentication processing unit 13, a search processing unit 14, a database management unit 15, a settlement processing unit 16, an encryption processing unit 17, and a network interface 18.

The control unit 11 is a member which centrally executes various types of control processing at the primary content server 1, and is configured having a hardware configuration equivalent to the center of a computer system, formed of, for example, a CPU (Central Processing Unit), RAM (main storage device), and so forth.

The storage unit 12 is configured having an HDD or the like for example, and stores a primary content database 12a. The primary content database 12a is information increments wherein data files serving as primary contents to be distributed have been databased.

The authentication processing unit 13 executes predetermined authentication processing regarding whether a valid user or not, in the event of a download request having been made for example, using the user ID and password and the like included in that request. Only in the event that the authentication processing results are OK is a primary content transmitted in response to the request.

The search processing unit 14 is a member which cooperates with the database management unit 15 to access the primary content database 12a and execute processing for searching for intended primary contents.

The database management unit 15 performs management with regard to the primary content database 12a. For example, in the event that new primary contents are supplied, the new primary contents are registered to the primary content database 12a which is updated in response thereto. Also, in the event of deleting primary contents, deletion of the primary contents and updating of the database correspondingly is performed in the same way.

The settlement processing unit 16 executes processing such as settlement as to payment of charges at the user side, relating to pay primary contents.

The encryption processing unit 17 is a member which executes processing for subjecting primary contents to be transmitted from the primary content server 1 to a user terminal device 4 to predetermined encryption.

The network interface 18 is a member for performing communication via the network 5, and reception of download requests and corresponding transmission of primary contents for example, are realized by the network interface 18 executing communication processing in accordance with the control of the control unit 11.

Figure 7:
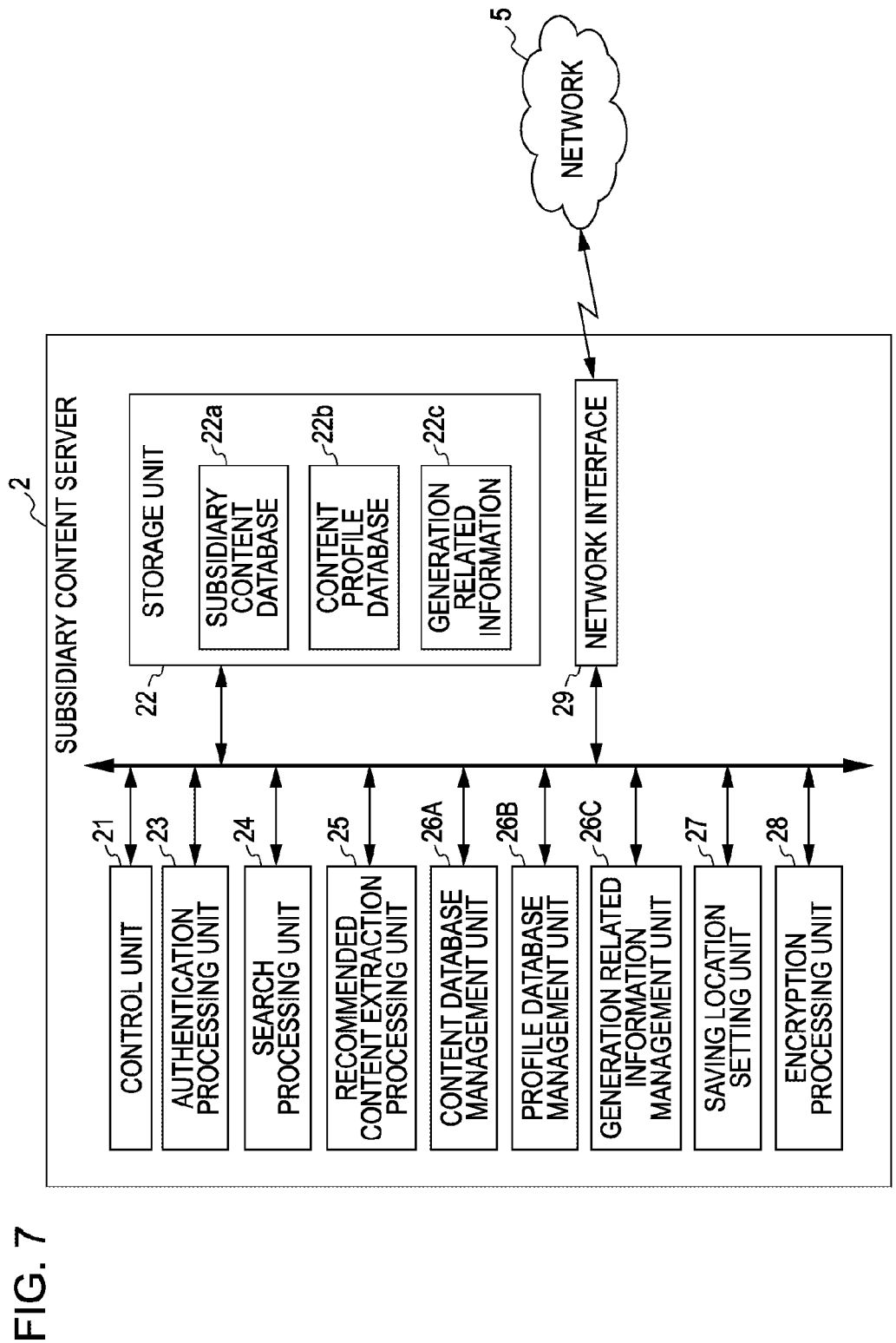
FIG. 7 is a diagram illustrating an internal configuration example of a subsidiary content server.

FIG. 7 illustrates an internal configuration example of the subsidiary content server 2. Here, the subsidiary content server 2 has a control unit 21, a storage unit 22, an authentication processing unit 23, a search processing unit 24, a recommended content extraction processing unit 25, a content database management unit 26A, a profile database management unit 26B, a generation related information management unit 26C, a saving location setting processing unit 27, an encryption processing unit 28, an and a network interface 29.

The control unit 21 is a member which centrally executes various types of control processing in the subsidiary content server 2. This also has a hardware configuration equivalent to the center of a computer system, formed of, for example, a CPU, RAM (main storage device), and so forth.

The storage unit 22 is configured having an HDD or the like for example, and stores a subsidiary content database 22a and a content profile database 22b. The subsidiary content database 22a is information increments wherein subsidiary content files, have been databased. The content profile database 22b is information increments formed by grouping content profile information corresponding to each of the subsidiary contents stored as the subsidiary content database 22a as a database. While an example of the content of content profile information will be described later, the content profile information is made up of certain meta information items such as history information like the number of downloads, for example.

Generation related information 22c is information correlated is evaluation values obtained based on generation configuration, for each of the subsidiary contents managed in the subsidiary content database 22a. As described later, the generation related information 22c can be used to determine and set the importance of each subsidiary content managed in the subsidiary content database 22a.

The authentication processing unit 23 executes predetermined authentication processing regarding whether a valid user or not, in the event of a download request for subsidiary content having been made for example, using the user ID and password and the like included in that request.

The search processing unit 24 is a member which cooperates with the content database management unit 26A to access the subsidiary content database 22*a* and execute processing for searching for intended subsidiary contents. The search processing unit 24 also cooperates with the profile database management unit 26B to access the content profile database 22*b* and execute processing for searching for information of content profiles to be used.

The recommended content extraction processing unit 25 executes processing for extracting recommended contents from the subsidiary contents stored in the subsidiary content database 22*a*, and generating recommended content list information in which the extracted recommended contents are reflected. Note that recommended contents are subsidiary contents which are deemed to be appropriate and suitable for each user (user terminal device 4), and having value of recommending to that user.

The content database management unit 26A performs management with regard to the subsidiary content database 22*a* in the storage unit 22. For example, in the event that new subsidiary contents (subsidiary content files) are uploaded, the uploaded subsidiary contents are registered to the subsidiary content database 22*a* which is updated in response thereto. Also, in the event of deleting subsidiary contents (subsidiary content files), deletion processing to this end and updating of the database corresponding to the deletion results is performed in the same way.

The profile database management unit 26B performs management regarding the content profile database 22*b* in the storage unit 22. For example, updating corresponding to new loading of subsidiary contents (a subsidiary content file) or a deletion thereof, predetermined updating of history information in accordance with downloading of a subsidiary content file, and so forth, with regard to the content profile database 22*b*, is performed.

The generation related information management unit 26C executes management regarding generation related information stored in the storage unit 22. Accordingly, the generation related information management unit 26C executes generation searching processing regarding the subsidiary contents stored as the subsidiary content database 22*a*, thereby obtaining an evaluation value for each subsidiary content in the generation related information (equivalent to importance of the corresponding subsidiary content based on secondary usage status by other subsidiary content), and reflecting the evaluation value in the generation related information.

For example, in response to the registered contents of the subsidiary content database 22*a* being changed (updated) by such new registration or deletion of subsidiary contents, the evaluation value may change regarding subsidiary contents relating to the newly-registered or deleted subsidiary contents generation-wise, of the subsidiary contents in the subsidiary content database 22*a*. Accordingly, the generation related information management unit 26C performs generation searching processing as described above in response to change occurring to the registered contents of the subsidiary content database 22*a* (new registration or deletion of subsidiary contents), thereby obtaining a new evaluation value of subsidiary contents related generation-wise, and updates such that this is reflected in the generation related information.

The encryption processing unit 28 is a member which executes processing for subjecting the subsidiary content data to be transmitted from the subsidiary content server 2 to a user terminal device 4 to predetermined encryption. Also, depending on the system operation, subsidiary content data may be encrypted and transmitted from user terminal devices 4 at the time of uploading subsidiary contents, and in this case, the encryption processing unit 28 is arranged to execute processing for decrypting the encryption thereof as well.

The network interface 29 is a member for performing communication via the network 5. Reception of uploaded subsidiary contents and download requests for example, and transmission of subsidiary content data corresponding to download requests (subsidiary content files) are realized by the network interface 29 executing communication processing in accordance with the control of the control unit 21.

Figure 8:
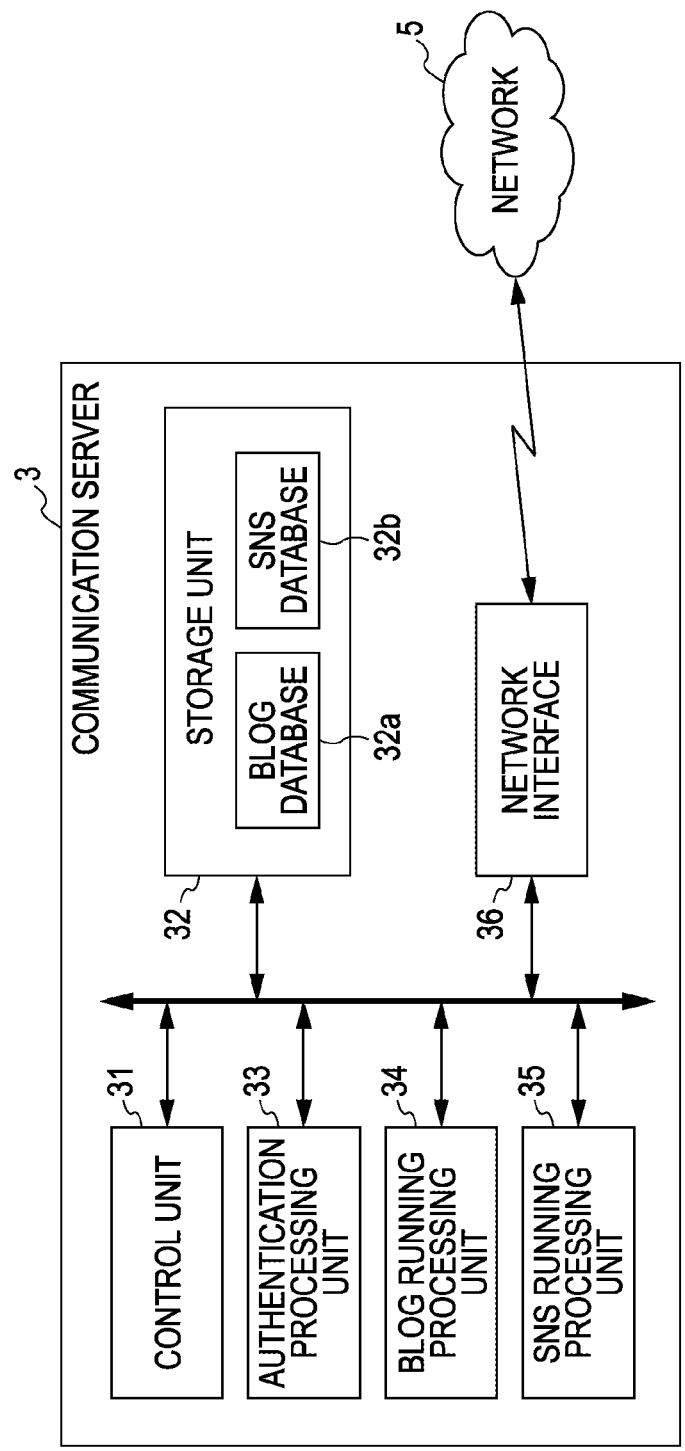
FIG. 8 is a diagram illustrating an internal configuration example of a communication content server.

FIG. 8 illustrates an internal configuration example of the communication server 3. As shown in the drawing, the communication server 3 includes a control unit 31, an a storage unit 32, authentication processing unit 33, a blog running processing unit 34, an SNS running processing unit 35, and a network interface 36. Note that the communication server 3 in this case provides communication services with blogs and SNSs.

The control unit 31 is a member which centrally executes various types of control processing in the communication server 3, and also has a hardware configuration equivalent to the center of a computer system, formed of, for example, a CPU, RAM (main storage device), and so forth.

The storage unit 32 is configured having an HDD or the like for example, and stores a blog database 32*a* and SNS database 32*b*. For example, the blog database 32*a* is information increments wherein data of a blog which the user has started have been databased. The SNS database 32*b* is information increments wherein page contents and the like of each SNS user have been databased.

The authentication processing unit 33 in this case executes authentication processing in response to logins for updating blogs, requests for SNS logins, and so forth, using the user ID and password and the like included in the requests. In the event that the authentication processing results are OK, the above login is successful.

The blog running processing unit 34 executes various types of predetermined processing for properly running a blog. For example, processing is executed such as transmission of blog screen data, transmission of blog posting screens, and so forth, in response to blog access requests from user terminal devices 4, valid blog posting screen requests, and so forth. Also, processing for managing the blog database 32*a*, such as updating the blog database 32*a* such that posts to the blog are reflected, is also executed.

In the same way, the SNS running processing unit 35 executes processing for properly running an SNS, such as processing for transmission of data of a page in response to SNS page access requests and database management beginning with updating the SNS database 32*b* such that posts such as diaries are reflected, and so forth.

The network interface 36 is a member for performing communication via the network 5. This enables transmission of page data in response to access requests for blogs and SNSs, and so forth.

Note that while the communication server 3 is provided corresponding to SNSs and blogs, but separate servers may be configured for SNSs and blogs, for example. Also, a configuration may be made to provide more basic CGM related services which have been widespread even before SNSs and blogs, such personal sites and homepages, for example, whereby individual users can post information other than SNSs and blogs and the like.

Figure 9:
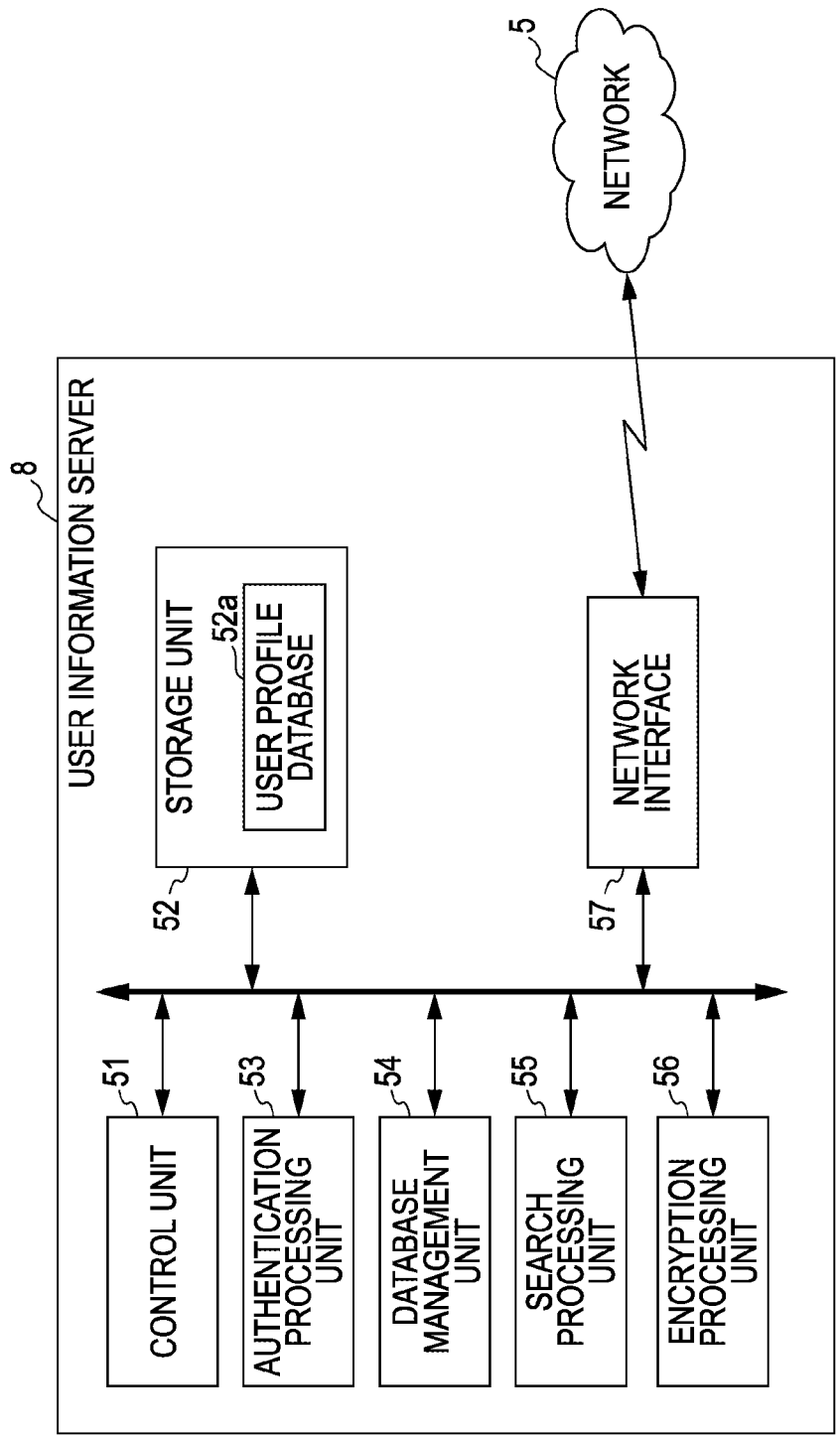
FIG. 9 is a diagram illustrating an internal configuration example of a user information server.

FIG. 9 illustrates an internal configuration example of the user information server 8. The user information server 8 here includes a control unit 51, a storage unit 52, an authentication processing unit 53, a database management unit 54, a search processing unit 55, an encryption processing unit 56, and a network interface 57.

The control unit 51 is a member which centrally executes various types of control processing of the user information server 8, and has a hardware configuration equivalent to the center of a computer system, formed of, for example, a CPU, RAM (main storage device), and so forth.

The storage unit 52 is configured having an HDD or the like for example, and stores a user profile database 52a here. The user profile database 52a is information increments formed by grouping user profile information for each user participating in the content creating/sharing system using the content creating/sharing application 100, as a database. Specific examples of contents and examples of configurations of the user profile information will be described later.

The authentication processing unit 53 executes predetermined authentication processing using user ID and password and the like, such as whether a valid user or not, in a case of registering user profile information from a user terminal device 4 to the user information server 8, for example.

The database management unit 54 performs management of the user profile database 52a in the storage unit 22. For example, updating of the user profile database 52a is performed in response to new registration, updating registration, and deleting of user profile information.

The search processing unit 55 collaborates with the database management unit 54 for example, to execute processing for searching information from the user profile database 52a.

The encryption processing unit 56 executes encryption of data to be transmitted from the user information server 8 to other servers or user terminal devices 4, for example. The encryption processing unit 56 also executes decryption processing of encrypted data transmitted from other servers or user terminal devices 4.

The network interface 29 is a member for performing communication with the other servers and user terminal devices 4 via the network 5.

Figure 10:
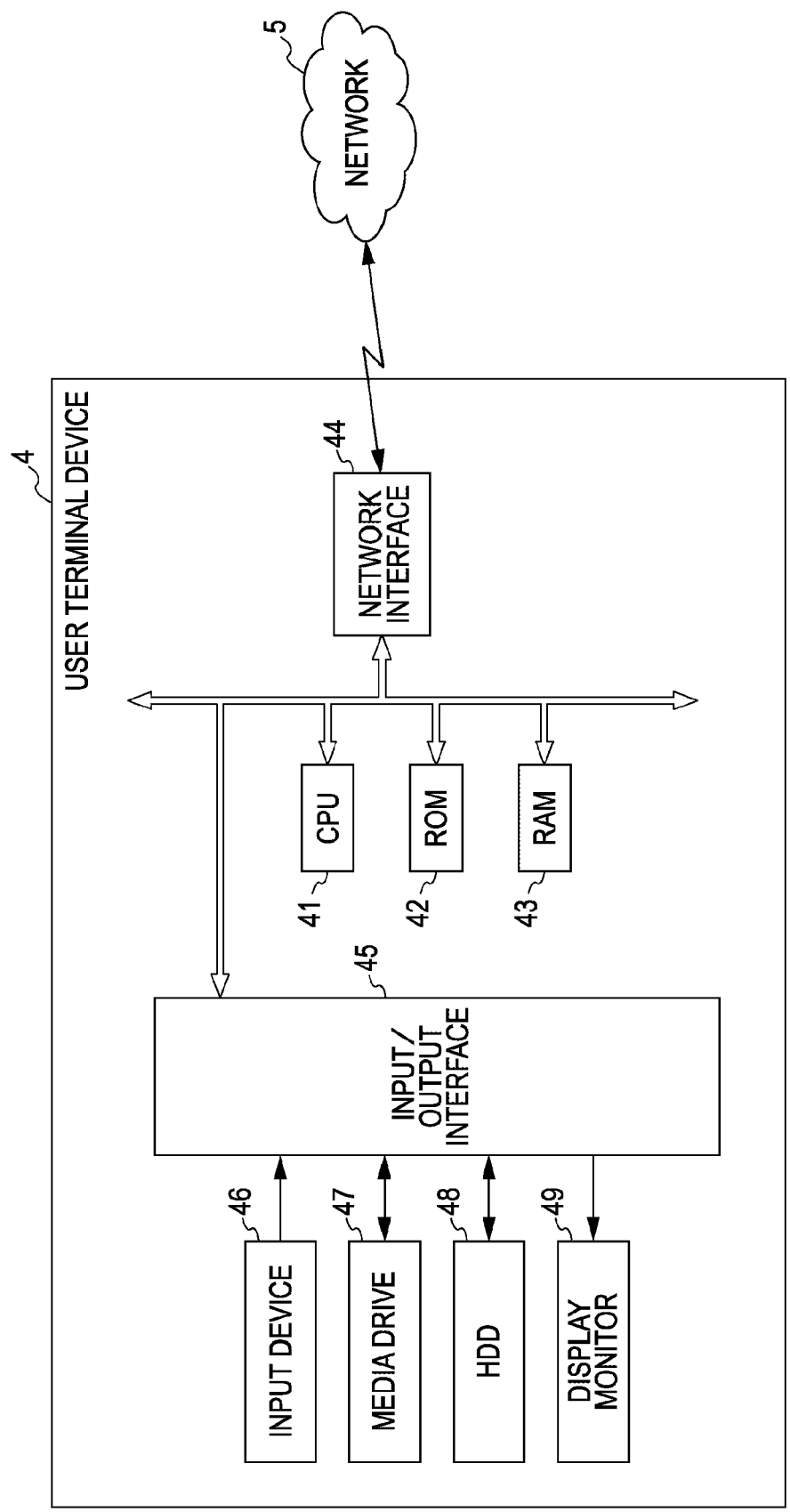
FIG. 10 is a diagram illustrating an internal configuration example of a user terminal device.

FIG. 10 illustrates an internal configuration example of the user terminal device 4. Note that in this case, the hardware serving as the user terminal device 4 is a personal computer.

First, the user terminal device 4 has a network interface 44 in order to perform communication via the network 5. Due to this network interface 44 having been provided, the user terminal device 4 can communication with, for example, the primary content server 1, the subsidiary content server 2, the communication server 3, user information server 8, and other user terminal devices 4 and so forth, via the network 5.

A CPU (Central Processing Unit) 41 is capable of executing various types of processing following an OS (Operating System) and various types of applications programs installed in an HDD (hard disk drive) 48 for example, and programs held in ROM 42. With the present embodiment, an application program serving as the content creating/sharing application 100 is to be installed.

RAM 43 is a work area for the CPU 41, and suitably holds data and programs and the like for the CPU 41 to execute various types of processing.

An input/output interface 45 in this case has an input device 46 which is a keyboard or mouse or the like for example connected thereto, with operation signals being output from the input device 46 being converted into signals suitable for the CPU 41 and output to the CPU 41.

Also, the input/output interface 45 has a media drive 47 connected thereto. This media drive 47 is a drive device configured such that data can be recorded to and played from removable media of a predetermined format.

Also, the input/output interface 45 has connected thereto an HDD 48 having a hard disk as a storage medium. The CPU 41 is arranged so as to be able to record or read out data and programs and the like to and from the hard disk of the hard disk drive 48, via the input/output interface 45.

Also, a display monitor 49 for displaying images is also connected to the input/output interface 45.

Figure 11:
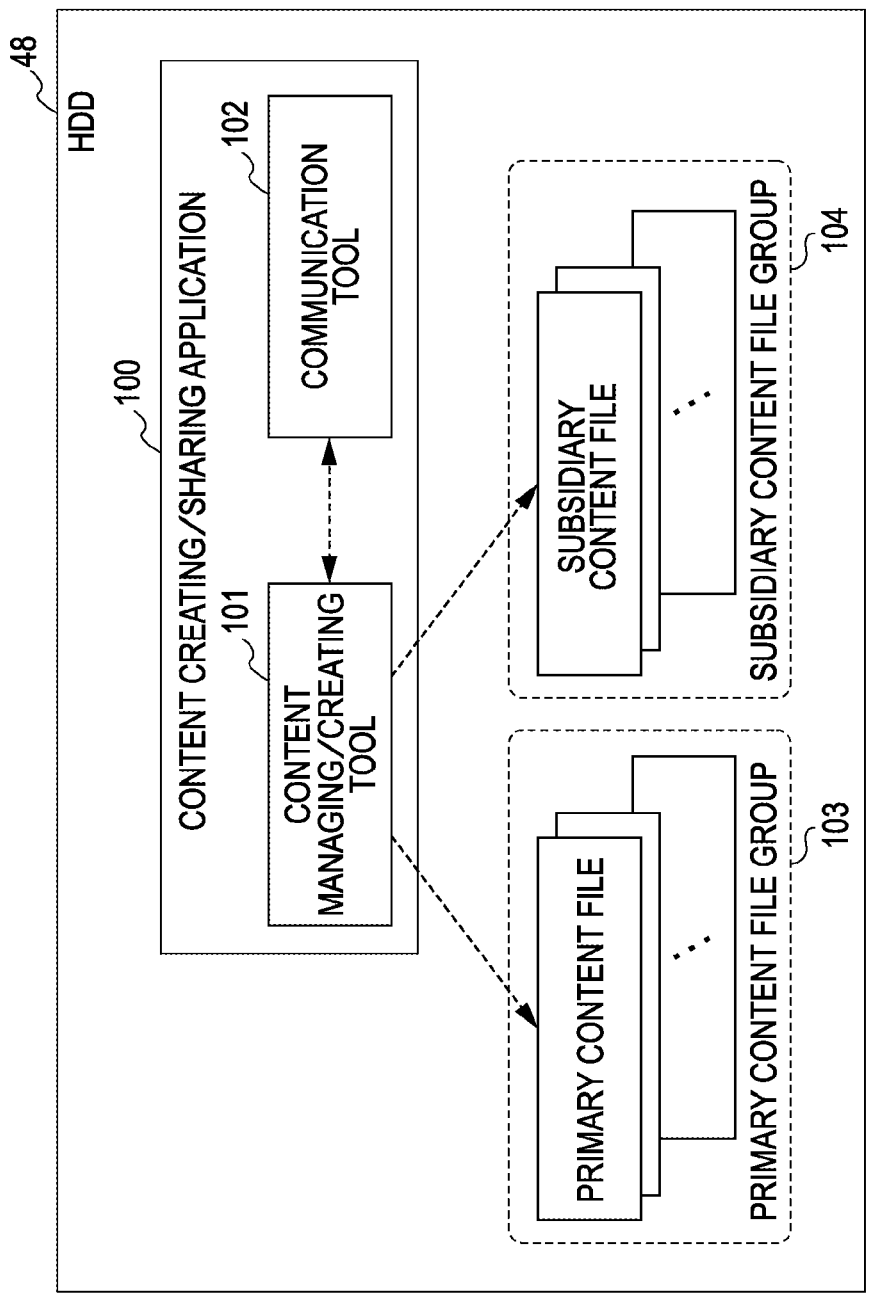
FIG. 11 is a diagram illustrating an example of data contents to be stored in an HDD of the user terminal device.

FIG. 11 illustrates a data content example stored in the HDD 48 with relation to usage of the content creating/sharing system according to the present embodiment.

As shown in this drawing, with relation to the content creating/sharing system according to the present embodiment, first, the content creating/sharing application 100 is stored as data of an application program. Note that storing of the content creating/sharing application 100 as to the HDD 48 is performed by installation processing. Also, as application files, one or more primary content files (primary content file group 103) and one or more subsidiary content files (subsidiary content file group 104) are stored under the control of the content creating/sharing application 100.

The content creating/sharing application 100 in this case can be viewed functionally as being generally configured of a program portion serving as a content managing/creating tool 101 and a program portion serving as a communication tool 102. The content managing/creating tool 101 is arranged to execute downloading of primary content files and subsidiary content files, and file operations with regard to primary content files of the primary content file group 103 and subsidiary content files of the subsidiary content file group 104. Also executed are editing processing in accordance with editing operations, subsidiary content file creating processing in response to editing results, and so forth. The communication tool 102 executes processing for accessing the communication server 3 and operating blogs and SNSs.

Figure 12:
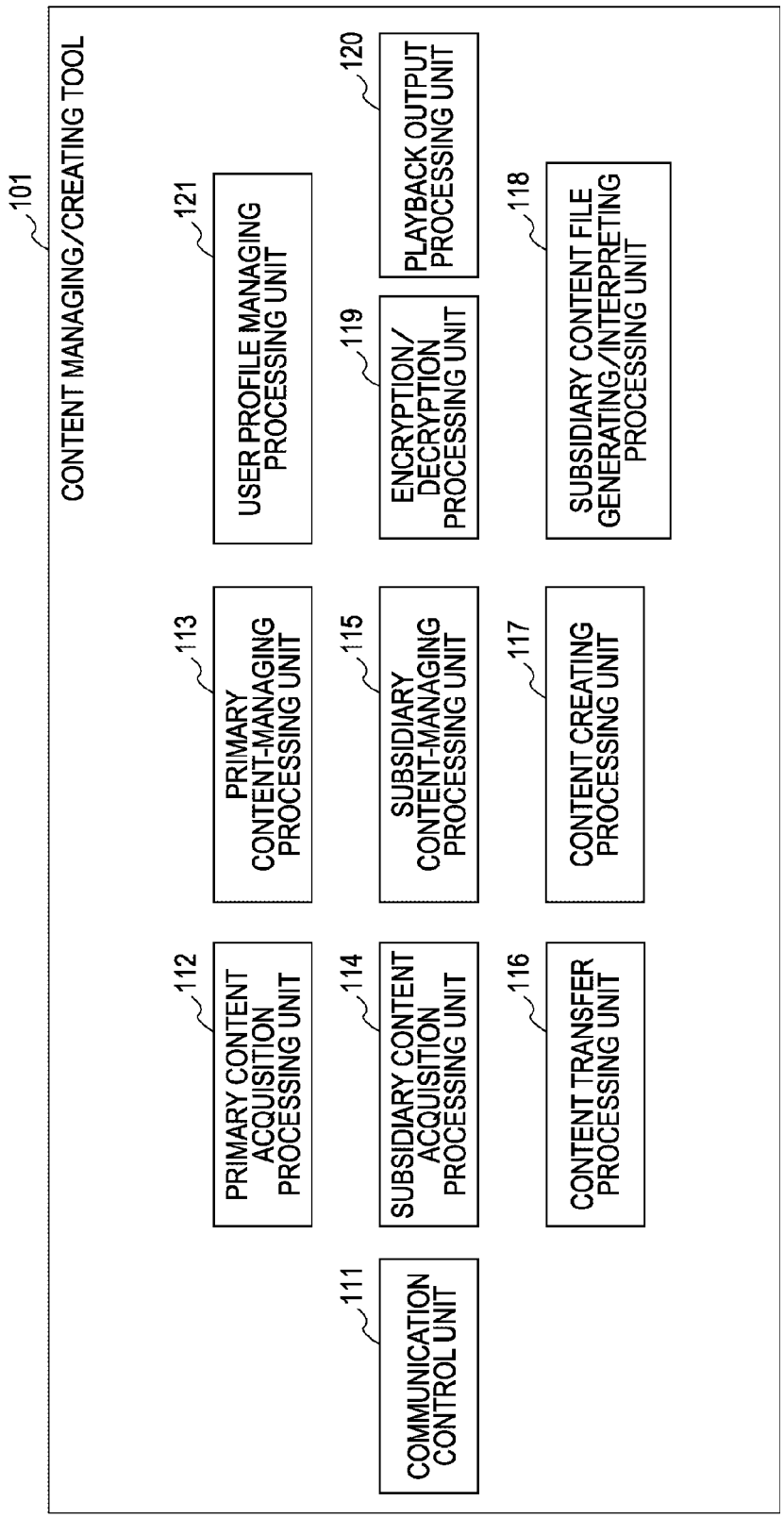
FIG. 12 is a diagram illustrating a program configuration example serving as a content managing/creating tool of a content creating/sharing application.

FIG. 12 is a schematic representation of the program configuration with regard to the content managing/creating tool 101 in increments of function blocks, and can be viewed of being made up of a communication control unit 111, a primary content acquisition processing unit 112, a primary content managing processing unit 113, a subsidiary content acquisition processing unit 114, a subsidiary content managing processing unit 115, a content transfer processing unit 116, a content creating processing unit 117, a subsidiary content file generating/interpreting processing unit 118, an encryption/decryption processing unit 119, an playback output processing unit 120, and a user profile managing processing unit 121, as shown in the drawing.

The communication control unit 111 is a member made up primarily of programs for executing communication between the primary content server 1 and subsidiary content server 3 primarily with relation to content management/editing via the network.

The primary content acquisition processing unit 112 is a member made up of programs for downloading and acquiring primary contents. The primary content acquisition processing unit 112 provides a user interface for downloading primary contents. Also, control for issuing commands as download requests and causing transmission by the communication control unit 111, processing for receiving handover of packets of the primary content data received at the communication control unit 111 and restoring to the data format as primary contents and so forth, are also executed by this primary content acquisition processing unit 112.

The primary content managing processing unit 113 is a member for executing processing for saving the primary content files acquired by the primary content acquisition processing unit 112 in the HDD 48, and processing for managing the saved primary content files. For example, the primary content managing processing unit 113 also realizes content management such as sorting in accordance with artist name, album units, genre, and so forth.

The subsidiary content acquisition processing unit 114 is a member made up of programs for downloading and acquiring subsidiary contents.

The subsidiary content managing processing unit 115 is a member for executing processing for saving subsidiary content files acquired by the subsidiary content acquisition processing unit 114 in the HDD 48, and processing for managing the saved subsidiary content files.

The content transfer processing unit 116 executes control and processing such that data transfer of content files is executed properly via the communication control unit 111, such as for uploading subsidiary content files to the subsidiary content server 2, for example.

Figure 3:
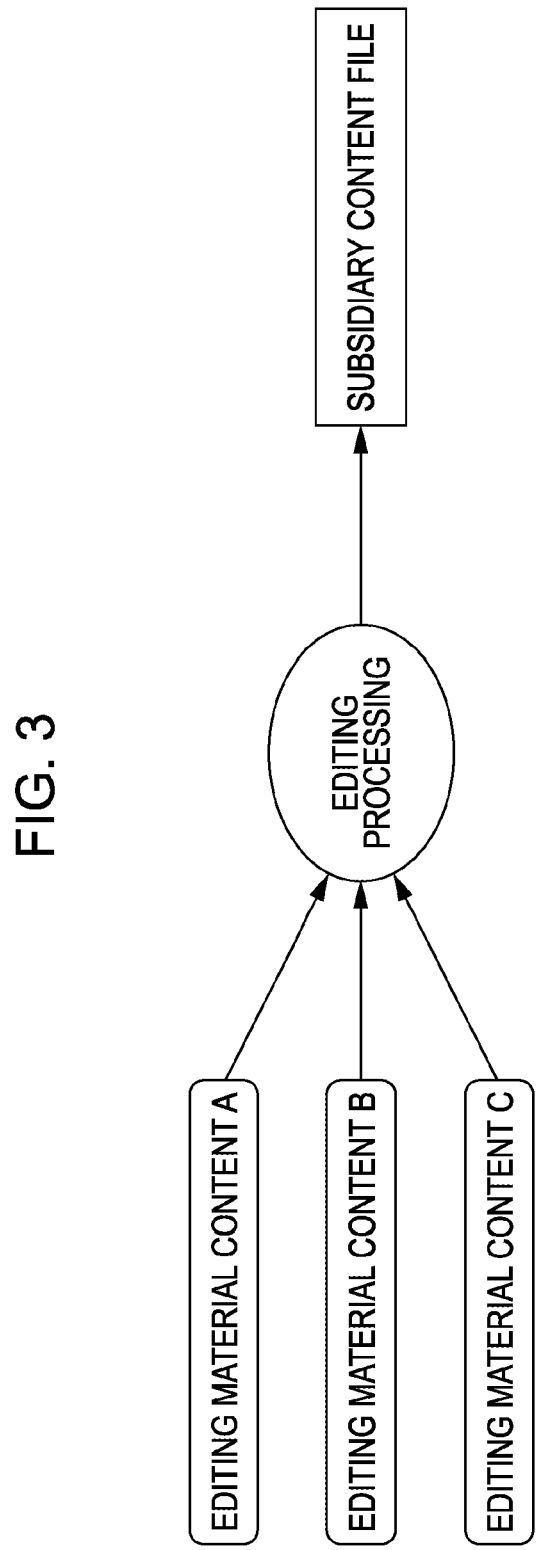
FIG. 3 is a diagram schematically illustrating the flow of subsidiary content creation according to the embodiment.

The content creating processing unit 117 is a member for executing processing relating to editing using the editing material contents shown in FIG. 3, i.e., creating the content of contents serving as subsidiary contents, in response to editing operations and the like performed by the user. Accordingly, a user interface for editing operations and so forth is also realized by this content creating processing unit 117.

The subsidiary content file generating/interpreting processing unit 118 first executes processing for generating the data of subsidiary content files in which the tune contents serving as subsidiary contents created by the content creating processing unit 117 are reflected. Also, in the event of playing subsidiary contents, interpretation processing is executed regarding the playback control information in the subsidiary content file shown in FIG. 4, and a playback processing sequence is determined.

With the present embodiment, primary content files are encrypted and transmitted from the primary content server 1. Also, encryption may be implemented at the time of transmitting subsidiary content files from the subsidiary content server 2 to a user terminal device 4 for downloading, and there are cases of transmitting with encryption in the case of uploading subsidiary content data from a user terminal device 4 to the subsidiary content server 2. The encryption/decryption processing unit 119 executes processing for decrypting encryption in the event that a primary content file or a subsidiary content file that has been encrypted is used for operations for playing, editing, or the like. Also, processing for executing encryption is executed to perform encryption on the subsidiary content file and transmit, if this is the case.

The playback output processing unit 120 is a member for executing, in the signal processing process for playing primary content files and subsidiary content files as images, audio, and the like, predetermined signal processing which should be carried out at the digital signal format stage. For example, a primary content file has, as the actual entity of data, actual content data which is video data or audio data or the like of a predetermined format, for reproducing the content of the contents. Accordingly, in the event of the playback output processing unit 120 playing a primary content file, the playback output processing unit 120 executes digital signal processing for playing the video data or audio data or the like which is the actual content data. In the event that this primary content file has been subjected to compression encoding, decoding processing corresponding to this compression encoding is performed, and playback signal processing is performed regarding the digital video signals or digital audio signals.

Also, in the event of playing subsidiary contents, this executes playing processing serving as a sequencer, wherein the data portions of the used primary content files serving as source editing material contents are sequentially played following the sequence of playing processing determined by the aforementioned subsidiary content file generating/interpreting processing unit 118.

The user profile managing processing unit 121 generates and updates user profile information, and also manages user profile information stored in the HDD 48. Note that user profile information will be described later. Also note that the above-described content transfer processing unit 116 can also perform control for transmitting user profile information data to the user information server 8, not being restricted to transferring of contents.

Now, at the time of playing subsidiary contents, the results of interpretation of the playback control information by the subsidiary content file generating/interpreting processing unit 118 can be reflected in an editing work screen which is a GUI provided by the content creating processing unit 117. That is to say, the contents of playback instructions indicated by the playback control information can be displayed in a form which the user can recognized, on the editing work screen. The user can confirm in detail how that subsidiary contents was created, by viewing this. This means that how the creator created the subsidiary content can be obtained as accurate information. For example, in the case of general contents, in order for a general user to tell how the content has been created, only estimation can be made from the visual content or the acoustic content which can be actually played and viewed or listened to, or the like. In comparison with this, in the case of the present embodiment, how the subsidiary content has been created can be comprehended in further detail and more specifically. Sharing such subsidiary content among users can be expected to markedly improve the knowledge and skill of users using the content creating/sharing system according to the present embodiment with regard to content creating. The system according to the present embodiment has extremely high entertainment nature and usage value for users with interest in content creating.

Figure 13A:
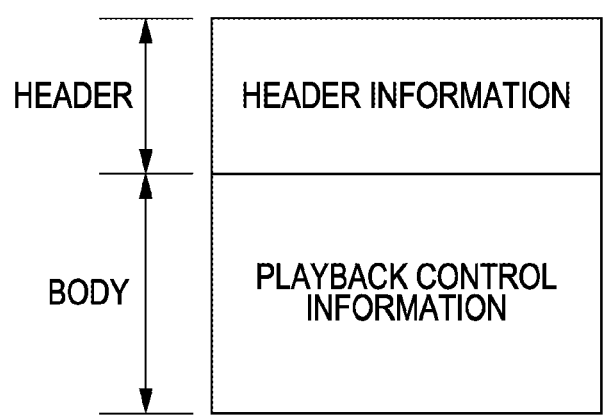
FIGS. 13A and 13B are diagrams schematically illustrating a structural example of a subsidiary content file and a primary content file.

Next, a structural example of content files (primary content files, subsidiary content files) corresponding to the present embodiment will be described with reference to FIGS. 13A through 15. First, FIG. 13A illustrates a configuration example of a subsidiary content file. As shown in FIG. 13A, the subsidiary content file is configured of a header and body (main portion). The header stores header information made up of a group of predetermined information items (metadata, added information) relating to the subsidiary content file. Accordingly, in the case of a subsidiary content file, playback control information is stored.

Figure 13B:
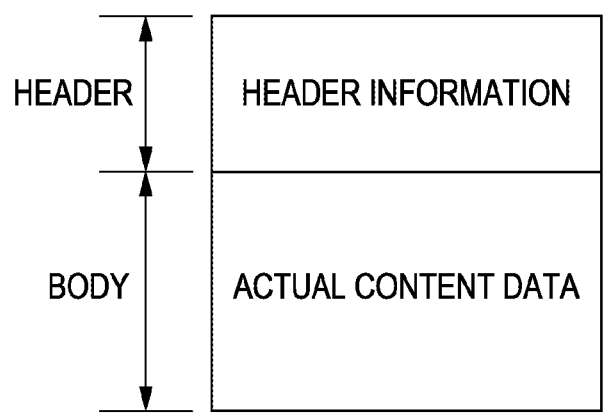

FIG. 13B illustrates a configuration example of a primary content file. The primary content file is also configured of a header and body (main portion), with the header storing header information made up of a group of predetermined information items (metadata) corresponding to the primary content file. The body stores actual content data of a predetermined format as the actual data corresponding to the content of the contents.

Figure 14:
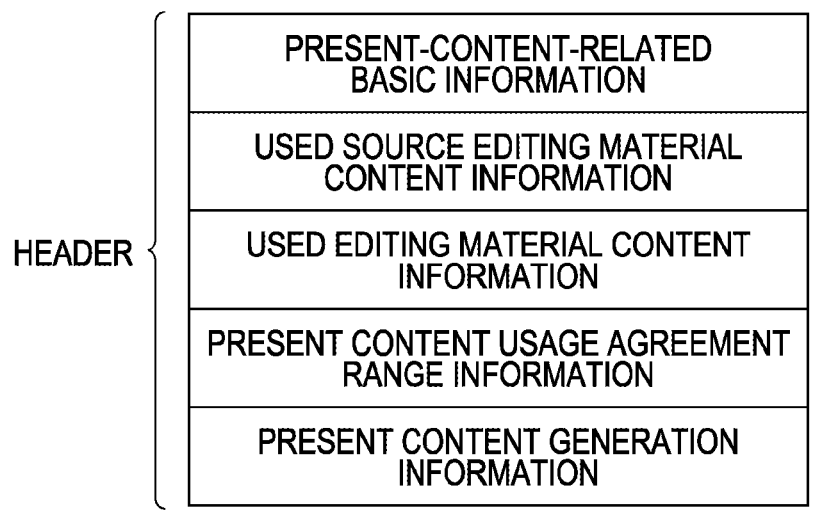
FIG. 14 is a diagram illustrating examples of information items forming header information of a content file.

Now, FIG. 14 shows an example of the content of header information which the header of the subsidiary content file stores. In FIG. 14, the information items (metadata) making up the header information are present-content-related basic information, used source editing material content information, used editing material content information, present content usage agreement range information, and present content generation information.

Figure 15:
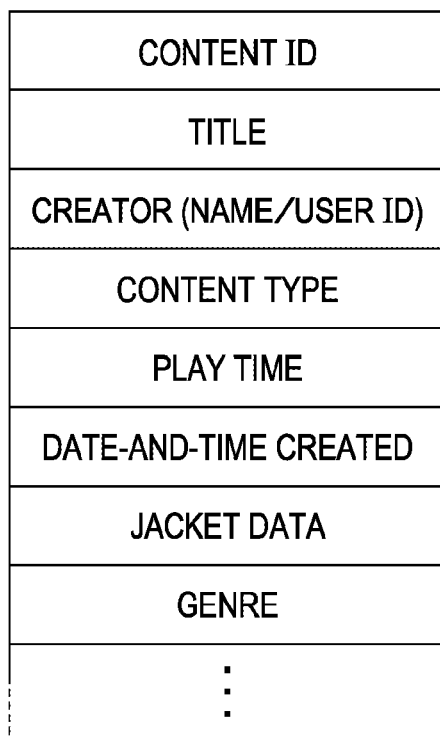
FIG. 15 is a diagram illustrating an example of information items forming present content related basic information, which is one of information items forming the header information.

The present-content-related basic information is basic information items (metadata) relating to the present content file. FIG. 15 illustrates and example of an information item group making up the present-content-related basic information, with content ID, creator (name/user ID), content type, play time, date-and-time created, jacket data, genre, and so on, being shown.

The content ID here is an identifier uniquely given to each content serving as a subsidiary content. Note that with the present embodiment these content IDs are given to each content file by the content database management unit 26A of the subsidiary content server 2, for example.

The title is information indicating the title given to the subsidiary content file.

The creator is information indicating the creator of the subsidiary content file (also can be called "writer", "producer", "artist", or the like). Here, a name corresponding to the creator, and a user ID of the creator, are stored.

The content type is information indicating type, range, etc., of the content of the contents which the subsidiary content file has, such as movies, tunes, photographs (still images), and so forth.

Play time is information indicating the total play time of the content serving as the subsidiary content file.

Date-and-time created is information indicating the date and time at which the subsidiary content file was created.

There are cases wherein a content is provided with image data, such as a jacket of an album. Jacket data is such image data.

The genre is information indicating what the genre given to the content of the contents serving as the subsidiary content file.

Of course, information items other than those listed here may be included in the present-content-related basic information as well.

Used source editing material content information is information indicating what the source editing material content (which is the used source editing material content) to be used for playing the content of the contents serving as the subsidiary content file is. In other words, this is information indicating which primary content like or subsidiary content file has had the actual content data thereof used for creating the subsidiary content.

In correlation with FIGS. 5A though 5C, the primary content file shown as making up the subsidiary content newly created by editing processing is the above-described used source editing material content information. Accordingly, in the case of FIG. 5A, the primary contents A and B are shown in the usage primary contents information, in the case of FIG. 5B, the primary contents A, B, and C are shown, and in the case of FIG. 5C, the primary contents C, D, E, and F are shown.

Also, there may be a possibility that a certain primary content included in the editing material content may not be used at all in the content of the contents serving as the subsidiary content created by editing the editing material content. With the example of the case in FIG. 5B, with the new subsidiary content obtained by performing editing using the editing material contents A and B for example, there may be a possibility that the contents will be that which uses at least a part of the primary contents A and C, but not using the primary content D at all. In this case, only the primary content A and C are actual content data of primary contents used for playing the subsidiary content, and the primary content D is unused.

With regard to how the contents of the used source editing material content information should be corresponding to such a case, there can be conceived one arrangement wherein the contents are such that only the primary contents A and C are shown and the primary content D is not shown, based on the idea that only primary contents actually used for playing the subsidiary content should be reflected.

As for another, there can be conceived another arrangement wherein the contents are such that all of the primary contents A, C, and D are shown. That is to say, this is based on an idea wherein, in this case, while the primary content D is not actually used, there has been the influence of the content of the contents serving as the primary content D to a certain extent in the process of creating the subsidiary content, and accordingly is equivalent to being used in an underlying manner. In this case, all primary contents which have been used even once up to the generation of the subsidiary content created this time are consequently included in the used source editing material.

As described later with reference to FIG. 16, the used source editing material content information also includes metadata of predetermined content, relating to the primary contents shown here.

Also, the used editing material content information is information indicating which editing material contents (used editing material contents, directly-used contents) have been directly used for creating the subsidiary content file. With the example in FIGS. 5A through 5C, stored in the used editing material content information of the new subsidiary content shown in FIG. 5A is data indicating the actual primary content files serving as the editing material contents A and B. Also, in the case of the new subsidiary content shown in FIG. 5B, data indicating the primary content file serving as the editing material content A, and the subsidiary content file serving as the editing material content C, is stored. Also, in the case of the new subsidiary content shown in FIG. 5C, data indicating the subsidiary content files which are the serving as the editing material content C and D is stored as used editing material information.

Note that, as shown in FIG. 16 which will be described later, the used editing material content information also has attached information of related predetermined contents for each of the editing material contents shown here.

The present content usage agreement range information is information of a usage agreement range set regarding the present content file. The structure should comply with the usage agreement range information of the configuration example described later with FIG. 16.

The present content generation information is information indicating what generation the present subsidiary content is, as a content created under the environment of the content creating/sharing system according to the present embodiment.

FIG. 16 illustrates structural examples of the used source editing material content information and used editing material content information. Note that here, the used source editing material content information and used editing material content information are shown as having a common basic structure. Accordingly, the content of FIG. 16 is shown with both the used source editing material content information and used editing material content information being shown in common. As shown in FIG. 16, the used source editing material content information/used editing material content information primarily are made up of linked unit file information. Each unit file information corresponds to one used source editing material content information or used editing material content information. Note that in order to simplify description, both used source editing material content information and used editing material content information will be referred to simply as "used content" if there is no particular distinction therebetween.

For unit file information, for example, the items of content ID, creator, title, generation, and usage agreement range information are provided.

Here, content ID stores the content ID of the content file serving as the corresponding used content.

Creator stores the name of the writer of the corresponding used content, and the user ID of the creator.

Title indicates the tile of the corresponding used content as the name thereof.

The generation information item stores generation information. The generation information is information indicating what generation content the content is. With the content creating/sharing system according to the present embodiment, primary contents are defined explicitly as first-generation contents, while subsidiary contents are defined as being an N'th generation according to predetermined rules, corresponding to the generation of the editing material contents. Accordingly, in the event that the used content information shown in FIG. 16 is used source editing material content information, information indicating first generation will be stored in the time of generation information. Also, in the event that the used content information shown in FIG. 16 is editing material content information, information indicating the generation which is actually set in accordance with each used content (primary content or subsidiary content) corresponding to the unit file information is stored.

The information of the usage agreement range (usage agreement range information) is formed of a group of one or more usage items 1 through n.

The usage items 1 through n are assigned such that predetermined usage contents related to editing (secondary use) of corresponding usage contents correspond to each. Examples of usage contents to be appropriated to usage items which can be conceived include the following.

Contents relating to whether or not secondary usage of the present content is permitted Contents relating to using contents of another creator from the present contents, with regard to other contents to be used as editing material Contents relating to using contents of another album from that to which present contents belong, with regard to other contents to be used as editing material Contents relating to using particular effects and special effects Contents relating to using particular plug-in modules Extracting a part from the entire content and using as editing material Permission contents relating to the extracted actual content data portion in the event of extracting a part from the entire content and using as editing material Number of usable generations (for example, in the event of permitting use for two generations, i.e., up to the grandchild generation (third generation), as primary content, child subsidiary content using this primary content and grandchild subsidiary content using the subsidiary content can be created, but editing of the grandchild subsidiary content is not permitted with regard to the portion using the corresponding primary contents)

Contents relating to number and type of contents regarding which secondary use can be performed in combination with the present content Information indicating contents relating to usage authorization set for each usage item, beginning with permitted/not-permitted for example, is described for each of the these usage items. As for the information of the usage agreement range, generalizing the usage setting contents described for each of these usage items indicates the usage agreement range for the corresponding usage content.

With regard to the content of the header information of the primary content file, particular description by way of reference to the drawings will be omitted, and it should be noted that it is sufficient to have information defining the primary content file as being used. However, with the present embodiment, an arrangement wherein the header information of the primary content files have a common structure with those of the subsidiary content files can be considered to be appropriate. With such a primary content file header information structure, the header structure is standardized between primary contents and subsidiary contents, and which can be expected to lead to improved efficiency in content file management with the content creating/sharing system according to the present embodiment. One example thereof is that the primary content files will have present content usage agreement range information, so a usage agreement range which more accurately reflects the decisions and ideas of the writers can be set of the primary contents which are first-generation contents.

It should be noted though, that primary content files are not created secondarily using other contents. Accordingly, no meaningful information has to be stored regarding the used source editing material content information and used editing material content information shown in FIG. 16, in the header of the primary content files, for example.

Next, playback control information in subsidiary content files will be described. Playback control information is unit information made up describing a processing sequence for playing the content of contents serving as current subsidiary content, in a predetermined language, unlike actual content data. Elements of the description contents forming this playback control information include, for example, first, a description indicating primary content serving as actual content data used for playback, description indicating a data portion to be used for actual playing subsidiary content from the actual content data serving as this primary content, and description indicating the time for playing this data portion. Also, description for applying effects or special effects, such as fade-in, fade-out, overlap, equalizing (tone adjustment), playback speed rate, reverberation, delay, and so forth, for example, is performed.

FIG. 17 illustrates an example of the content of playback control information. In this drawing, the description portions between the brackets [ ] indicate the playback control content for one primary usage content (source editing material content).

An example of playback control content of a usage primary content unit shown in FIG. 17 will be described. First, as for the playback control content as unit of used content shown at the head in the drawing, [file_id=AAAAAA; time=00:00-00:10; position=vv-zz] is described. This specifies that the used content is specified by the content ID=AAAAAA (the descriptor of file_id here), and that the play time of the current subsidiary content using this usage content is 00:00 (start time)-00:10 (play time 10 seconds), and that the data section (section of actual content data) of the usage content used during this play time is a range corresponding to address vv through address zz.

For the playback control content of the subsequent used content unit, [file_id=AAAAAA; time=00:10-00:15; position=ss-tt] is described. This specifies that the usage content is specified by the content ID=AAAAAA, and that the play time of the current subsidiary content using this usage content is 00:10-00:15, and that the data section of the usage content used during this play time is a range corresponding to address ss through address tt.

For the playback control content of the subsequent used content unit, [file_id=BBBBBB; time=00:15-00:20; position=pp-uu] is described. This specifies that the usage content is specified by the content ID=BBBBBB, and that the play time of the current subsidiary content using this usage content is 00:15-00:20, and that the data section of the usage content used during this play time is a range corresponding to address pp through address uu.

For example, the playback output processing unit 120 of the content creating/sharing application 100 according to the present embodiment thus sequentially interprets the playback control contents of the usage content units in the brackets [ ], and executes actual playback control in accordance with the interpretation results, thereby playing and outputting the subsidiary content as video signals, audio signals, and so forth.

Next, an example of procedures relating to the primary processing relating to editing of subsidiary contents will be described with reference to the flowcharts in FIGS. 18 and 19. Note that the processing shown in FIGS. 18 and 19 is realized by execution of a program serving as the content managing/creating tool 101 in the content creating/sharing application 100, for example.

Now, let us say that for example, a user of a user terminal device 4 has activated the content managing/creating tool 101 of the content creating/sharing application 100 and is ready to edit subsidiary content. Let us say that operations are performed such that content to use as material for creating subsidiary content is searched, and this is registered (finalized) as editing material content. In accordance with this, the processing shown in FIG. 18 is executed by the content creating processing unit 117 of the content managing/creating tool 101.

Figure 18:
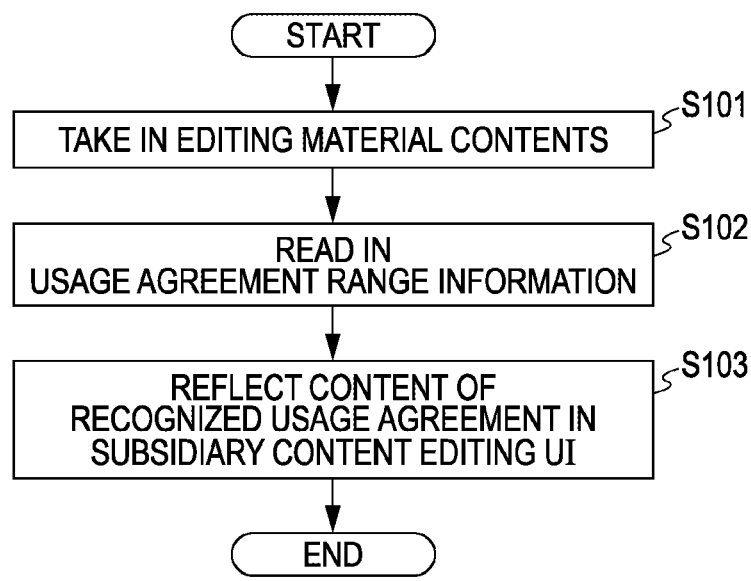
FIG. 18 is a flowchart illustrating an example of reflecting the usage agreement range settings for editing material contents on a user interface at the time performing subsidiary content editing processing by the content creating/sharing application.
Figure 19:
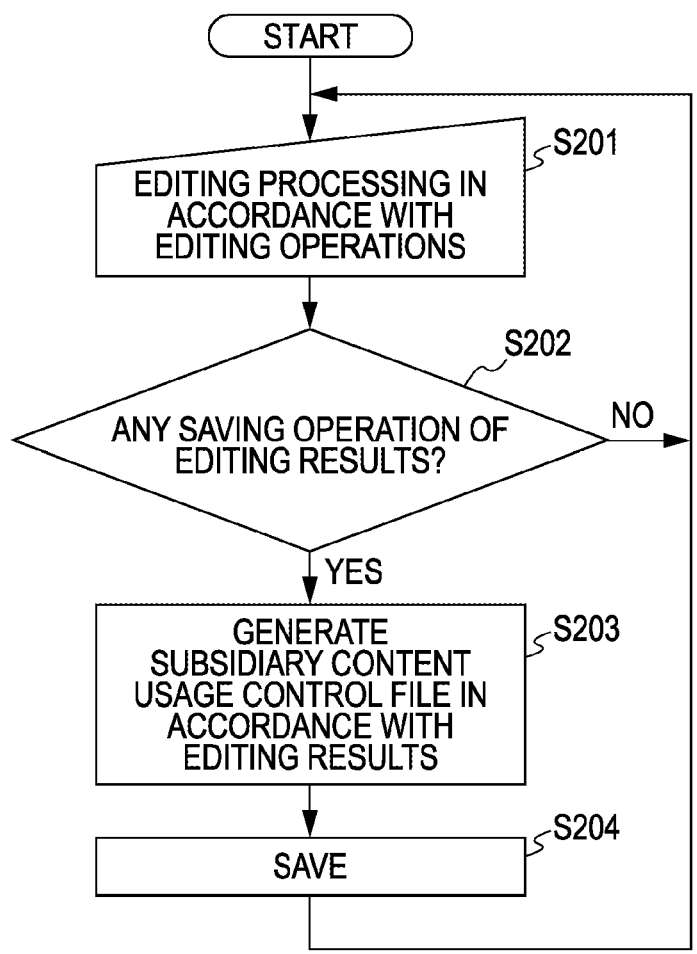
FIG. 19 is a flowchart illustrating an example of processing procedures up to the content creating/sharing application creating a subsidiary content file as subsidiary content editing processing.

In FIG. 18, first, in step S101, taking in of data of content registered as editing material content is executed. Note that in the event that the registered editing material content is a primary content, the data of the primary content file corresponding thereto is taken in, and in the event of a subsidiary content, the data of a subsidiary content file corresponding thereto is taken in.

In step S102, reading in of information of the usage agreement range is further executed from the data taken in by the above step S101. Thus, various contents relating to the usage agreement set with regard to the content registered this time as editing material content is recognized based on the content of the usage items 1 through n in the usage agreement range information. Accordingly, in the following step S103, the contents of the usage agreement recognized in correspondence with the above step S102 is set so as to be reflected on a user interface (UI) for subsidiary content editing. Due to this processing, the content creating processing unit 117 operates such that editing operations of content exceeding the usage agreement range set in the editing material content beforehand are unavailable.

FIG. 19 illustrates a basic processing procedure example relating to generating of a subsidiary content file which is the actual entity of data serving as the subsidiary content. The processing shown in this drawing is also realized by the CPU 41 executing a program serving as the content managing/creating tool 101, for example.

Here, first in step S201, appropriate editing processing in accordance with operation input for editing is executed. For example, the content creating processing unit 117 provides a GUI (Graphical User Interface) for the user to perform editing operations for creating subsidiary content, with the program thereof. The user performs editing operations for creating subsidiary content using this GUI, and the processing in step S201 is executed in accordance with this operation.

In the process of performing editing processing as described above, upon determination being made in step S202 that operations have been performed for saving the editing results so far, the flow proceeds to step S203. In step S203, a subsidiary content file corresponding to the content of contents obtained by the editing results so far is generated. At the time of generating the subsidiary content file, header information and playback control information reflecting the results of editing so far are generated, and these are combined to generate the file.

Control is executed in step S204 so as to save this subsidiary content file created as described above in an appropriate directory in the HDD 48 for example. Upon the procedure of step S204 having ended, the flow returns to step S201.

Note that when creating the subsidiary content file, the content of the present content usage agreement range information is also generated. As for how to set the contents of the present content usage agreement range information, an arrangement may be conceived to automatically set (contents for each usage item) following predetermined rules, in a range not exceeding a minimum determined summarizing the usage agreement range information for each primary content which is the source editing material, for example. Also, an arrangement may be conceived for settings are made corresponding to specification operations relating to the contents of the present content usage agreement range information which the user has performed, so that the intent of the user is reflected. However, even in the event of setting in accordance with user operations in this way, setting is performed in a range not exceeding a minimum determined summarizing the usage agreement range information for each primary content which is the source editing material, so that setting of usage agreement range (contents for each usage item) exceeding this is unavailable.

Note that while not shown in the drawing here, the processing shown in this drawing is left and the flow transits to other processing, in response to operations being performed to close the GUI screen for creating subsidiary content for example, or the like.

Figure 20:
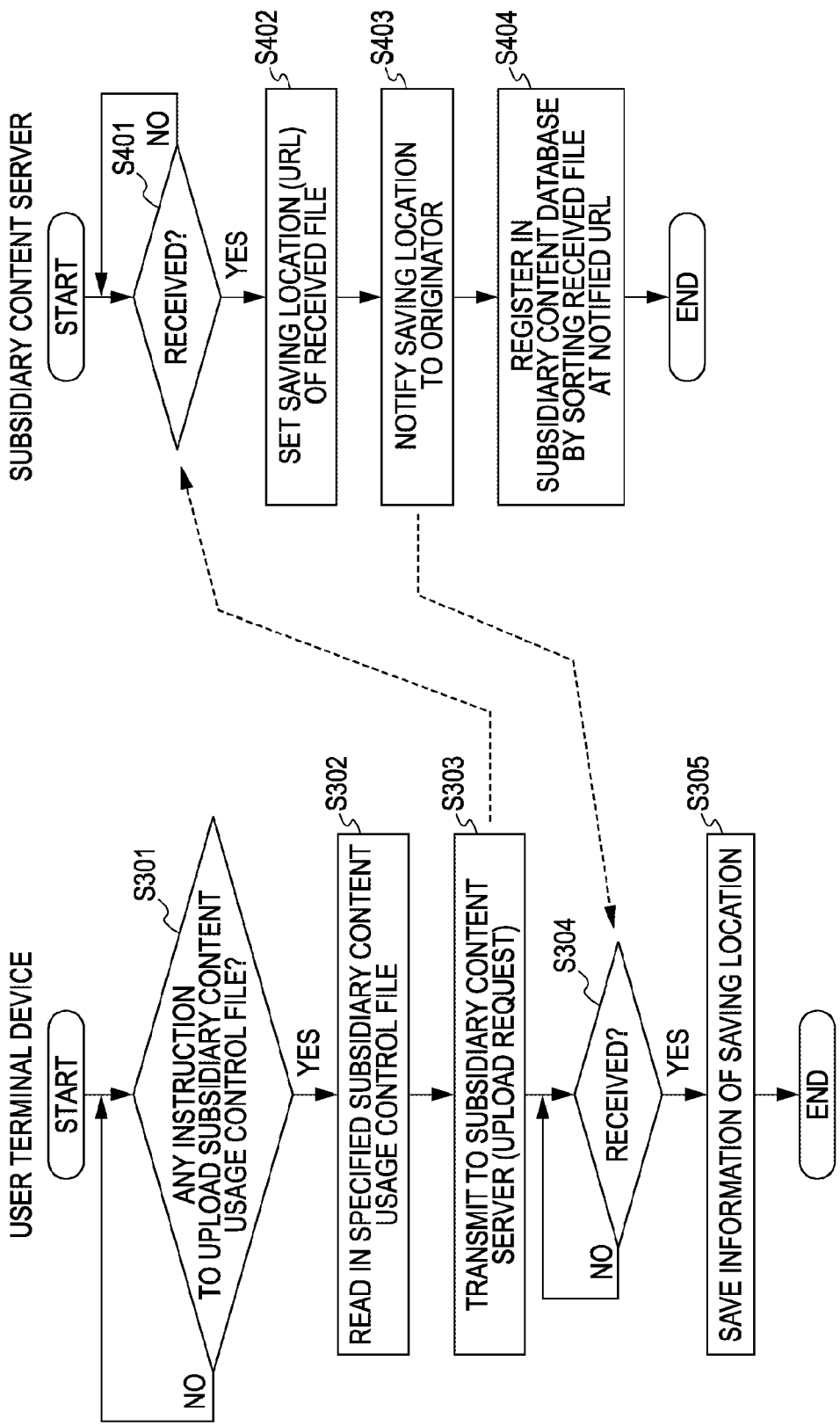
FIG. 20 is a flowchart illustrating uploading subsidiary contents by the user terminal device, and an example of processing procedures by the subsidiary content server in response.

Next, a basic processing procedure example relating to uploading of subsidiary content by the user terminal device 4, and a processing procedure example of the subsidiary content server 2 in accordance with this uploading, will be described with reference to the flowchart in FIG. 20. The processing at the user terminal device 4 side in the drawing is realized primarily by programs serving as the subsidiary content managing processing unit 115 and content transfer processing unit 116. The processing at the subsidiary content server 2 is executed by the members shown in FIG. 7 operating in cooperation, but in reality, can be viewed as being realized by the computer system (CPU) making up the subsidiary content server 2 executing programs.

The user terminal device 4 side in step S301 is awaiting obtaining of a command instructing uploading of a subsidiary content file. Now, let us say that the user selects, as an operation as to the GUI provided by the content managing/creating tool 101, one or more subsidiary contents regarding which uploading is desired, and performs an upload execution operation. In response to this upload execution operation, a command is generated which instructs uploading of the subsidiary content file corresponding to the subsidiary content selected at the GUI, and the flow proceeds to step S302. Note that the subsidiary content for this upload is subsidiary content created by the content creating/sharing application 100 and stored in the HDD 48 as an application file of the content creating/sharing application 100.

In step S302, the subsidiary content regarding which uploading has been specified, i.e., the subsidiary content file, is read in from the directory where it is stored. In the following step S303, control is executed such that the data of the subsidiary content file which has been read in is transmitted and output to the subsidiary content server 2 via network along with an upload request.

The subsidiary content server 2 is standing by in step S401 for reception of an upload request, and upon the upload request being received, the procedures from S402 and on are executed. Note that in order to actually transition to step S402 after receiving an upload request, confirmation is made that this is a request from a valid user, by way of authentication processing for example, but such processing procedures are omitted here.

In step S402, a saving location (URL) for the subsidiary content file received along with the upload request is set. The functions of the saving location setting processing unit 26 at the subsidiary content server 2 for example, are used for this URL setting.

In step S403, communication processing for notifying the saving location of the subsidiary content file set in step S402 is performed as to the user terminal device 4 which is the originator of the upload request this time.

At the user terminal device 4 side which has performed in upload request in step S303 is awaiting reception of information of the saving location in step S304. Upon receiving information of the saving location, in step S305 information of the received saving location (URL) is saved in an appropriate directory. Thus, hereafter, the information of the saving location of the subsidiary content can be called up by performing a predetermined operation as to the content managing/creating tool 101. In the event that the saving location is a URL, a text string as the URL can be displayed, for example, depending on the call operation.

Figure 21:
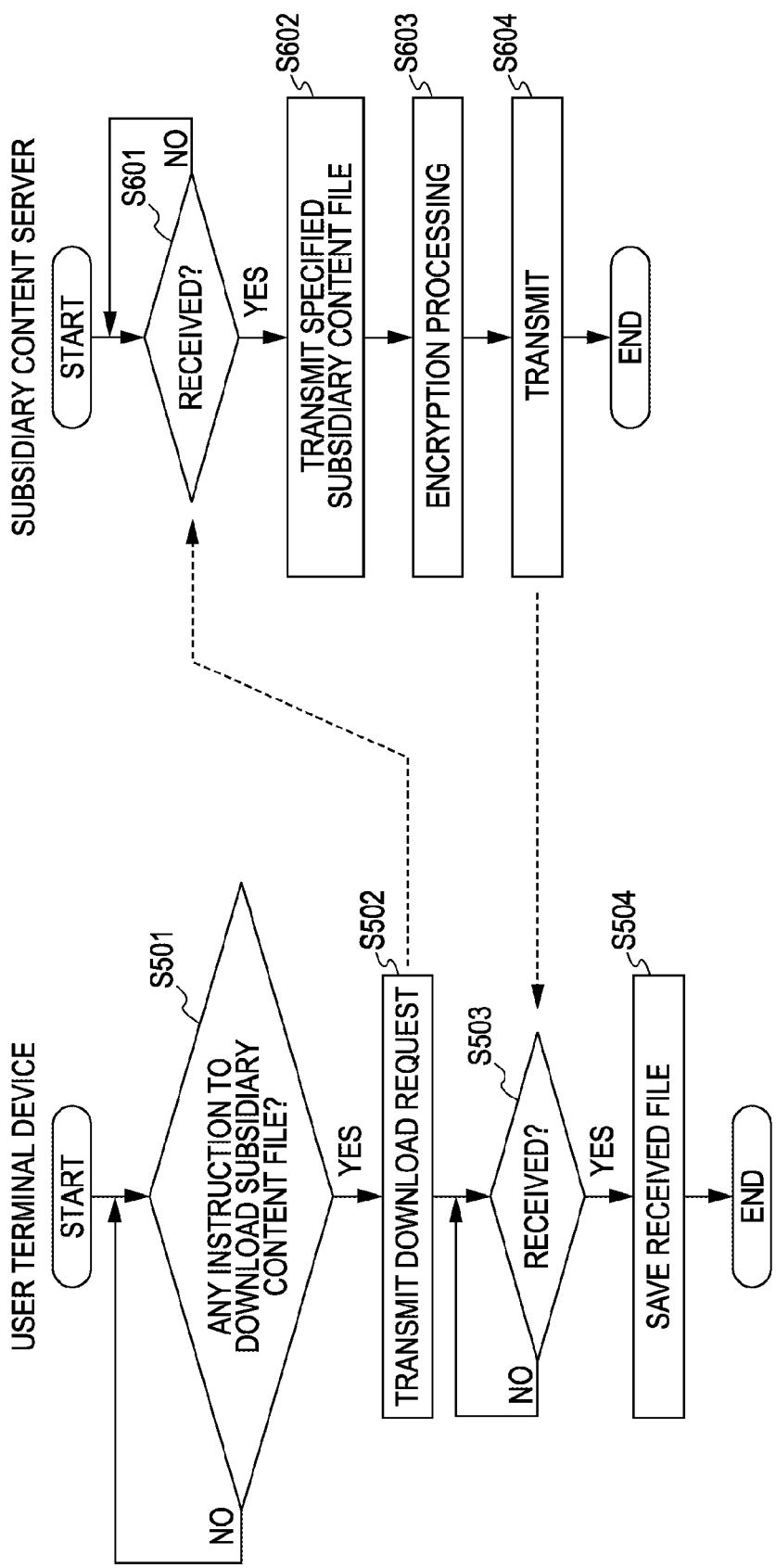
FIG. 21 is a flowchart illustrating downloading subsidiary contents by the user terminal device, and an example of processing procedures by the subsidiary content server in response.

The flowchart in FIG. 21 illustrates a processing procedure example relating to downloading of the subsidiary content by the user terminal device 4, and a processing procedure example at the subsidiary content server 2 corresponding thereto. The processing at the user terminal device 4 in the drawing as well is primarily realized by programs serving as the subsidiary content managing processing unit 115 and content transfer processing unit 116.

First, in step S501, the user terminal device 4 side is awaiting obtaining of a command instructing downloading of a subsidiary content file. Here, let us say that for example, the user accesses a download site (Web site) proceeded by the subsidiary content server 2 for download of the subsidiary content, as an operation as to the content managing/creating tool 101, and causes display of a list of downloadable (shared) subsidiary contents. Further, let us say that the user selects one or more subsidiary contents which the user desires to download from the list, and performs operations for executing downloading. In response to this, a positive determination result will be obtained in step S501, and the flow proceeds to step S502.

In step S502, a download request is transmitted to the subsidiary content server 2 in response to a download instructing having been obtained. Note that as for this download request, information equivalent to specifying the directory (saving location) of the subsidiary content selected at the time of operation of the download execution instruction for example, is also included. Note that an arrangement may be conceived wherein instead of the saving location, a download request is made specifying the subsidiary content ID of the subsidiary content file which is the actual entity of the subsidiary content and so forth, for example.

The subsidiary content server 2 is awaiting for a download request to be received in step S601, and upon an download request being received, executes the procedures in step S602. Note that in order to actually transition to step S602 after receiving a download request as well, authentication processing and the like transpires, but such processing procedures are omitted here as well.

In step S602, the subsidiary content database 22a of the storage unit 22 is accessed and the specified subsidiary content file is searched for, and the searched subsidiary content file is transmitted to the requesting user terminal device 4 in step S604.

The user terminal device 4 which has transmitted the download request in step S502 awaits in step S503 for the subsidiary content file according to the download request to be received. Upon determining that the subsidiary content file has been received, in step S504, the received subsidiary content file is saved and managed in an appropriate directory.

Figure 22:
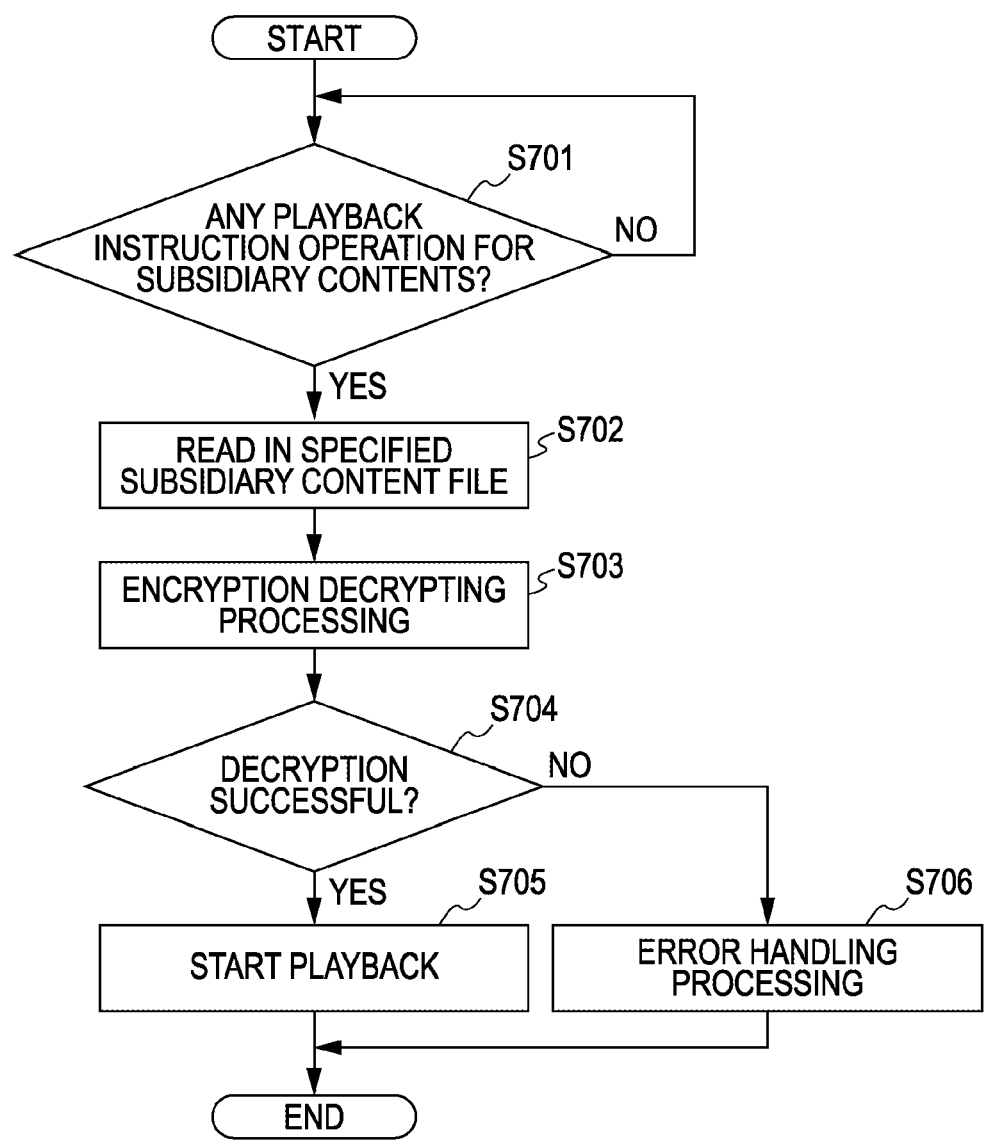
FIG. 22 is a flowchart illustrating an example of playing processing procedures of subsidiary contents by the user terminal device.

The flowchart in FIG. 22 illustrates a processing procedure example of the user terminal device 4 to play the subsidiary content obtained by downloading (saved in HDD 48), and the processing of the user terminal device 4 in this drawing is realized by programs primarily serving as the subsidiary content managing processing unit 115, encryption/decryption processing unit 119, and playback output processing unit 120.

First, in step S701, obtaining of a playback start instruction regarding the subsidiary content file saved in the HDD 48 is awaited. Now, let us say that for example, as an operation as to the GUI provided by the subsidiary content managing processing unit 115, one subsidiary content is selected from the subsidiary contents saved in the HDD 48, and an instruction is given to start playing. In response to this, a positive determination result is obtained in step S701, and the flow proceeds to step S702.

In step S702, the subsidiary content file corresponding to the specified subsidiary content is read in from the HDD 48. Here, the subsidiary content data obtained by downloading is saved in the HDD 48 with the encryption at the time of transfer left. Accordingly, in the next step S703, processing for decrypting the read in subsidiary content data is executed by the encryption/decryption processing unit 119.

In step S704, determination is made regarding whether or not the encryption decrypting processing in the above step S703 has been successful. For example, in the event that the subsidiary content data regarding which starting of playing has been specified this time in step S701 has been legitimately downloaded from the content server 2, the decrypting processing in step S703 will be successful and proper subsidiary content data will be restored.

Conversely, in the event that the subsidiary content data has been obtained by some way other than downloading from the subsidiary content server 2 for example, either encryption has been performed with another method or algorithm, or no encryption has been performed. In this case, depending on the decrypting processing in step S703, either proper subsidiary content data is not restorable, or decrypting processing is inapplicable. That is to say, as for the results of the decrypting processing in step S703, this can be viewed as failing, including cases that decrypting processing is inapplicable.

In the event that positive determination results have been obtained that the decrypting processing has been successful in step S704, the flow proceeds to step S705, and playback control processing regarding the subsidiary content is started. That is to say, the generating/interpreting processing unit 118 interprets the playback control information to be played and determines a playing sequence, and controls the playback signal processing of the playback output processing unit 120 such that the actual content data portion of the primary content is sequentially played following the playing sequence.

Conversely, in the event that a negative decryption result has been obtained in step S704 that the decrypting processing has failed, the flow proceeds to step S706, and error handling processing is executed. As for this error handling processing, first, playback control processing regarding the subsidiary content regarding which playback has been specified this time is kept from being started, and thereupon for example, control processing for notifying on a GUI that the subsidiary content regarding which playback has been specified this time is unauthorized and unplayable, and so forth, is executed.

By such processing being executed for example, with the present embodiment, only subsidiary content information externally obtained which has been legitimately downloaded and obtained from the subsidiary content server 2 is played at the user terminal device 4, whereby the copyright of the primary content or subsidiary content is fully protected.

Note that as for an arrangement for playing and outputting only subsidiary content legitimately downloaded from the subsidiary content server 2, other arrangements can be conceived. For example, a configuration may be conceived wherein encryption is decrypted beforehand at the point of the user terminal device 4 receiving and obtaining as a download, and is stored in the HDD 48 with the decryption result information attached thereto, and at the time of playing, the attached information of the decryption results is referred to, so as to make determination regarding whether or not to play the subsidiary content. Also, an arrangement may be made wherein a special code indicating that transmission has been made for downloading is embedded in the subsidiary content as processing at the subsidiary content server 2 side at the time of transmission from the subsidiary content server 2, and at the time of playing, presence/absence of this code, and the content thereof and so forth is confirmed at the user terminal device 4 side, so as to determine whether or not to start playing.

Now, with a content creating/sharing system such as with the present embodiment, the number of subsidiary contents shared among users, i.e., the number of subsidiary content files which the subsidiary content server 2 stores and manages, can be massive. In the event that the number of subsidiary contents is massive in this way, it can be conceived that there will be great disparity in the quality of the content of contents in actual practice. That is to say, a situation wherein while one subsidiary content has very high quality in the content of the contents, and is very highly evaluated among user with great popularity, and on the other hand another subsidiary content has poor quality and few users deem it commendable, is very likely to occur.

Taking this into consideration, it is desirable to apply some sort of service to the content creating/sharing system wherein a degree of importance is set reflecting the quality of the content of the content, evaluation thereof, popularity, or the like, for the subsidiary content stored and managed in the subsidiary content server 2.

While various techniques for obtaining importance can be conceived, one is to take note of the fact that the subsidiary content is a secondary work of art, and accordingly importance can be set for each subsidiary content based on the state of secondary usage by other subsidiary content. This will be described now.

Now, comprehending the state of secondary usage of a certain content by other subsidiary contents can be reinterpreted as meaning that, with an original content as an original parent, the relation of subsidiary contents in subsequent generations in light of parent-child relation, and the configuration of the family under this patriarchic content as the apex (relation and configuration of the generations) is comprehended.

As described earlier, the subsidiary content file to be handled with the present embodiment has used content information (used source editing material content information and used editing material content information) shown in FIG. 16, and present content generation information. This information may only be information relating to generations of subsidiary contents but this information can be used to realize processing such as generation searching of contents for example, within a system related to generation management.

Figure 23:
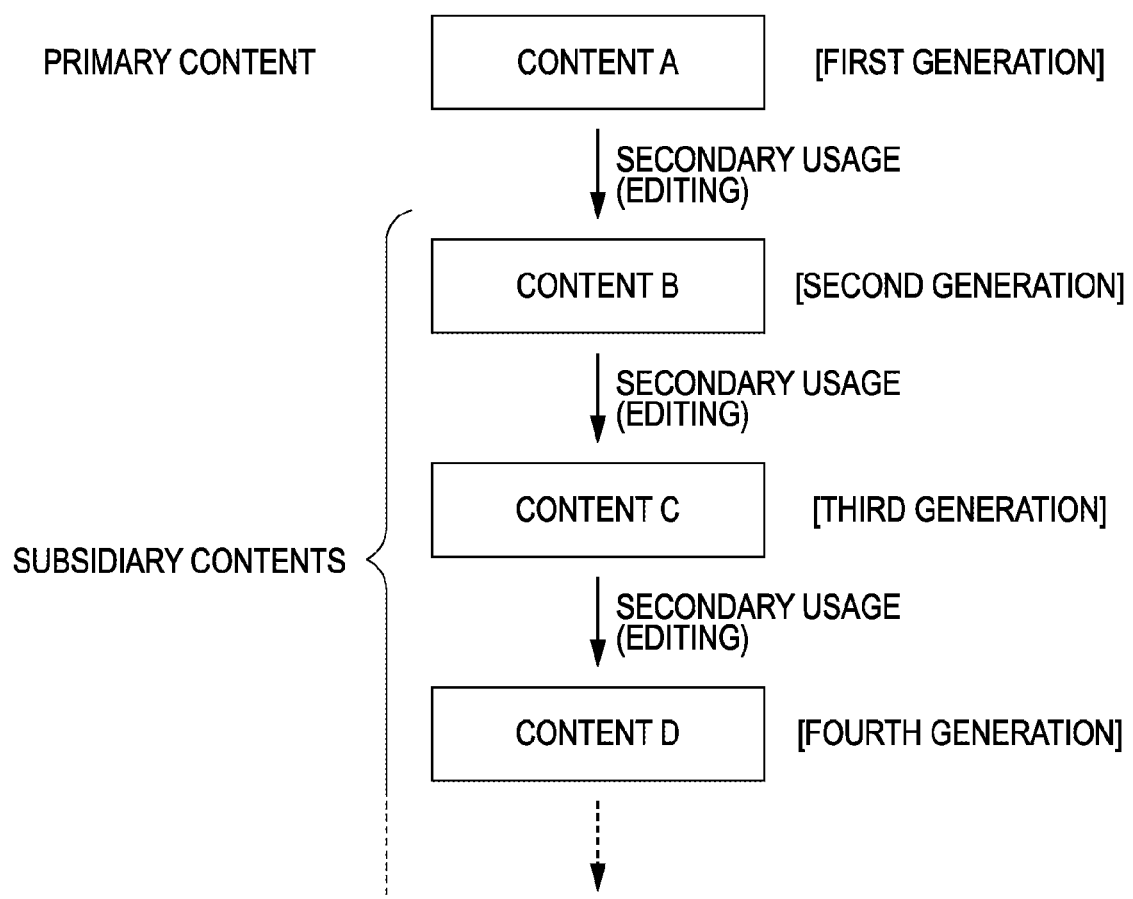
FIG. 23 is a diagram illustrating an example of a basic rule regarding definition of generations of contents with the content creating/sharing system according to the present embodiment.

FIG. 23 is a diagram schematically illustrating the basic idea regarding content generations in a content creating/sharing system. FIG. 23 shows a content A first as the primary content. With the present embodiment, the primary content is defined as being a first-generation content, based on the idea that the primary content is a patriarchic content which has not been secondarily created from an editing material content with the content creating/sharing system according to the present embodiment. Accordingly, the content A which is the primary content is a first-generation content.

Now, let us say that the user has performed secondary usage of the content A as a direct editing material (directly used content), and created a content B which is a new subsidiary content. Now, we will view the relation between the new subsidiary content and the editing material content (directly used content) used in a secondary manner to create the new subsidiary content as a direct parent-child relation. This means that since the subsidiary content which is the content B has been obtained by secondary usage of the first-generation primary content, the generation of the content B is the second generation, which is the generation following the first generation.

In the same way, a content C which is subsidiary content created by secondary usage of the second-generation primary content is of the third generation, due to secondary use the second-generation content. Further, a content D which is subsidiary content created by secondary usage of the third-generation primary content is of the fourth generation, due to secondary use the third-generation content. Subsequently, in the same way, each time subsidiary content of a subsequent generation is created by secondary use, a variable N in the "N'th generation" is incremented one at a time. The present content generation information in the subsidiary content file header information stores a value corresponding to the above variable N for example, as information indicating the generation regarding the present content file.

Figure 24:
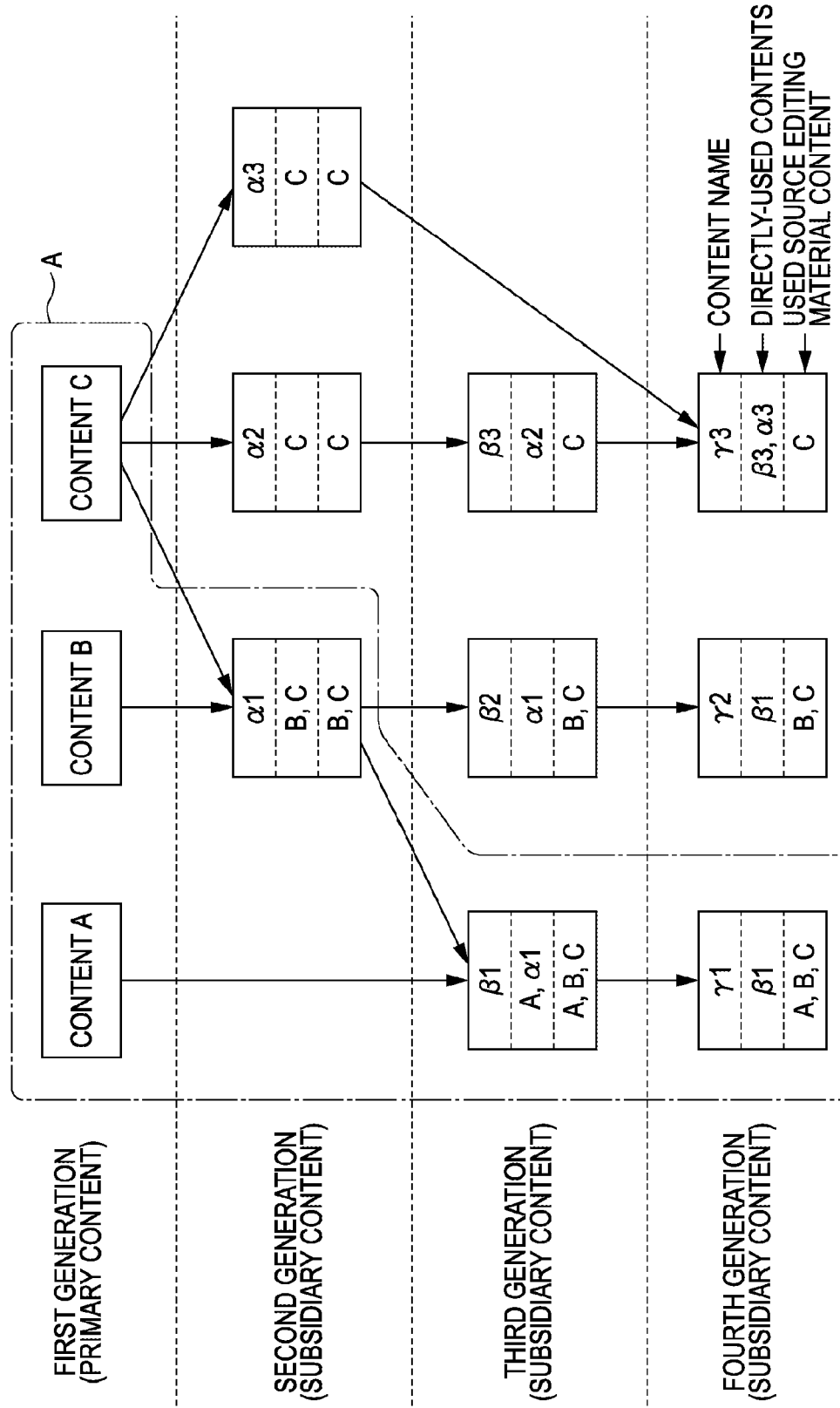
FIG. 24 is a diagram illustrating an example of a basic rule regarding definition of generations of subsidiary contents with the content creating/sharing system according to the present embodiment.

Also, in actual practice, there are often cases wherein a subsidiary content secondarily uses two or more directly used contents. FIG. 24 shows an example of rules for setting generations relating to new subsidiary contents. Note that in FIG. 24, each of the subsidiary contents of the second generation and on are indicated by three types of information. The top tier shows a name uniquely identifying the content (content name: equivalent to content ID), the middle tier shows a breakdown of directly used contents based on the used editing material content information (used editing material contents), and the bottom tier shows a breakdown of the used editing material contents based on used source editing material content information.

In FIG. 24, contents A, B, and C are shown as first-generation contents (i.e., primary contents). A value indicating that the content is a first-generation content (i.e., N=1) is stored in the present content generation information in the header information of the contents A, B, and C.

Next, a content α1 is shown as a subsidiary content created secondarily using the contents B and C. The content α1 uses contents B and C as the editing material contents (parent contents), but these contents are both primary contents and accordingly are first generation. Accordingly, the content α1 are of the second generation, which is the generation following the first generation. In accordance with this, data indicating the second generation is stored in the present content generation information in the header information of the subsidiary content which is the content α1.

Also, at the time of creating the subsidiary content which is the content α1, the content creating/sharing application 100 generates the used editing material content information indicating that the directly used contents are contents B and C, and generates the used source editing material contents so as to indicate that the primary contents serving as source editing material (used source editing material content information) are the contents B and C. Further, a value indicating that the content is a second-generation content (i.e., N=2) is stored in the present content generation information.

Also, a content α2 is a subsidiary content created by secondary usage of the content C along as editing material. The content C is first generation (primary content), is the content α2 is set to second generation. In the same way, content α3 is also a subsidiary content created with only content C as the editing material, and accordingly, is set to second generation.

Used editing material content information is generated indicating that with both contents α2 and α3, the directly used content is only the content C, and used source editing material content information is generating indicating that the used source editing material content is only the content C. Also, a value indicating that the content is a second-generation content (i.e., N=2) is stored in the present content generation information.

Next, a content β1 is a subsidiary content generated by secondary usage of the content A and the content α1 as the editing material thereof. Now, the content A is first generation, while the content α1 is second generation. Comparing the two, the content α1 comes after the content A. Accordingly, the content β1 is set to the third generation, since it is of a generation which follows the content α1 which is the later generation. That is to say, with the present embodiment, a subsidiary content from directly used contents of different generations is set as a newly-created subsidiary content of a generation following the latest of the directly used contents.

Now, the used editing material content information of the content β1 is generated showing that the directly used contents are the contents and α1. The used source editing material contents of the content α1 are B and C, so it can be recognized that the content β1 uses the content A and the contents B and C as the source editing material contents. The used source editing material content information is generated indicating that the source editing material contents are the three of contents A, B, and C. Also, a value indicating that the content is a third-generation content (i.e., N=3) is stored in the present content generation information.

A content β2 is a subsidiary content created by secondary usage of only the second-generation content α1 as the directly used content, and accordingly is set as third generation. A content β3 also is a subsidiary content created by secondary usage of only the second-generation content α2 as the directly used content, and accordingly is set as third generation.

The used editing material content information of the content β2 is generated so as to show that only the content α1 is the directly used content, and the used source editing material content information is generated indicating that the source editing material contents are contents B and C, taking up after content α1. A value indicating that the content is a third-generation content (i.e., N=3) is stored in the present content generation information.

The used editing material content information of the content β3 is generated so as to show that only the content β2 is the directly used content, and the used source editing material content information is generated indicating that the source editing material content is only content C, taking up after content α2. A value indicating that the content is a third-generation content (i.e., N=3) is stored in the present content generation information.

A content γ1 is a subsidiary content created by secondary usage of only the third generation content β1 as the directly used content, and accordingly is set as fourth generation. Accordingly, the used editing material content information for the content γ1 is set showing that the directly used content is only content β1, and the used source editing material content information is set showing that the source editing material contents are contents A, B, and C, taking up after content β1. A value indicating that the content is a fourth-generation content (i.e., N=4) is stored in the present content generation information.

Also, a content γ2 is a subsidiary content created by secondary usage of only the third generation content β2 as the directly used content, and accordingly is set as fourth generation. The used editing material content information for the content γ2 is set showing that the directly used content is only content β2, and the used source editing material content information is set showing that the source editing material contents are contents B and C, taking up after content β2. A value indicating that the content is a fourth-generation content (i.e., N=4) is stored in the present content generation information.

Also, a content γ3 is a subsidiary content created by secondary usage of the third generation content β3 and second generation content α3 as the directly used content. Accordingly, following the earlier-described rule for generation definition, the content γ3 is set so as to be fourth generation, following the third generation which is the latest of the directly used contents. Accordingly, a value indicating that the content is a fourth-generation content (i.e., N=4) is stored in the present content generation information.

The used editing material content information for the content γ3 is set showing that the directly used content is contents β3 and α3, and the used source editing material content information is set showing that the source editing material content is just content C. This is because while contents β3 and α3 have different editing results for example, the source editing material thereof is only content C.

Now, let us consider the fourth-generation content γ1 in FIG. 24. The subsidiary content playback control file has information relating to the parent content (directly used content) directly used secondarily for creating itself in the used editing material content information, and in the case of this content γ1, the used editing material content information shows that the directly used content is only the content β1.

Next, looking that the used editing material content information of the content β1, it can be seen that the directly used contents used for creating the content β1 are content A and content α1. Accordingly, of the content A and content α1 which are the directly used contents of the content β1, the content A is a primary content, meaning that we have traced back to the first generation. Also, we can see from the used editing material content information of the content α1 which is a subsidiary content, that the contents B and C are used secondarily as directly used contents. The contents B and C are both primary contents, meaning that we have traced back to the first generation.

The flow so far can be viewed as tracking the genealogy of the generations of the directly used contents for obtaining the content γ1, all the way back to the first generation. As a result, the generation range A shown in the single-dot broken line in FIG. 24 can be recognized. That is to say, if we view the editing material content and the subsidiary content obtained by secondary use of the editing material content as being in a parent-child relation, FIG. 24 shows the parent-child relation starting from the content γ1 back to further past generation contents in a clearly-recognizable manner.

This, with the present embodiment, by correlating each subsidiary content with information indicating what the editing material content thereof is (used editing material content information), the genealogy (generation configuration) of the generations regarding a subsidiary content can be traced (generation search).

Figure 25:
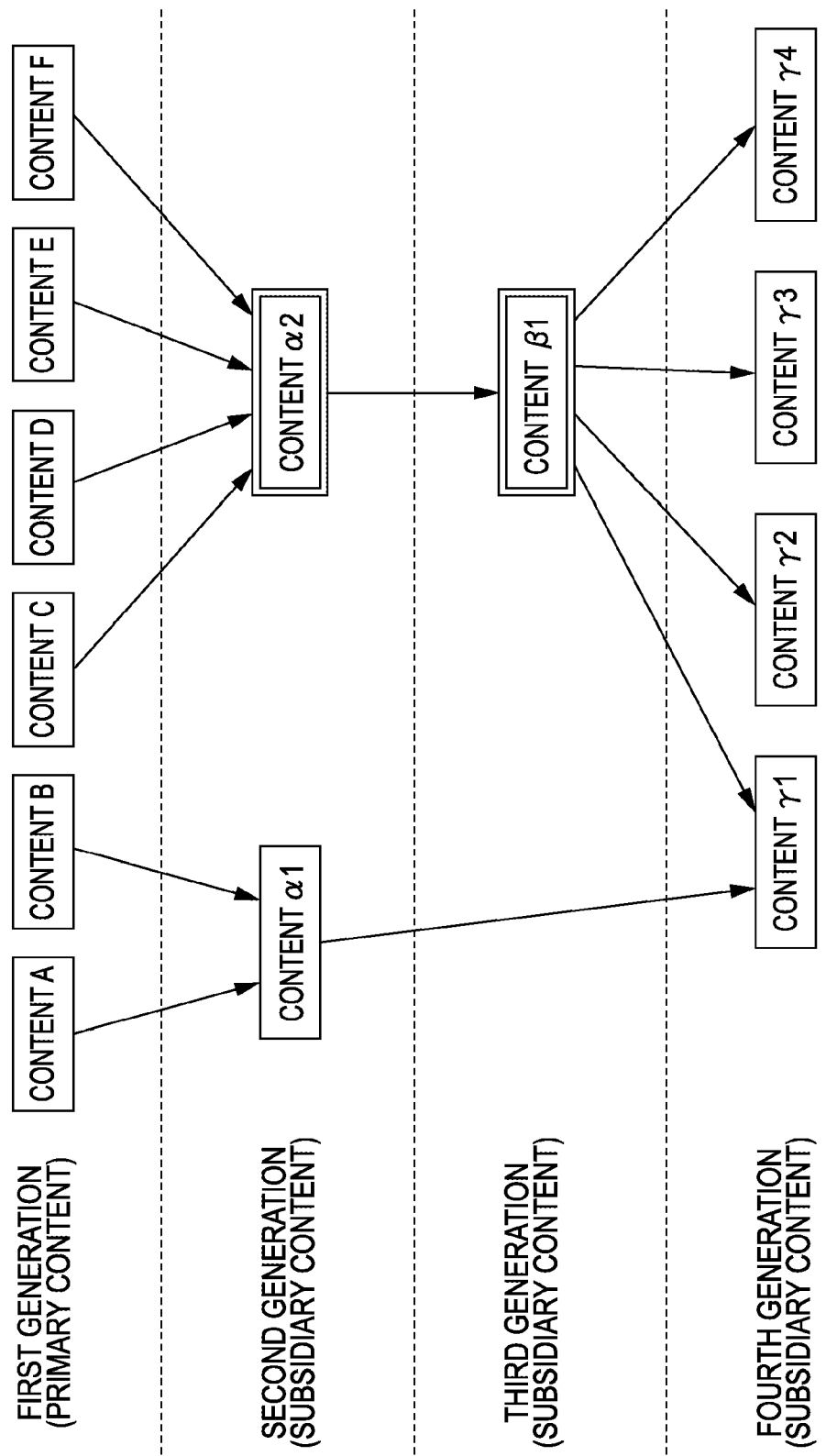
FIG. 25 is a diagram for describing a basic concept of importance setting based on generation relation of subsidiary contents (secondary usage state by other subsidiary contents)

Next, the basic concept of setting importance based on generation relation of subsidiary contents, i.e., the secondary usage state by other subsidiary contents, will be described with reference to FIG. 25. FIG. 25 shows a generation hierarchy regarding content groups within a certain generation range, following the form shown in FIG. 24.

In the case of FIG. 25, first, the first-generation primary contents shown are the six of content A, content B, content C, content D, content E, and content F.

Next, shown as second generation subsidiary contents are the two of content α1 and content α2. The content α1 is created by secondary use of the content A and content B, which are both first-generation contents, as directly used contents (in this case, also editing material contents as well). Also, the content α2 is created by secondary use of the content C, content D, content E, and content F, which are all first-generation contents, as directly used contents (in this case, also editing material contents as well).

As for third-generation subsidiary contents there is one content β1. This content β1 is in a generational relation with other contents (in a state of secondary usage by other contents), but itself has been created secondarily using only the second-generation content α1 as the directly used content thereof.

As for the fourth generation, there are four subsidiary contents, which are content γ1, content γ2, content γ3, and content γ4. Content γ1 is created by secondary usage of the second-generation content α1 and the third-generation content β1 as the directly used contents thereof. Content γ2 is created by secondary usage of the third-generation content β1 alone as the directly used content thereof. Contents γ3 and γ4 also are created by secondary usage of the third-generation content β1 alone as the directly used content thereof.

Here, to facilitate description, we will think of the generation range of the subsidiary contents stored and managed in the subsidiary content server being limited to a range formed by the subsidiary content group from the second generation on in FIG. 25 (i.e., from the second through fourth generations).

First, let us consider content β1. We see that this content β1 has four splits from itself to its direct children, i.e., next-generation contents of its direct children when it is viewed as being a parent. Comparing this with other subsidiary contents, the content α1 and content α2 each have one subsidiary content as a direct child. Further, the fourth generation is the last generation here, so the number of directly child contents is zero for the content γ1 through content γ4.

In light of the above comparison, we can see that of all the subsidiary contents which the subsidiary content server 2 manages, the content β1 has the greatest number of direct child contents.

Now, we can reason that a certain content has a great number of subsidiary content which are direct children because that subsidiary content is high in quality or is popular, and accordingly secondarily used by many creators as directly used contents. With the present embodiment, we will introduce an idea and concept in setting importance based on the state of secondary usage by other subsidiary contents which is to say that "a subsidiary content having a great number of direct child subsidiary contents is high in importance", which we will call "first importance setting concept".

Next, let us consider content α2. This content α2 has only one direct child subsidiary content, content β1. However, content α2 is the direct parent of the content β1, so the fourth-generation contents which are the grandchild contents of the content α2 are the content γ1 through content γ4.

This content β1 is deemed to have high importance, based on the above first importance setting concept, but in this case, we can say that the content β1 would have not been created unless the content α2 was existing before. Thus, we can say that the content β1 had many children because the content α2 which is the directly used content thereof, which is the basis for creation, actually had good-quality and valuable content of contents, for example. That is to say, we can assume that a subsidiary content parent which leads to a subsidiary content having a great number of direct child subsidiary contents also has high importance. Accordingly, with the present embodiment, we will introduce a concept which is to say that "a parent subsidiary content of a subsidiary content having a great number of direct child subsidiary contents is high in importance", which we will call "second importance setting concept".

Figure 26:
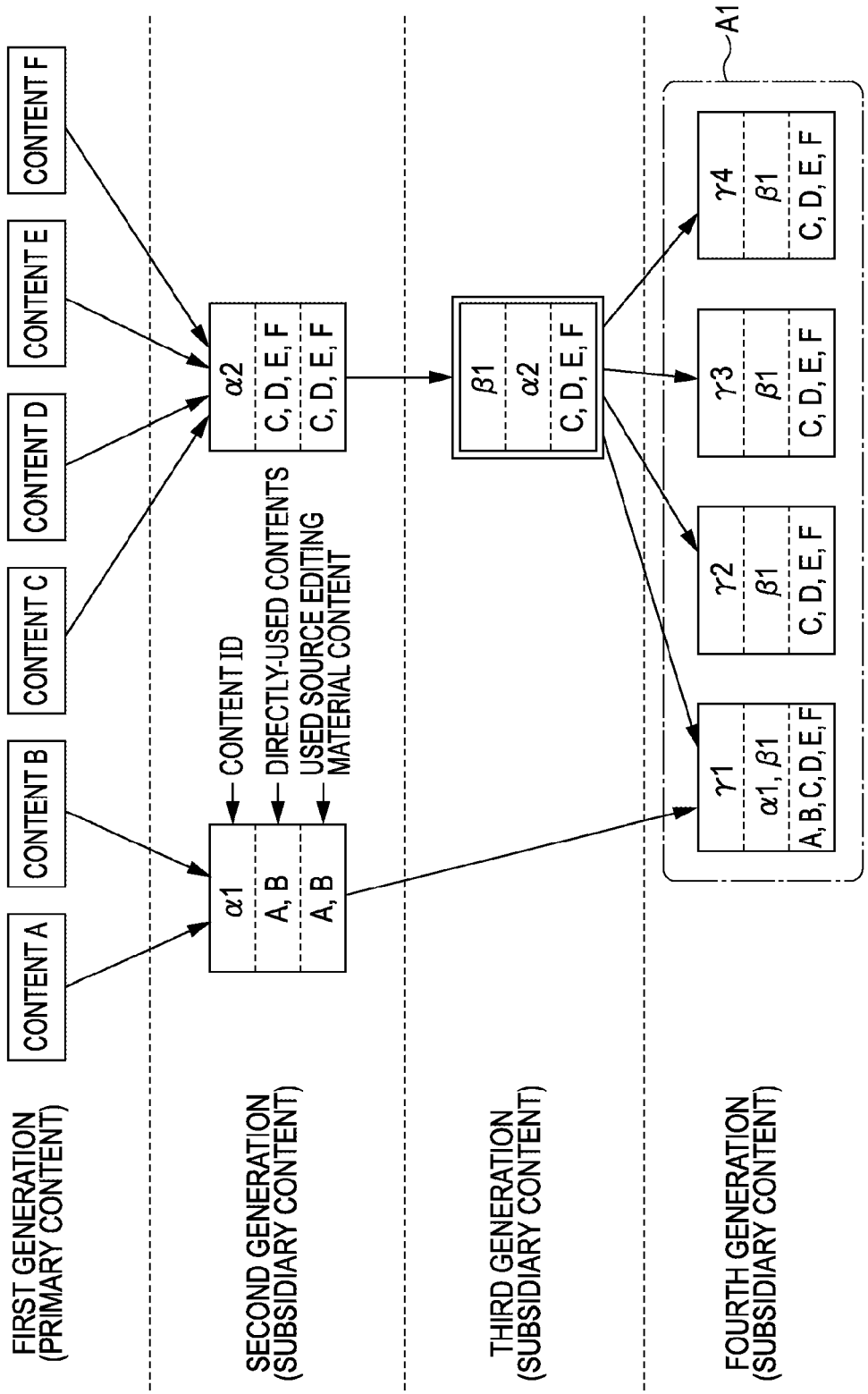
FIG. 26 is a diagram schematically illustrating an example of an algorithm for obtaining an evaluation value based on a first importance setting concept.

First, FIG. 26 shows an example of a technique of obtaining evaluation values based on the first importance setting concept. There, "evaluation value" is equivalent to the importance corresponding to the first importance setting concept. Also, FIG. 25 shows the same generation configuration of primary contents and subsidiary contents as with FIG. 26, except that the subsidiary contents in FIG. 26 show a content ID of itself shown in the header information, a breakdown of directly used content indicated by used editing material content information, and a breakdown of primary contents serving as editing material content, indicated by used source editing material content information.

While various techniques can be conceived for obtaining evaluation values based on the first importance setting concept, i.e., importance, the simplest example is shown in FIG. 26.

First, description will be made regarding the third-generation content β1. Here, the content β1 has as the direct children thereof content γ1 through content γ4, which are encompassed by the single-dot broken line A1 in FIG. 26. In this case, the number of subsidiary contents as direct children (number of direct children) is used as it is as the evaluation value, meaning that the evaluation value of the content β1 is 4.

In accordance with this, the second-generation content α1 has only content γ1 as the direct child, and accordingly the evaluation value thereof is 1. Also, the second-generation content α2 has only content β1 as the direct child, so the evaluation value thereof is 1. Further, the fourth-generation contents γ1, γ2, γ3, and γ4 each are final generations with no children, and accordingly the evaluation value is 0.

The subsidiary content server 2 creates and manages the generation related information 22c using the evaluation values obtained as described above. FIG. 28 shows an example of generation related information 22c created using the evaluation values of each of the subsidiary contents obtained in accordance with the description in FIG. 26 above.

As shown in FIG. 28, the generation related information 22c has a structure wherein the content IDs of subsidiary contents (subsidiary content IDs) registered in the subsidiary content database 22a are correlated with evaluation values. FIG. 26 shows contents α1, α2, β1, γ1, γ2, γ3, and γ4, as subsidiary contents. In FIG. 28, subsidiary contents α1, α2, β1, γ1, γ2, γ3, and γ4 are shown as having been registered. Thereupon, the correlation between the subsidiary content IDs and evaluation values is made as follows, in accordance with the description of FIG. 26.

That is to say, an evaluation value of 1 is correlated with the subsidiary content ID α1, an evaluation value of 1 is correlated with the subsidiary content ID α2, an evaluation value of 4 is correlated with the subsidiary content ID β1, an evaluation value of 0 is correlated with the subsidiary content ID γ1, an evaluation value of 0 is correlated with the subsidiary content ID γ2, an evaluation value of 0 is correlated with the subsidiary content ID γ3, and an evaluation value of 0 is correlated with the subsidiary content ID γ4.

In the event of the subsidiary content server 2 actually performing processing for creating the generation related information 22c shown in FIG. 28 following the concept shown in FIG. 26, the following processing can be executed, for example. That is to say, used editing material content information for each subsidiary content registered in the subsidiary content database 22a is referred to, and statistics are obtained regarding the total number of subsidiary contents shown in each used editing material content information. The used editing material content information indicates the directly parent content of the present subsidiary content, so obtaining the total number for each of the subsidiary contents of the directly-used contents yields the evaluation value for each subsidiary content.

Figure 27:
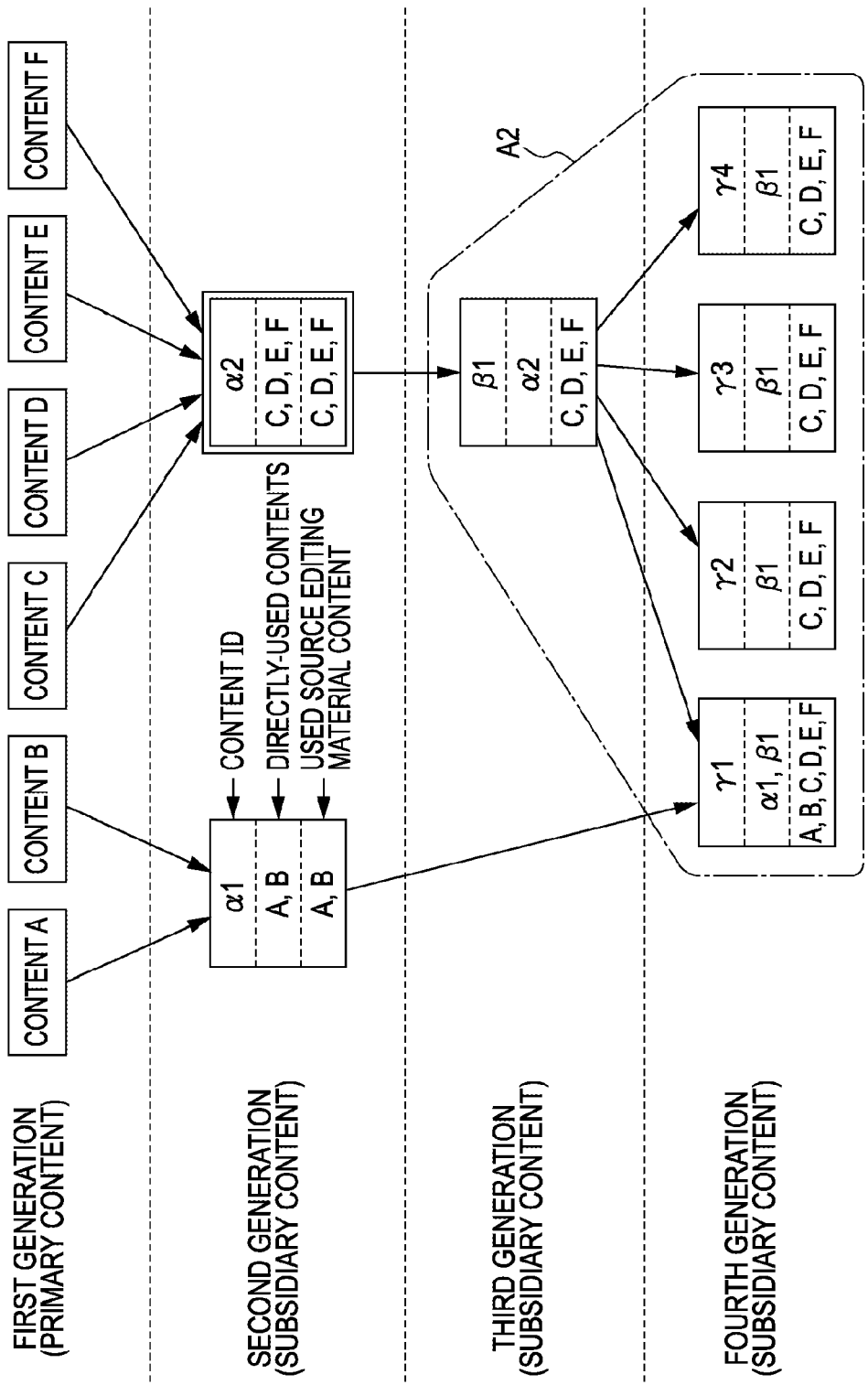
FIG. 27 is a diagram schematically illustrating an example of an algorithm for obtaining an evaluation value based on a second importance setting concept.

Next, a technique and concept for obtaining evaluation values based on the second importance setting concept will be described with FIG. 27. With this FIG. 27 as well, the generation configuration of the primary contents and subsidiary contents is shown, as with FIG. 25. Further, we will assume with this case as well that all subsidiary contents registered in the subsidiary content database 22a are shown in FIG. 27.

Also, each subsidiary content shows a content ID of itself shown in the header information, a breakdown of directly used content indicated by used editing material content information, and a breakdown of primary contents serving as editing material content, indicated by used source editing material content information.

In this case as well, the simplest algorithm for obtaining evaluation values based on the second importance setting concept will be shown, though various ways of obtaining the evaluation value based on the second importance setting concept can also be conceived, including complex techniques.

This second importance setting concept states that "a parent subsidiary content of a subsidiary content having a great number of direct child subsidiary contents is high in importance". Viewing this from another perspective, we can rephrase this to say that "a patriarchic parent subsidiary content having a great number of offspring of itself in subsequent generations is high in importance", in accordance with the second importance setting concept. Accordingly, we will say that the evaluation value based on the second importance setting concept is the total number of offspring carried on into subsequent generations from the patriarchic parent subsidiary content.

In FIG. 27, we will first observe the second-generation content α2. As already described with FIG. 25, the content α2 is a subsidiary content which can be viewed as having high importance, based on the second importance setting concept. The range of contents corresponding to the total number of offspring of the content α2 is shown encompassed by the single-dot broken line A2 in FIG. 27. In this case, the number of subsidiary contents as offspring of α2 is the third-generation content β1, and the contents γ1 m γ2, γ3, and γ4, which are the children of content β1 and accordingly the grandchildren of α2, meaning an evaluation value of 5. Accordingly, the total number of offspring of the content α2, i.e., the evaluation value following the second importance setting concept, is 5.

In accordance with this, the second-generation content α1 has only content γ1 which is a direct child, as the offspring thereof, so the evaluation value thereof is 1. Also, the third-generation content β1 has the fourth-generation contents γ1, γ2, γ3, and γ4 as the direct children thereof, so the evaluation value thereof is 4. Further, the fourth-generation contents γ1, γ2, γ3, and γ4 each are final generations with no children, and accordingly the evaluation value is 0.

FIG. 29 shows an example of generation related information 22c created using the evaluation values of each of the subsidiary contents obtained in accordance with the description in FIG. 27 above.

That is to say, an evaluation value of 1 is correlated with the subsidiary content ID α1, an evaluation value of 5 is correlated with the subsidiary content ID α2, an evaluation value of 4 is correlated with the subsidiary content ID β1, an evaluation value of 0 is correlated with the subsidiary content ID γ1, an evaluation value of 0 is correlated with the subsidiary content ID γ2, an evaluation value of 0 is correlated with the subsidiary content ID γ3, and an evaluation value of 0 is correlated with the subsidiary content ID γ4.

In the event of the subsidiary content server 2 actually performing processing for creating the generation related information 22c shown in FIG. 29 following the concept shown in FIG. 27, the following processing can be executed, for example.

First, with regard to one subsidiary content (content regarding which an evaluation value is to be calculated) for example, next-generation subsidiary contents which are the direct children of the content regarding which an evaluation value is to be calculated are searched. At the time of this searching, subsidiary contents showing the content ID of the content regarding which an evaluation value is to be calculated in the used editing material content information (indicating directly used content (direct parent content)) thereof can be searched from the subsidiary content database 22a.

Next, for each content regarding which an evaluation value is to be calculated searched in this way, further-next-generation subsidiary contents having these next-generation contents, which are the direct children of each content regarding which an evaluation value is to be calculated, as the direct parent, are searched. Subsidiary contents are sequentially searched in following generations, until the final generation, at which state the number of contents for each generation searched so far is totaled. This serves as the evaluation value of the content regarding which an evaluation value is to be calculated. For example, such processing is repeated for each subsidiary content registered in the subsidiary content database 22a.

Also, for actually creating and managing the generation related information 22c in practice, evaluation values obtained using one or the other of the first and second importance setting concepts as shown in FIGS. 28 and 29 may be used, or evaluation values obtained using each of the first and second importance setting concepts may be used.

FIG. 30 shows an example of generation related information 22c created in accordance with the latter, corresponding to FIGS. 26 and 27, for example. Here, evaluation values corresponding to the number of direct children (first importance setting concept) and evaluation values corresponding to the number of offspring (second importance setting concept), shown in FIGS. 28 and 29, are correlated with each of the directly used content IDs α1, α2, β1, and γ1 through γ4.

Thus, having multiple types of evaluation values based on multiple importance setting concepts for the generation related information 22c means that the parameters usable for obtaining importance increase accordingly, so higher reliability can be expected for the obtained importance, for example.

With FIG. 27, the range of generations regarding which the number of offspring to be obtained, which is the evaluation value (importance) based on the second importance setting concept, is from the direct child to direct grandchild, with the subsidiary content regarding which an evaluation value is to be calculated as the patriarchic parent. That is to say, the range of generations is three generations. However, the range of generations regarding which the evaluation value is to be calculated may be further expanded. For example, an appropriate range of generations may be set taking into consideration the reliability of the evaluation value, and so forth.

As described above, the most basic techniques for obtaining evaluation values based on the first and second importance setting concepts are as shown in FIGS. 26 and 27. However, in reality, a situation may be conceived wherein a single creator (user) haphazardly creates a considerable number of subsidiary contents by secondary use of the same directly used content. Such subsidiary contents may not be very different one from another, and there may be cases often where the contents individually do not have very high value. In such a case, it would be better not to view the directly used content which is the parent of the haphazardly-created subsidiary contents and so forth as being high in value, and accordingly, viewing importance as not being very high would be one suitable way of viewing the situation.

Based on the above, with the first importance setting concept, we can introduce a concept (first additional concept) that "if the same creator creates subsidiary contents by secondarily using the same content as the directly used content thereof, the importance of the directly used content is not high". Also, with the second importance setting concept, we can introduce a second additional concept that "if the same creator creates subsidiary contents by secondarily using the same content as the directly used content thereof, the importance of the parent of the directly used content is not high, either".

Figure 31:
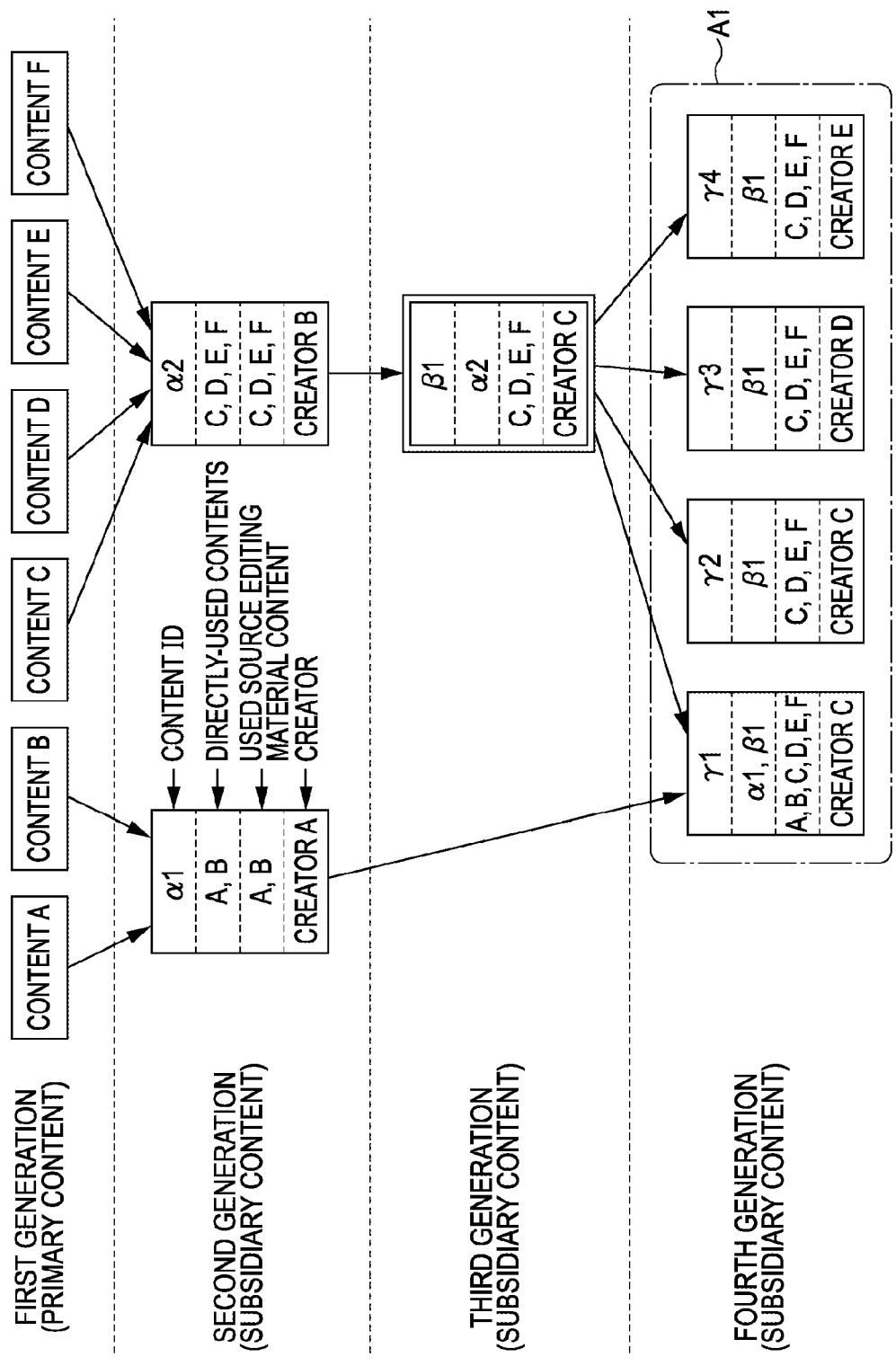
FIG. 31 is a diagram schematically illustrating a modification of an algorithm for obtaining an evaluation value based on the first importance setting concept.

First, an example of obtaining evaluation values in accordance with a case of introducing the above first additional concept for the first importance setting concept will be described with reference to FIG. 31. FIG. 31 shows, in addition to the content ID, directly used content, and used editing material content, for each subsidiary content, the creator (equivalent to creator ID). The information of the creator reflects what is stored in the present content related basic information in the header information.

According to FIG. 31, the relation between each of the subsidiary contents and the creators thereof are as follows.
Content α1: created by creator A
Content α2: created by creator B
Content β1: created by creator C
Content γ1: created by creator C
Content γ2: created by creator C
Content γ3: created by creator D
Content γ4: created by creator E In this case, at the time of obtaining the evaluation value based on the number of direct children, based on the above additional concept, we can apply a rule that "direct child contents of which the creator is the same are handled as one content".

Thus, in the case in FIG. 31, the evaluation value for the content creating/sharing system β1 can be obtained as follows. First, the subsidiary contents which are the direct children of the content β1 in generation relation are the four of contents γ1, γ2, γ3, and γ4. However, of these contents, contents γ1 and γ2 have the same creator, creator C. On the other hand, the contents γ3 and γ4 have creators D, and E, respectively. Accordingly, in this case, of the four contents γ1, γ2, γ3, and γ4, contents γ1 and γ2 are counted as one content, so the evaluation value obtained is 3, for the set of contents γ1 and γ2, and content γ3, and content γ4.

The evaluation values of other subsidiary contents in the case of following the above rule are as follows.
Content α1 has only one direct child content γ1, so the evaluation value thereof is 1.
Content α2 has only one direct child content β1, so the evaluation value thereof is 1.
Contents γ1, γ2, γ3, and γ4 have no direct children, so the evaluation values thereof are 0.

FIG. 33 shows a correlation between the subsidiary content IDs in generation related information and evaluation values, in the case of using evaluation values obtained as described above, details thereof being shown next. That is to say, for the correlation between subsidiary content ID and evaluation value,
Subsidiary content ID α1: evaluation value=1
Subsidiary content ID α2: evaluation value=1
Subsidiary content ID β1: evaluation value=3
Subsidiary content ID γ1: evaluation value=0
Subsidiary content ID γ2: evaluation value=0
Subsidiary content ID γ3: evaluation value=0 subsidiary content ID γ4: evaluation value=0 hold.

Also, in a case based on the first additional concept in the first importance setting concept, an arrangement may be made regarding obtaining evaluation values, wherein first, the rule that "direct child contents of which the creator is the same are handled as one content" (first rule) is applied, and further, another rule that "of contents which are direct children, those which have the same creator for both the child content and the parent content (the content with which the evaluation value is correlated) are eliminated from being an object of evaluation value" (second rule).

In the event that the directly used content (subsidiary content) and the next-generation subsidiary content created by secondary usage of the directly used content are of the same creator, there is a possibility that the creator may be haphazardly creating subsidiary contents based on the directly used content. Accordingly, in such a case, we can consider the importance of the direct child content to not be very high. The second rule is based on such an idea, for example.

Evaluation values which can be obtained using both the first and second rules together are as follows. Taking the content β1 in FIG. 31 as an example, of the four contents γ1, γ2, γ3, and γ4, which are the direct children of the content β1, contents γ1 and γ2 have been created by the same creator as the content β1. The contents β1, γ1, and γ2, have all been created by the creator C here.

In this case, following the above rules, applying the second rule for example, eliminates the contents γ1 and γ2 from being objects of evaluation value, so the contents γ3 and γ4 are the object of evaluation value. Accordingly, the evaluation value of the content β1 as to the contents γ3 and γ4 is 2. Evaluation values regarding the other subsidiary contents are the same as the case of applying only the first rule.

Also, it should be noted that in the case of applying both the first and second rules, and if we say that the contents γ3 and γ4 in FIG. 31 have both been created by the creator D for example, the first rule will be applied and the evaluation value of the content β1 will be 1.

Figure 32:
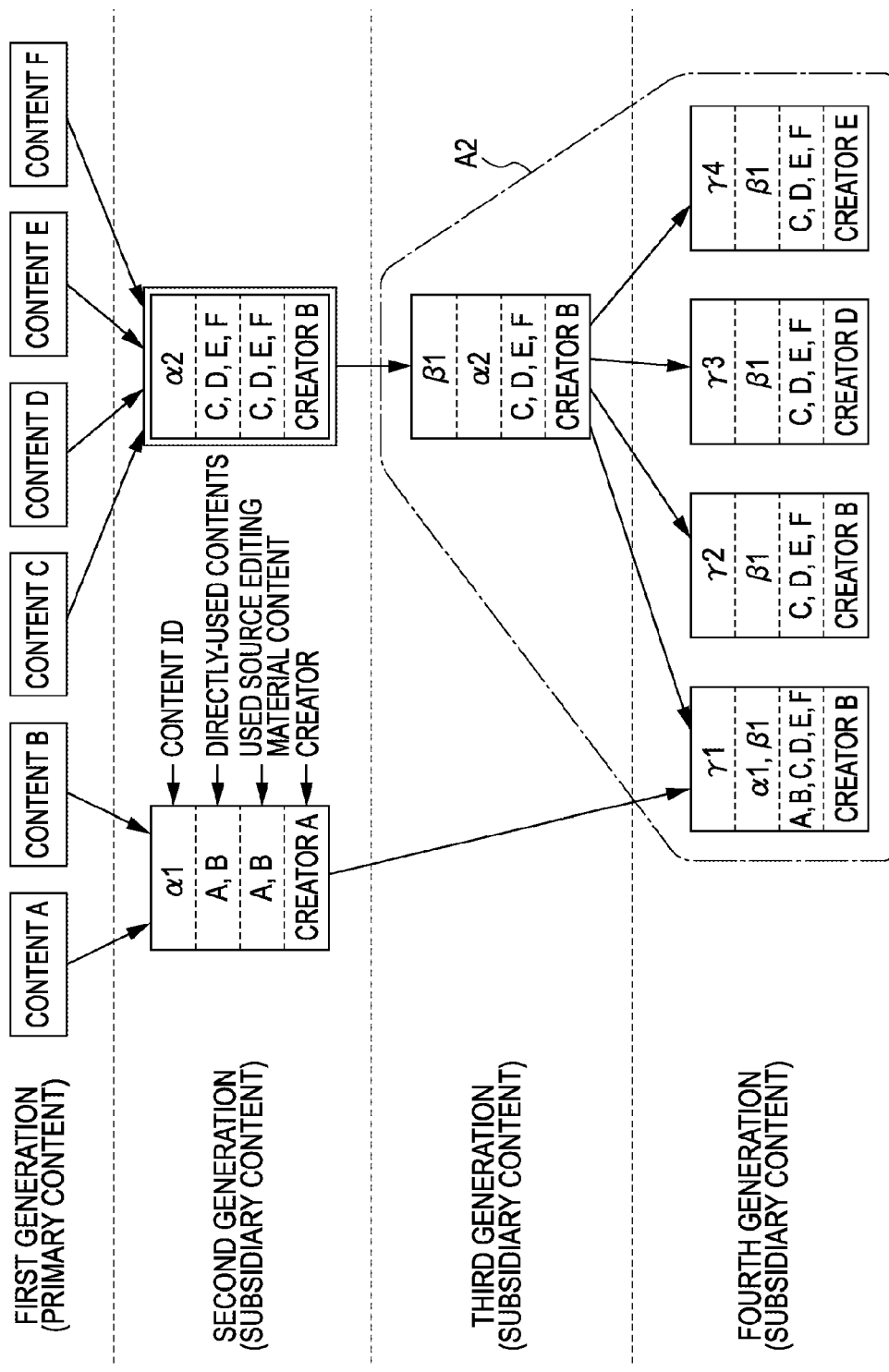
FIG. 32 is a diagram schematically illustrating a modification of an algorithm for obtaining an evaluation value based on the second importance setting concept.

Next, an example regarding how to obtain evaluation values in a case of introducing the second additional concept into the second importance setting concept, will be described with reference to FIG. 32. FIG. 32 shows a content configuration the same as that in FIG. 31, except that the creators of the shown for each subsidiary content differ from those in FIG. 31, for the sake of description.

Content α1: created by creator A
Content α2: created by creator B
Content β1: created by creator B
Content γ1: created by creator B
Content γ2: created by creator B
Content γ3: created by creator D
Content γ4: created by creator E That is to say, here, the creator B has created the four contents of α1, β1, γ1, and γ2.

Now, in obtaining of the evaluation values based on the total number of offspring, based on the second additional concept, the rule that "direct child contents of which the creator is the same are handled as one content" (first rule) is applied.

The evaluation values regarding the content α2 in FIG. 31 in this case are obtained as follows. First, the offspring of the content α2 in generation relation are the five of content β1, and contents γ1, γ2, γ3, and γ4, which are encompassed by the single-dot broken line A2. However, in this case, of the above contents, contents β1, γ1, and γ2 are all created by the creator B, meaning that the creator is the same. On the other hand, the contents γ3 and γ4 have been created by creators D and E respectively. Accordingly, in this case, of the five contents β1, γ1, γ2, γ3, and γ4, contents β1, γ1, and γ2 are counted as one, so the evaluation value ends up being 3.

Also, the evaluation values of the other subsidiary contents in the case of following the above first rule are as follows.

Content α1 has only the direct child γ1 as the offspring thereof, so the evaluation value is 1.

Content β1 has direct children of yl, γ2, γ3, and γ4 as the offspring thereof, but the contents γ1 and γ2 have the same creator B, so the evaluation value is 3.

Contents γ1, γ2, γ3, and γ4 have no direct children, so the evaluation values thereof are 0.

FIG. 34 shows a correlation between the subsidiary content IDs in generation related information and evaluation values, using the evaluation values obtained as described above, details thereof being shown next. That is to say, for the correlation between subsidiary content ID and evaluation value,
Subsidiary content ID α1: evaluation value=1
Subsidiary content ID α2: evaluation value=3
Subsidiary content ID β1: evaluation value=3
Subsidiary content ID γ1: evaluation value=0
Subsidiary content ID γ2: evaluation value=0
Subsidiary content ID γ3: evaluation value=0
Subsidiary content ID γ4: evaluation value=0 hold.

Also, in a case based on the second additional concept in the second importance setting concept, a rule that "offspring contents which have the same creator are handled as a single content" (third rule) can be applied, in the same way as with the first rule described earlier. Further, based on the same idea as the second rule in the case of the first importance setting concept, a rule that "of contents which are offspring, those which have the same creator with which the evaluation value is correlated are eliminated from being an object of evaluation value" (fourth rule).

Evaluation values obtained using both the third and fourth rules under the second importance setting concept are as follows, for example. That is to say, in FIG. 32, of the offspring of the content α2, the three contents β1, yl, and γ2 have been created by the same creator B, as described earlier. Moreover, the patriarchic content of these contents, the content α2, has also been created by the same creator B. In this case, the fourth rule is applied so the contents β1, γ1, and γ2 which have the same creator as the content α2 are eliminated from the object of evaluation value. That is to say, these are not counted in the evaluation value. Accordingly, the evaluation value of the content α2 corresponds only to contents γ3 and γ4, and is 2.

Also, the evaluation values of the other subsidiary contents in the case of applying both the above third and fourth rules are as follows.

Content α1 has only the direct child γ1 as the offspring thereof, so the evaluation value is 1.

Content β1 has direct children of γ1, γ2, γ3, and γ4 as the offspring thereof, but the contents γ1 and γ2 have the same creator B as the content β1, so the fourth rule is applied, and the contents γ1 and γ2 are eliminated form the object of count for the evaluation value. Accordingly, the evaluation value counts only the contents γ3 and γ4, and is 2.

Contents γ1, γ2, γ3, and γ4 have no direct children, so the evaluation values thereof are 0.

Under this second importance setting concept as well, in a case of applying both the third and fourth rules, and if we say that the contents γ3 and γ4 in FIG. 31 have both been created by the creator D for example, the third rule will be applied. Accordingly, the evaluation value of the content α2 is 1, and the evaluation value of the content β1 will be 1.

Thus, with the content creating/sharing system according to the present embodiment, evaluation values, i.e., importance, can be set relating to generations of subsidiary contents, by the subsidiary content server 2, for example. While several applications of importance information of the subsidiary content set in this way can be conceived, a configuration applied to a recommended order setting for recommending subsidiary contents to users will be considered here, as an example.

As described earlier, with the content creating/sharing system according to the present embodiment, the number of subsidiary contents managed by the subsidiary content server 2 can be massive. Also, the user can access a Web site of the subsidiary content server 2, and search and find subsidiary contents. If the user finds an interesting subsidiary content, this can be downloaded and locally held.

Taking this into consideration, with the content creating/sharing system according to the present embodiment, how efficiently the user is going to be able to find suitable subsidiary contents from the massive number of subsidiary contents is important. To handle this, the content creating/sharing system according to the present embodiment is configured so as to be able to efficiently select and extract subsidiary contents suitable and appropriate for each user, and to be able to recommend (present) these to the user. Note that in the following description, subsidiary contents selected and extracted in order to be recommended to the user may also be referred to as "recommended contents".

Now, subsidiary contents extracted for recommendation have a recommendation order set thereto, and recommended contents are presented to the user such that the set recommended order is reflected. According to such a presentation, the user will be able to find subsidiary contents which he/she finds valuable faster and more efficiently than with a case wherein the recommended contents are presented to the user with nor order in particular.

The following is a description regarding a configuration for subsidiary content recommendation according to the present embodiment.

Figure 35:
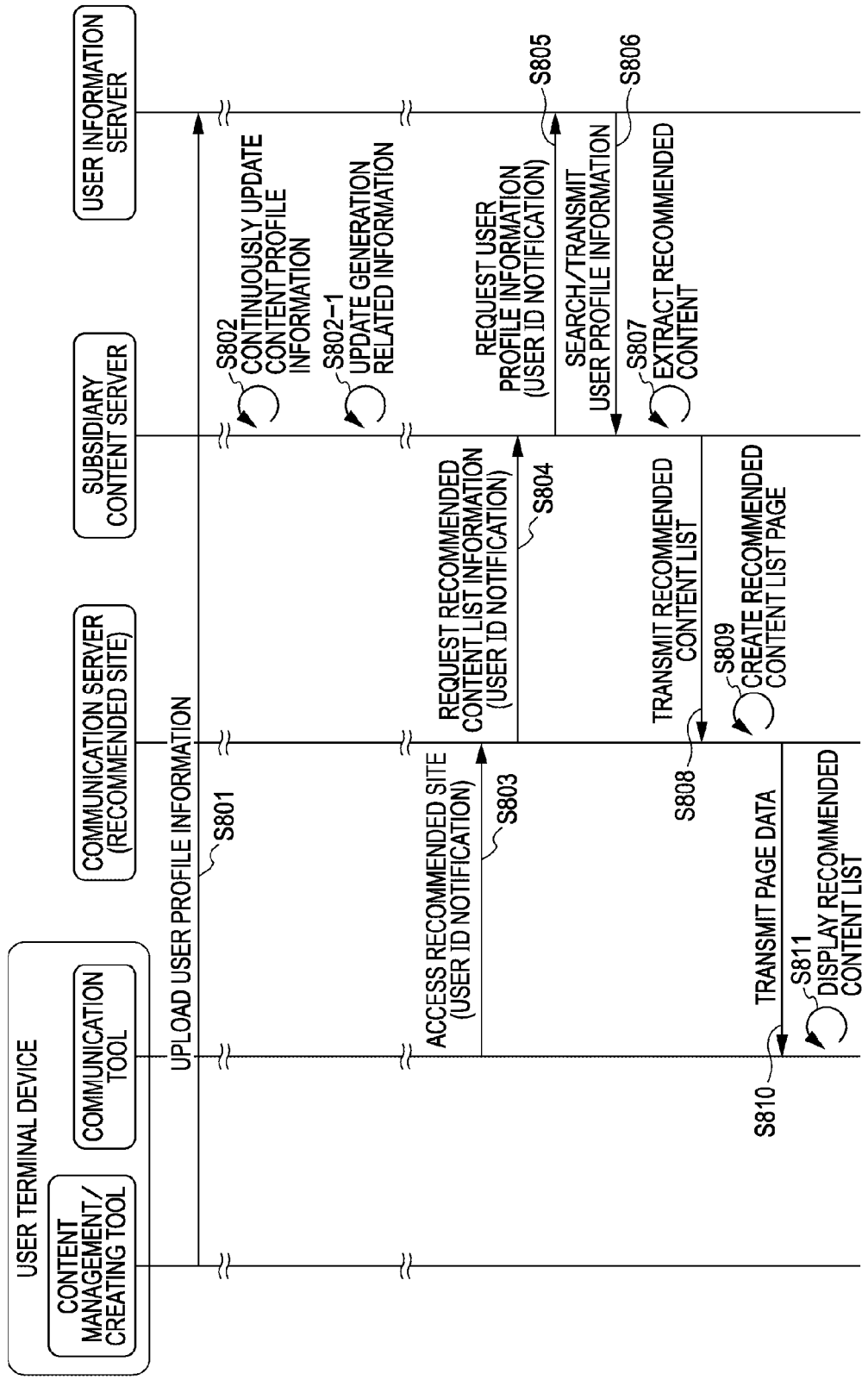
FIG. 35 is a sequence diagram illustrating operations and processing performed with the content creating/sharing system in relation to recommendation of subsidiary contents.

FIG. 35 illustrates an example of operations and processing performed with the content creating/sharing system in relation to recommendation of subsidiary contents.

First, step S801 is processing which the user terminal device 4 and user information server 8 execute regularly at predetermined timings. In this step S801, user profile information stored and managed in the HDD 48 is uploaded to the user information server 8 by the content managing/creating tool 101 of the content creating/sharing application 100 at the user terminal device 4, for example. The user information server 8 registers the received user profile information newly in the user profile database 22b of it is new. Also, in the event that user profile information of the same user (user ID) has already been registered, the registered user profile information is rewritten (updated) with the received user profile information.

The user profile information is made up from predetermined information relating to an individual user using the content creating/sharing application 100. A group of the user profile information makes up the user profile database 52a in the user information server 8.

Figure 36:
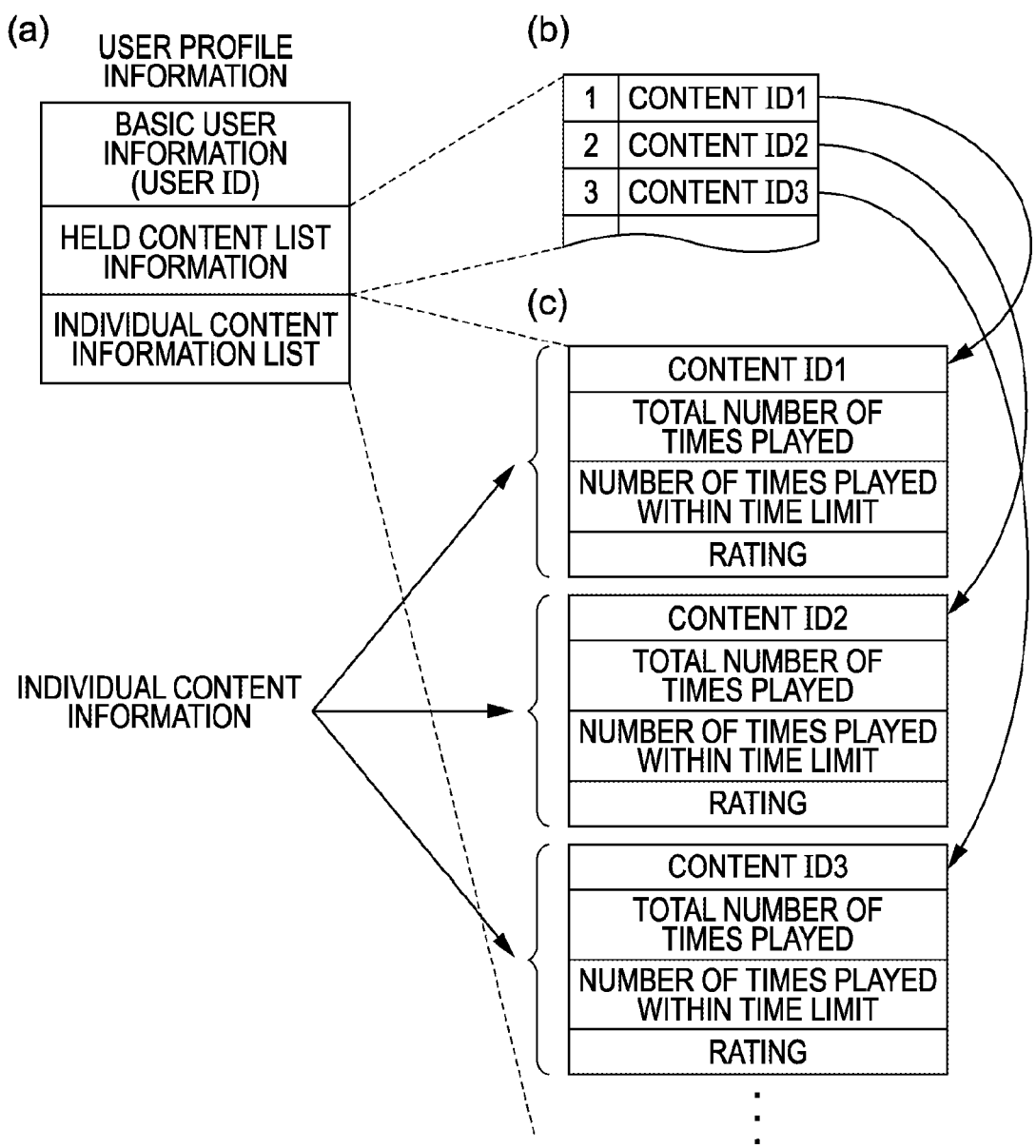
FIG. 36 is a diagram illustrating a configuration example of user profile information.

FIG. 36 shows an example of what is in the user profile information corresponding to one user. First, as shown in (a) in FIG. 36, the user profile information is made up of basic user information, held content list information, and an individual content information list.

The basic user information has predetermined information items indicating basic information about the user, starting with the user ID for example, and including name, age, and so on. The held content list information (held primary content information) is information presenting a list of primary contents which the user possesses, i.e., primary content files (held primary contents) deemed to be held under management of the content creating/sharing application 100 corresponding to the user.

Note that "held" or "possessed" as used here refers to a state wherein a primary content file is stored and managed in a state where it can be viewed as being local as to the content creating/sharing application 100 (user terminal device 4), for example. Also, this implies a state wherein, even if not locally existing, but existing on a server or the like, the primary content file can be accessed and played by the content creating/sharing application 100, for example. Examples of such primary contents include those which can be streamed or downloaded from a server under a content viewing/listening contract such as a subscription, and locally saved. This can also be said to be contents which the user does not have to pay for separately at the time of starting playing, but rather which the user has the right to play.

For example, the held content list information is compiled as a list of content IDs of relevant primary content files, as shown in (b) in FIG. 36. Note that content IDs are identifiers unique to each content file. The number of content IDs stored in the held content list information corresponds to the number of primary content files which the user holds. Also, the content IDs themselves allow identification of what primary content files the user holds.

The individual content information list is, in this case, a compiled list of a group of individual content information corresponding to individual contents, as shown in (c) in FIG. 36. The individual content information is made up of metadata in the form of predetermined definition for each primary content file (held primary content) indicated by the held content list information. Here, metadata includes content ID, total number of times played, number of times played within time limit, rating, and so forth.

In the individual content information, the content ID stores a value serving as the content ID of the primary content file to which the individual content information corresponds. The content ID within the individual content information, and the held primary content in the hold content list information, correspond on a one-to-one basis.

The total number of times played indicates the number of times played so far under management of the content managing/creating tool 101, for example. The number of times played within time limit indicates the number of times played under management of the content managing/creating tool 101 within a predetermined period from the current point-in-time, for example.

The rating stores a value of a rating which the user has given to the corresponding content (such as an indicator of how favorite, for example). For example, the content managing/creating tool 101 can set a rating according to a predetermined scale for each held primary content file and subsidiary content file, in accordance with user operations.

For example, the content managing/creating tool 101 stores and manages user profile information by the user profile managing processing unit 121, and updates the held content list information in accordance with additions or deletions of held primary contents. Also, the total number of times played, the number of times played within time limit, and the rating, and so forth are updated in accordance with playing of held primary contents, setting of ratings, and so forth.

The content managing/creating tool 101 first uploads user profile information in accordance to step S801 (transmission to the user information server 8) in the event of new registration of user profile information. Also, user profile information is uploaded at a suitable predetermined timing even after new registration is performed. Accordingly, the user profile information stored at the user terminal 4 side and the user profile information stored at the user information server 8 side are synched.

Also, the processing illustrated as step S802 is processing which the subsidiary content server 2 (profile database management unit 26B) performs independently, and continuously updates the content profile information as described below.

The subsidiary content server 2 stores and manages the content profile database 22b in the storage unit 22. The content profile database 22b is a group of content profile information corresponding to each subsidiary content which has been databased. FIG. 37 shows an example of content profile information. The content profile information shown in FIG. 37 is made up of the information items of content ID, total number of downloads, total rating, total number of times played, and date-and-time of upload.

The content ID represents the value of a content ID provided to the subsidiary content corresponding to the present content profile information.

The total number of downloads indicates the number of times that the subsidiary content corresponding to the present content profile information has been downloaded. Alternatively, this may be the number of users who have downloaded the subsidiary content corresponding to the present content profile information.

As described earlier, the user ran set a rating for each subsidiary content file which the user has locally held, by operating the content managing/creating tool 101. The total rating is a value reflecting the rating set for the subsidiary content corresponding to the present content profile information by the user who holds the subsidiary content. For example, one conceivable way to obtain the total rating is to total all of the ratings which the user has set regarding the subsidiary content corresponding to the present content profile information. Alternatively, an average value may be obtained. Another way would be to obtain with a predetermined computation expression, taking into consideration distribution of ratings for each user.

Also, in order to obtain the total rating, the subsidiary content server 2 has to obtain information of the rating which the user has set. To this end, an arrangement can be conceived wherein the content managing/creating tool 101 transmits information to the rating values locally set at a predetermined timing or opportunity to the subsidiary content server 2, in a manner correlated with the subsidiary content (content ID).

Another conceivable technique is for the user terminal device 4 (content managing/creating tool 101) to create the held content list information and individual content list to include not only that corresponding to the primary content files but also corresponding to the subsidiary content files, and manage as a user profile database 52*a* at the user information server 8. With this arrangement, the subsidiary content user 2 transfers rating information of the subsidiary content extracted from the user profile information (information correlating the directly used content ID and rating) at a predetermined timing or opportunity from the user information server 8.

The subsidiary content 2 can stream the subsidiary content file data to the client (user terminal device 4) side to be played, instead of transmitting the subsidiary content by downloading, for example. The total number of times played indicates the number of times that the data of the subsidiary content corresponding to the present content profile information has been streamed so that the contents are played at the client side, for example.

Now, these three, i.e., total number of downloads, total rating, and total number of times played, can be said to be total information relating to usage of subsidiary contents by the user, and accordingly can be collectively referred to as "total usage information".

The date-and-time of upload indicates the date and time (yyyy/mm/dd/hh/mm, for example) that the subsidiary content file corresponding to the present content profile information has been uploaded.

In step S802, each time a directly used content download, streaming transmission, rating information acquisition, etc., is performed, for example, the subsidiary content server 2 updates the predetermined content profile information in the content profile database 22*b* in accordance with the results thereof.

Also, in step S802-1, the subsidiary content server 2 (generation related information management unit 26C) executes processing for updating the generation related information 22*c* stored in the storage unit 22 as appropriate. The updating processing of the generation related information 22*c* in step S802-1 is also independently executed by the subsidiary content server 2 in relation to recommendation of subsidiary contents as with the above-described step S802.

Executing new uploads of subsidiary contents to the subsidiary content database 22 or deleting subsidiary contents therefrom results in changes in the number of direct children and the total number of offspring regarding a certain subsidiary content with generation relations, so the generation related information 22*c* has to be updated to that which agrees with the update of the subsidiary content database 22*a*.

That is to say, step S802-1 is processing wherein evaluation values are re-obtained for relevant subsidiary contents upon execution of new uploading or deletion of subsidiary contents as to the subsidiary content database 22*a*.

The following operations and processing of steps S803 through S811 are for presenting (recommending) recommended contents to the user side at the user terminal device 4. First, to give an overview, with the present embodiment, we will assume the communication serve 3 has prepared a recommended content service side (hereafter referred to as "recommending site") which is a Web site for presenting recommended contents. The communication tool 102 of the content creating/sharing application 100 at the user terminal device 4 obtains information regarding recommended contents by accessing the recommending site, and displays information of recommended contents by a visually-perceivable format to the user, for example.

In step S803, the communication tool 102 of the user terminal device 4 accesses the recommending site of the communication server 3, and makes notification of user ID at the time of this access. Note that hereafter, a user corresponding to the user ID notified in this step S803, i.e., a user which can be viewed as having accessed recommended contents, will be referred to as "recommendation-receiving user".

Upon having received the user ID transmitted form the user terminal device 4 in accordance with step S803, in step S804 the communication server 3 transmits a recommended content list information request to the subsidiary content server 2. At the time of transmission of this recommended content list information request, the user ID received from the user terminal device 4 in step S803 is also notified (transmitted).

In step S805, the subsidiary content server 2 which has received the recommended content list information request notifies the user information server 8 of the user ID notified (transmitted) in step S804, and also transmits a user profile information request. Note that such transmission processing can be viewed as being realized by the control unit 21 controlling the network interface 29, for example.

The user information server 8 which has received the user profile information request, first, in step S806, searches the user profile information corresponding to the user ID notified along with the user profile information request, from the user profile database 22*b*. As shown in FIG. 36, the user profile information includes the user ID in the basic user information, for example. The searched user profile information is then returned to the subsidiary content server 2 as a response as to the recommended content list information request.

The subsidiary content server 2 receives the user profile information transmitted as described above with the network interface 29, and the control unit 21 acquires it, for example. The subsidiary content server 2 which has received and obtained the user profile information then executes processing in step S807 to extract (select) subsidiary contents from the subsidiary contents stored in the subsidiary content database 22*a*, those to serve as recommended contents. Recommended content list information is made up of predetermined information regarding recommended contents is created in accordance with the extraction results. Note that the extraction processing of the recommended contents will be described later.

In step S808, the subsidiary content server 2 which has created the recommended content list information transmits the recommended content list information as a response to the recommended content list request in step S804.

In step S809, the communication server 3 uses the recommended content list information received in step S808 to create a recommended content list page. The contents in the recommended content list page are page contents of the recommending site, and a page design suitable for presenting the user with recommended contents is used. The actual entity of the recommended content list page is a file or data or the like described in a predetermined markup language such as HTML (Hyper Text MarkupLanguage) or XML (extensible Markup Language) or the like.

The communication server 3 then in step S810 transmits the data of the created recommended content list page to the user terminal device 4, as a response to the access in step S803, for example.

The user terminal device 4 (communication tool 102) which has received the data of the recommended content list page in this way performs display of a Web page using the data of the received recommended content list page, as the processing of step S811. That is to say, the recommended content list page is displayed.

Now, the processing for extracting recommended contents in step S807 will be described in detail. First, the basic concept of recommended content extraction according to the present embodiment will be described with reference to FIG. 38.

Looking at the Venn diagram here, the set A is a set which takes as components thereof all subsidiary contents stored in the subsidiary content server 2 as the subsidiary content database 22a. The set B is a set which takes as components thereof, of the subsidiary contents belonging to set A (subsidiary contents stored at the subsidiary content 2), the subsidiary contents of which at least one of the primary contents used as source editing material (used source editing material contents) is a primary content held by the recommendation-receiving user. Further, the set C is a set which takes as components thereof, of the subsidiary contents belonging to set B, the subsidiary contents of which at all of the primary contents used as source editing material are primary contents held by the recommendation-receiving user.

With the present embodiment, an idea implemented is that, of the subsidiary contents stored in subsidiary content server 2, those with as many held primary contents as source editing material as possible have the highest value of recommendation to the user of the held primary contents.

The reason is thus. The held primary contents of a recommendation-receiving user are most likely a collection made in accordance with the preferences and tastes of the user. This means that we can estimate that the more held primary contents a subsidiary content has as the source editing material contents thereof, the more interest the recommendation-receiving user will be likely to have in the subsidiary content, and the subsidiary content will also most likely match the tastes of the recommendation-receiving user.

Also, with the present embodiment, at the time of the user obtaining primary contents by downloading or the like, the user pays for the contents as a rule. Held primary contents are contents which the user has already obtained, so the more held primary contents included in a subsidiary content, the fewer primary contents the user has to purchase, meaning that the cost is lower for the user.

Accordingly, with the present embodiment, we will say that subsidiary contents using one or more held primary contents as the source editing material contents will be extracted (selected) as recommended contents. In correlation with FIG. 38, subsidiary contents belonging to set B (including set C) will be extracted as recommended contents.

On the other hand, we can estimate that as for subsidiary contents of the set A which are a complement to set B, i.e., subsidiary contents which do not use even one held primary content as source editing material content, the recommendation-receiving user will likely have little interest in the subsidiary content, and the subsidiary content will also likely not match the tastes of the recommendation-receiving user. Moreover, such subsidiary contents will cost the user more.

It should be noted that the basis for subsidiary contents to be extracted as recommended contents described above is only an example, and an arrangement may be conceived wherein subsidiary contents of which all source editing material contents are held primary contents, i.e., the subsidiary contents belonging to set C in FIG. 38, are extracted as recommended contents. Further, an arrangement may be conceived wherein subsidiary contents of which two or more source editing material contents are held primary contents are extracted as recommended contents.

Description will be made regarding a procedure example of the recommended content extracting processing which is step S807 in FIG. 35, to be executed by the subsidiary content server 2, with reference to FIGS. 39 and 40. This processing can be viewed as being executed by the recommended content extraction processing unit 25 in correlation with FIG. 7. Also, with the recommended content extracting processing in FIGS. 39 and 40, recommended contents are first extracted following basic selection standards regarding recommended contents described in FIG. 38, as will be understood from the following description. Thereupon, the order of recommendation values (recommendation order) is determined regarding the extracted recommended contents, based on several factors.

Figure 39:
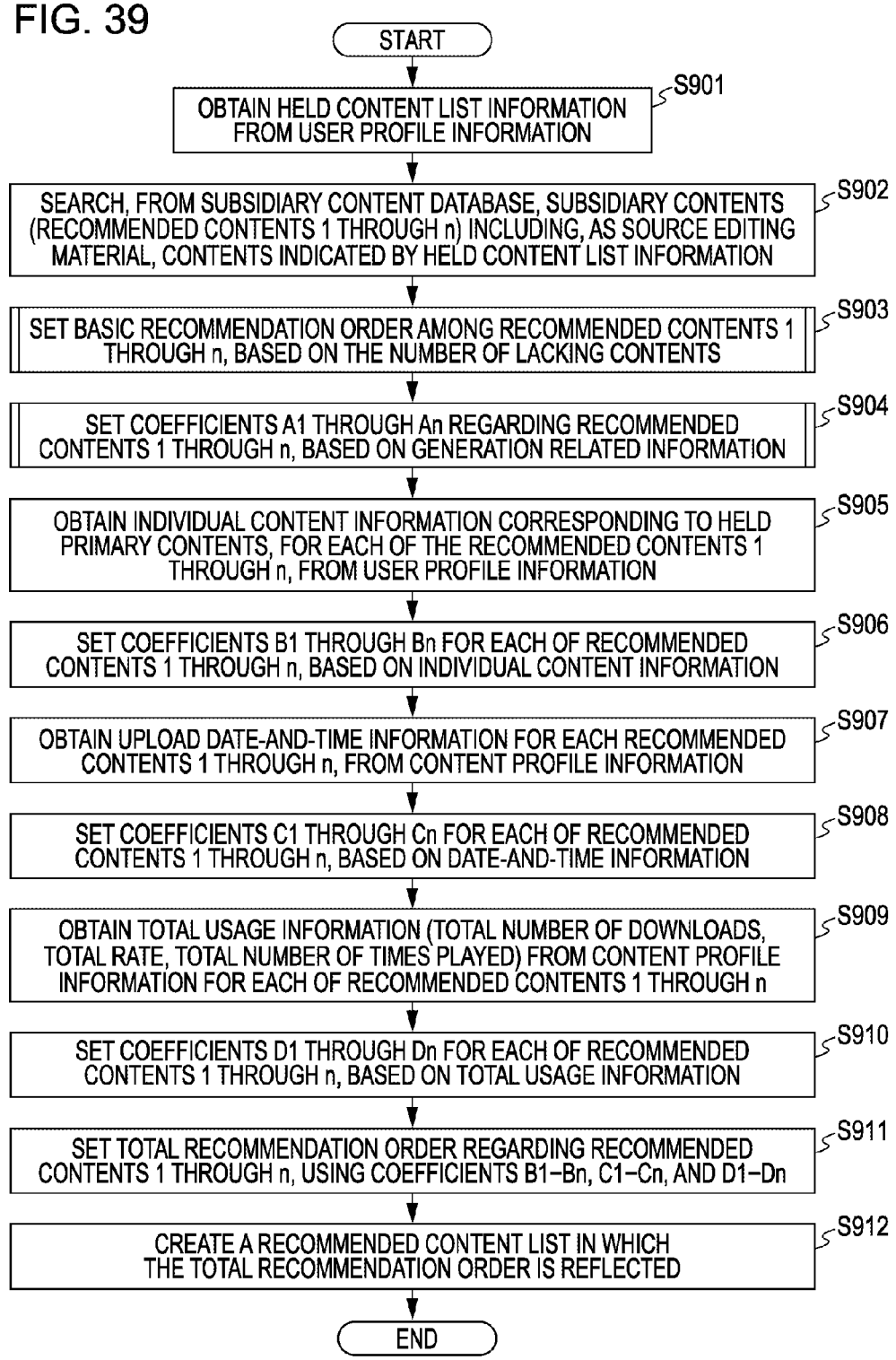
FIG. 39 is a flowchart illustrating an example of processing procedures for extracting recommended contents, executed by the subsidiary content server.

In FIG. 39, first, in step S901, held content list information (hereafter referred to as "held primary content information") is obtained from the user profile information received and obtained in step S806 in FIG. 35 (hereafter referred to as recommendation-receiving user profile information").

Now, it should be noted that the user profile information serving as the source for obtaining the held content list information in step S901 above corresponds to the user of the user terminal device 4 (content creating/sharing application 100) which has accessed the recommendation site of the communication server 3 in step S803 in FIG. 35, i.e., a recommendation-receiving user. Accordingly, the held content list information obtained in step S901 is a list indicating primary content files (held primary content files) which the recommendation-receiving user holds.

In the following step S902, subsidiary contents including the primary contents indicated in the held content list information obtained in step S901 as the source editing material thereof are searched from the subsidiary content database 22a. This search can be made by referencing the used source editing material content information (FIG. 16) for each subsidiary content in the subsidiary content database 22a. A subsidiary content which has one or more primary content (content ID) shown in the used source editing material content information is a matching subsidiary content. The primary contents found matching the search conditions are the recommended contents according to the present embodiment. That is to say, step S902 is processing for extracting recommended contents from all subsidiary contents stored and managed in the subsidiary content server 2. Note that the n recommended contents searched (extracted) here are indicated by numbers 1 through n following a predetermined rule.

In step S903, processing is performed for setting a basic recommendation order based on the number of lacking contents, for each of the recommended contents 1 through n extracted in step S902 above. Note that "lacking contents" refer to primary contents used for playing the subsidiary contents as recommended contents (i.e., source editing material contents) which are not shown in the held content list information obtained in step S901, i.e., primary contents which are not held primary contents of the recommendation-receiving user.

Also, the number of lacking contents can be said to represent how much the held primary contents are used in the primary contents serving as source editing material (used source editing material contents), i.e., the usage state. With the present embodiment, setting of the recommendation order of the recommended contents is performed with the usage state of held primary contents as the source editing material being the most important factor. This is because the usage state of held primary contents are in a close relation with the concept of extracting recommended contents according to the present embodiment, described with reference to FIG. 38. Accordingly, the recommendation order set based on the number of lacking contents is the most important and basic factor, and should be handled as a basic recommendation order.

Figure 40:
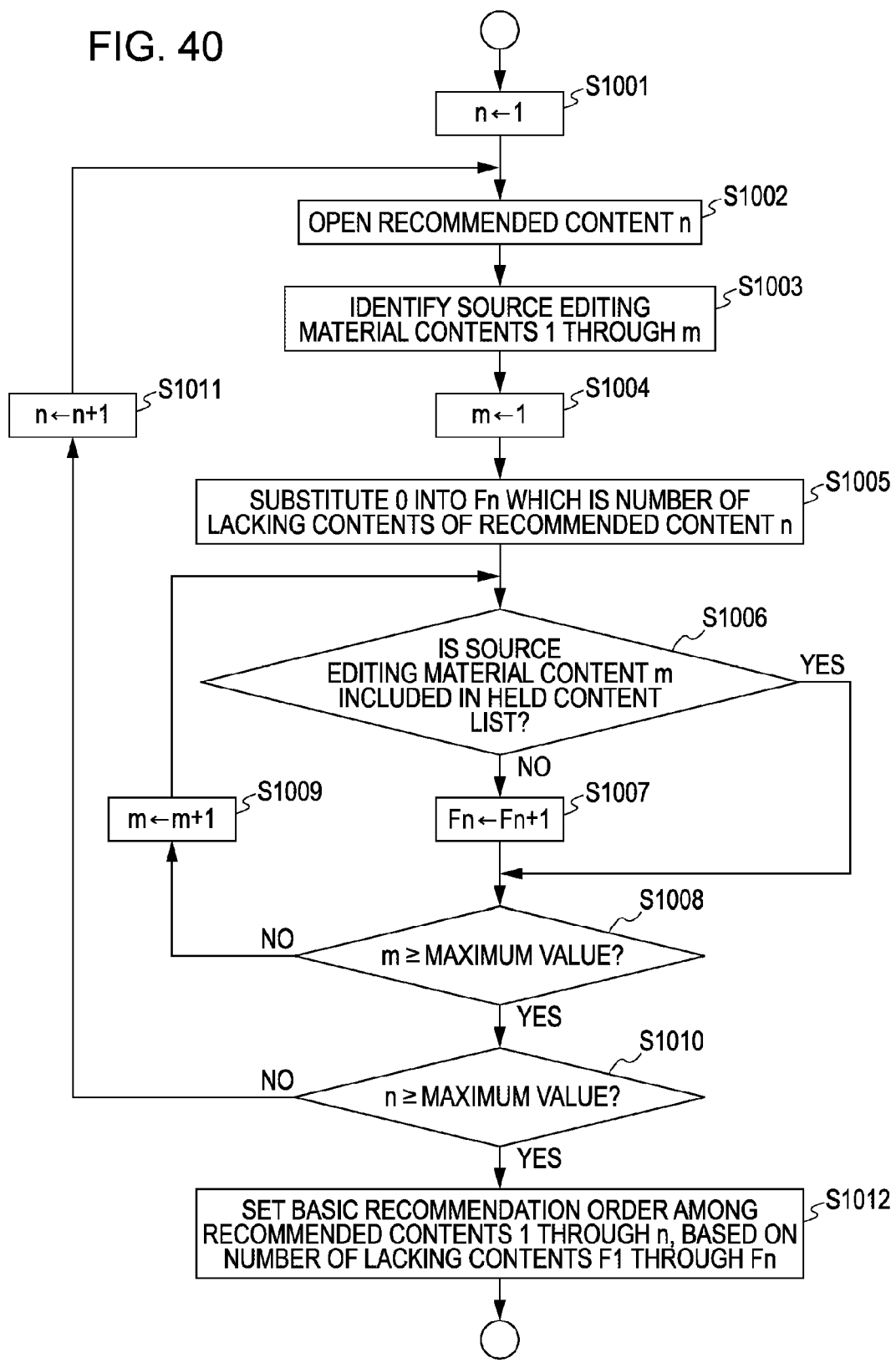
FIG. 40 is a flowchart illustrating an example of processing procedures for setting basic recommendation order in accordance with the number of lacking contents with regard to the extracted recommended contents.

FIG. 40 illustrates an example of procedures regarding setting of basic recommendation order in accordance with the number of lacking of contents, in step S903 above.

First, in FIG. 40, in step S1001 initialization is performed by substituting 1 into the variable n indicating the No. of recommended contents.

In step S1002, the subsidiary content database 22a is accessed, and file operations for opening the subsidiary content file which is the recommended content n is performed. This file opening operation is for reading out the used source editing material content information in the header information. Accordingly, in the event that an arrangement has been made with a subsidiary content database 22a structure wherein the used source editing material content information for each subsidiary content can be referred to even without opening the file, a processing for reading out the used source editing material content information of the subsidiary content which is the recommended content n may be performed instead of this file opening processing.

In step S1003, the source editing material contents which are the primary contents used in the recommended content n are identified by referring the used source editing material content information corresponding to the recommended content n. Note that the m identified source editing material contents are denoted by numerals 1 through m following a predetermined rule.

Steps S1004 and S1005 are initialization processing for steps S1006 through S1009. In step S1004, 1 is substituted into the variable m indicating the No. of identified source editing material contents. In step S1005, 0 is substituted into the variable Fn representing the number of lacking contents for the recommended contents n.

In step S1006, determination is made regarding whether or not the source editing material content m is included in the primary contents indicated by the held content list information obtained in step S901 in FIG. 39. In the event that a positive determination result is obtained here, the step s1007 is skipped and the flow advances to step S1008.

Conversely, in the event that a negative determination result is obtained, the variable Fn is incremented in step S1007 and the flow proceeds to step S1008.

In step S1008, determination is made regarding whether or not the current variable m has reached the maximum value or higher. The maximum value of the variable m is the number of source editing material contents identified in step S1003.

In the event that a negative result is obtained in step S1008, this means that there remain source editing material contents regarding which determination has to be made regarding whether or not included in the held content list information (held primary contents), so the variable m is incremented in step S1009 and the flow returns to step S1006. Accordingly, determination is made in step S1006 regarding the source editing material contents 1 through m, and in the event that a negative editing result is obtained here, the variable Fn is incremented.

As a result of determination being performed in step S1006 regarding all source editing material contents 1 through m, a positive determination result is obtained in step S1008, and the flow proceeds to step S1010. In the event that a positive determination result is obtained in step S1008, this finalizes the number of lacking contents Fn regarding the recommended contents n.

In step S1010, determination is made regarding whether the variable n has reached the maximum value or higher. In the event that a negative determination result is obtained here, this means that there are recommended contents remaining regarding which the number of lacking contents has not yet been obtained. In this case, the variable n is incremented in step S1011 and the flow returns to step S1002. Accordingly, the number of lacking contents is obtained for each of the recommended contents 1 through n. Upon the number of lacking contents having been obtained for all of the recommended contents 1 through n, a positive determination result is obtained in step S1010, and the flow advances to step S1012.

Upon reaching step S1012, the number of lacking contents F1 through Fn for the recommended contents 1 through n have already been obtained. Accordingly, in step S1012, a basic recommendation order is set among the recommended contents 1 through n, based on the number of lacking contents F1. Various ideas can be conceived regarding how to set this basic recommendation order, is description of specific examples will be omitted here. As a basic rule, subsidiary contents with fewer lacking contents are set with a higher recommendation order.

Note that with the processing in step S903, description has been made that the basic recommendation order is to be set based simply on the number of lacking contents, but an arrangement may be conceived wherein the percentage or ratio of lacking contents in the primary contents used as the source editing material in the subsidiary contents is set as the basic recommendation order. That is to say, it is sufficient with the present embodiment that the basic recommendation order be set based on the usage state of the held primary contents as source editing material, and specific algorithms thereof are not restricted to that in FIG. 40.

Returning to FIG. 39, with the present embodiment, the usage state of lacking contents in the source editing material contents should be the most important setting factor regarding setting of the recommendation order with the present embodiment, and the recommendation order set in this way is the basic recommendation order. However, with the present embodiment, an arrangement is made such that after setting the basic recommendation order, in the subsequent step S905 and following steps, coefficients are set based on order setting factors other than the usage state (weighting factors), and these factors are used to obtain a final total recommendation order reflecting the other order setting factors as well.

After performing the processing in FIG. 40 which is step S903, the processing of step S904 in FIG. 39 is performed. Step S904 is processing for obtaining and setting coefficients A1 through An (weighting coefficients) corresponding to each of the recommended contents 1 through n as factors for total recommendation order setting, based on the generation related information 22c stored in the storage unit 22.

Figure 41:
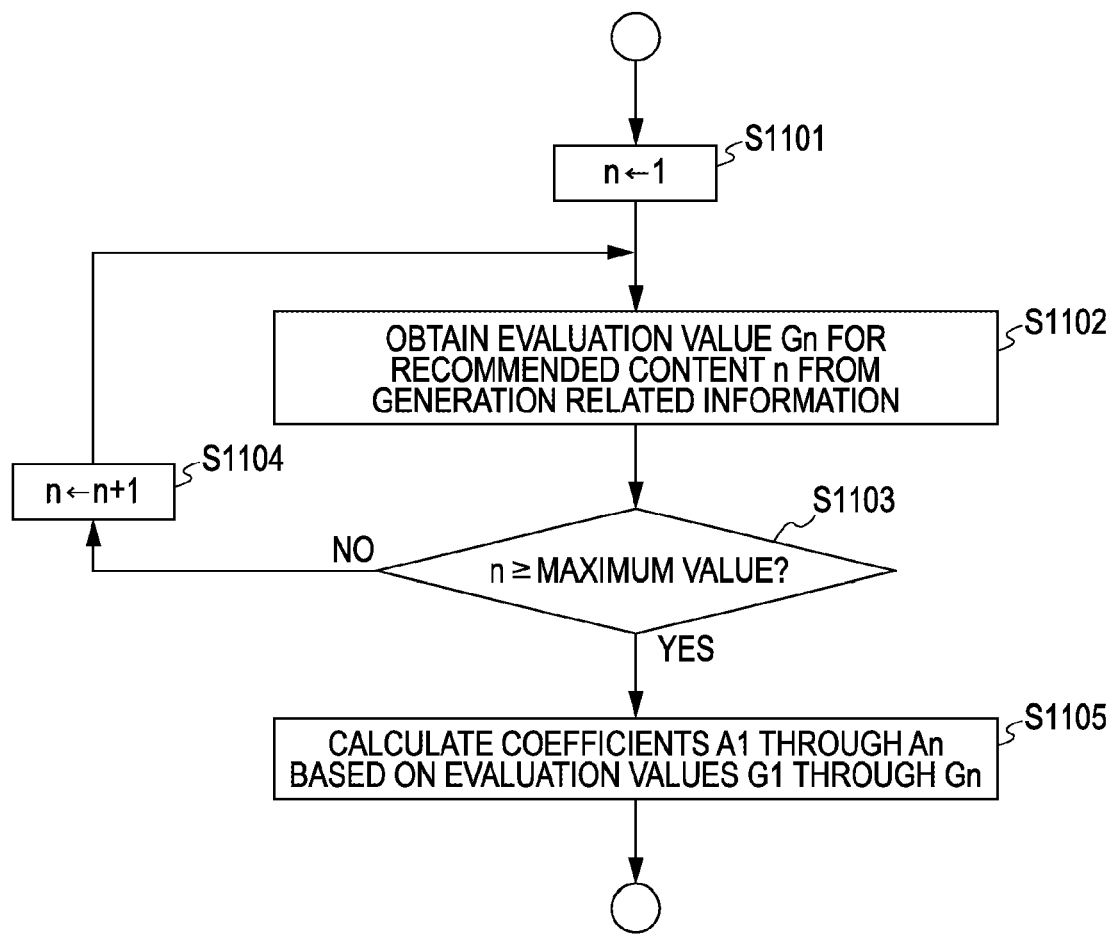
FIG. 41 is a flowchart illustrating an example of processing procedures for setting coefficients for correcting the recommendation order, based on generation related information.

An example of processing procedures as step S904 is shown in FIG. 41. In FIG. 41, first, in step S1101 initialization processing is performed wherein 1 is substituted in to the variable n indicating the No. of the recommended contents.

In step S1102, an evaluation value Gn correlated to the content ID (subsidiary content ID) of the recommended content n is obtained from the generation related information 22c stored in the storage unit 22.

In step S1103, determination is made regarding whether or not the current variable n has reached the maximum value or higher. In the event that a negative determination result is obtained here, this means that there are recommended contents remaining regarding which evaluation values are to be obtained from the generation related information 22c, so the variable n is incremented in step S1104 and the flow returns to step S1102. Step S1102 is repeated until the evaluation values 1 through n corresponding to each of all recommended contents 1 through n are obtained, thereby obtaining a positive determination result in step S1103, and the flow proceeds to step S1105.

In step S1105, coefficients A1 through An corresponding to each of the recommended contents 1 through n are obtained based on the evaluation values G1 through Gn obtained by the processing so far (here, we will say that the evaluation values themselves are generation related importance). Various computation expressions and algorithms can be conceived for obtaining the coefficients A1 through An using the evaluation values G1 through Gn, and these are not restricted in particular. Basically, the higher the evaluation value, i.e., the importance, the value of recommending that subsidiary content is, so the coefficients A1 through An should be obtained based thereupon.

As can be understood from the description in FIGS. 26 through 34 and so forth, described above, the evaluation values, i.e., importance of the subsidiary contents in the generation related information 22c, can be viewed as representing an evaluation regarding contents for subsidiary content creators in general, as users using the content creating/sharing system.

Subsidiary contents are created by users serving as creators by secondary usage of the contents. Accordingly, the generation relation of subsidiary contents, i.e., the secondary usage state of other subsidiary contents, can be said to represent evaluation of subsidiary contents in a case where secondary use is the object. Accordingly, it can be thought to be effective to include evaluations of subsidiary contents from the perspective of creators creating such subsidiary contents, at the time of setting the recommendation order of subsidiary contents as recommended contents. The procedure in step S904 for obtaining the coefficients A1 through An is to reflect the evaluation of users in general which are creators, in the recommendation order of recommended contents.

Returning to step S904, the procedures in steps S905 and S906 are processing for obtaining coefficients B1 through Bn which are factors for setting the recommendation order for each of the recommended contents 1 through n, based on what is in the individual content information.

The recommended contents according to the present embodiment include held primary contents of the recommendation-receiving user as source editing material. Accordingly, in step S905, processing is executed for obtaining individual content information regarding the held primary contents of the recommendation-receiving user to be used as source editing material contents, for each of the recommended contents 1 through n, from the recommendation-receiving user profile information.

In step S906, the coefficients B1 through Bn corresponding to each of the recommended contents 1 through n are obtained and set as factors for total recommendation order setting, based on what is in the individual content information obtained in step S905.

AS shown in (c) in FIG. 36, the individual content information includes the overall number of times played locally, number of times played within time limit, rating, and so forth, which can be viewed as indicating the evaluation of recommendation-receiving users regarding the primary contents.

That is to say, the greater the number of times played overall is, the more the user must like that primary content, and accordingly the higher the evaluation value thereof can be said to be. Also, the higher the number of times played within time limit is, the higher the evaluation of the content can be said to be particularly as of recent. Also, the higher the rating is, the higher the user can be said to be evaluating the primary content. A high user evaluation of a source editing material content in the recommended contents means that the order for recommendation to the user should be high as well.

In step S906, the coefficients B1 through Bn are obtained regarding the recommended contents 1 through n by algorithms or computation or the like, following predetermined rules, based on the above reasoning. The coefficients B1 through Bn set in steps S905 and S906 can be said to be based on content evaluation made by the recommendation-receiving user himself/herself.

The following steps S907 and S908 are processing for obtaining coefficients C1 through Cn which are factors for setting the recommendation order for each of the recommended contents 1 through n in accordance with the newness of the recommended contents. For example, it can be through that the newer the recommended contents are, the higher the value for recommendation to the recommendation-receiving user is, and the steps S907 and S908 follow this idea.

In step S907, the content profile database 22b is accessed, and information of the date-and-time of upload is obtained from the content profile information corresponding to each of the recommended contents 1 through n individually registered. That is to say, the date-and-time of upload is recognized for each subsidiary content serving as the recommended contents 1 through n.

In step S908, coefficients C1 through Cn are set for each of the recommended contents 1 through n, based on the information of the date-and-time of upload. The closer the date-and-time of upload is to the current date-and-time, the newer the subsidiary content is, so basically, the coefficients C1 through Cn are set such that the later the date-and-time of upload is, the higher the value is.

For example, setting of the coefficients A1 through An according to generation related information 22c in step S904 described earlier can be said to be representing the evaluation of subsidiary contents by "users in general who are creators". Conversely, steps S909 and S910 are processing for setting coefficients D1 through Dn as recommendation order setting factors, in accordance with the overall evaluation of subsidiary contents by "users in general as audience" in the content creating/sharing system according to the present embodiment.

In step S909, the content profile database 22b is accessed, and total usage information is obtained from the content profile information corresponding to each of the recommended contents 1 through n individually registered. Total usage information is information of the total number of downloads, total rating, and total number of times played, in the content profile information, as described earlier with reference to FIG. 37. Each of these can be viewed as being results of information representing overall evaluation made by users in general regarding the corresponding subsidiary contents.

Accordingly, in step s910, the coefficients D1 through Dn are obtained based on total usage information regarding the recommended contents 1 through n obtained in step S909 by algorithms or computation or the like, following predetermined rules. In this case as well, we can say that the greater the total number of downloads, total rating, and total number of times played, the higher the subsidiary content is evaluated among the users, so basically, the higher the total number of downloads, total rating, and total number of times played are, the higher a coefficient value is set. Also, in this case, the three of the total number of downloads, total rating, and total number of times played, are used as total usage information, and an arrangement can be conceived wherein the coefficients D1 through Dn are set by weighting the three information items according to the importance and so forth thereof. Alternatively, independent coefficients may be set for each of the total number of downloads, total rating, and total number of times played.

In step S911, with the basic recommendation order set in step S903 above as a starting point, the total recommendation order of the recommended contents 1 through n is set based on the coefficients B1 through Bn, C1 through Cn, and D1 through Dn, set in the procedures of steps S905 through S910.

That is to say, points for example, are set for each basic recommendation order set in step S902 earlier, so as to be in descending order, with the points decreasing following a predetermined rule. For example, with regard to a recommended content 1 for example, the points provided to the recommended content 1 in accordance with the above basic recommendation order and the coefficients B1, C, and D1 are computed, and a recommendation evaluation value V1 is obtained. The same is performed for the other recommended contents 2 through n, using the points provided to the respective recommended contents 2 through n, and the coefficients B2 through Bn, C2 through Cn, and D2 through Dn, so as to obtain recommendation evaluation values V2 through Vn. The total recommendation order is then set among the recommended contents 1 through n, based on the score of the recommendation evaluation values V1 through Vn.

At this time, for example, points to serve as a starting point for basic recommendation order are weighted heavier than the values of the coefficients. The coefficients then are used for weighting in accordance with importance and the like for each of the order setting factors (evaluation of recommendation-receiving users of the primary content which is a source editing material, the newness of the subsidiary content file, the evaluation of the subsidiary content file by users in general) serving as a basis for setting the coefficients, for example. Obtaining evaluation values using these points and coefficients enables a total recommendation order to be set by giving a basic recommendation order the greatest weight, but correcting the recommendation order taking into consideration other order setting factors.

Note that instead of setting the basic recommendation order in step s903, and arrangement may be made wherein points or coefficients are obtained which are equivalent to the basic recommendation order. Thereupon, the total recommendation order is finally set taking into consideration the coefficients B1 through Bn, C1 through Cn, and D1 through Dn, as well.

In step S912, recommended content list information showing the recommended contents 1 through n is created so as to reflect the total recommendation order set in step S911.

Now, as for the structure of the recommended content list information, an arrangement can be conceived wherein predetermined additional metadata for each recommended content is stored, for example. The metadata can be obtained by the header information of subsidiary content files which are recommended contents. Also, metadata which the content creating/sharing application 100 itself adds to the subsidiary contents and manages may also be used.

The recommended content list information created in such a way is transmitted from the subsidiary content server 2 to the communication server 3 in step S808 in FIG. 35. The recommended content list information ultimately is displayed on the user terminal device 4 of the recommendation-receiving user in step S811 in FIG. 35. That is to say, the recommendation-receiving user can visually confirm and comprehend the recommendation order of the recommended contents selected as suitable for himself/herself.

According to FIGS. 39 and 40, extraction processing of the recommended contents according to the present embodiment first involves selection of subsidiary content including held primary contents of the recommendation-receiving user as source editing material, as a prerequisite. Techniques for recommending contents include, for example, a widely-used one based on content evaluation by users in general (e.g., a hit chart or the like). Also, Japanese Unexamined Patent Application Publication 2004-72502 discloses a technique by which contents can be recommended based on title, keyword, genre, and so forth.

However, with such techniques according to the related art, accurately extracting contents matching the user for recommendation of recommended contents to the user may be difficult. For example, even if we set the evaluation of users in general, such as with a hit chart, as the extraction conditions, this does not mean that there will be primary contents included therein that the recommendation-receiving user holds. In considering the relation between subsidiary contents and primary contents, if a primary content which the recommendation-receiving user holds is not used as the source editing material, there is a high likelihood that the recommendation-receiving user will not be interested in that subsidiary content at all. In the same way, due to the nature of subsidiary contents being secondary creations using the primary contents as the source editing material, even if title, keyword, genre, and the like are set as extraction conditions, we still have the possibility that no primary contents which the recommendation-receiving user has are included in the extracted subsidiary contents.

Conversely, with an arrangement such as with the present embodiment, where subsidiary contents including primary contents held by the recommendation-receiving user are first selected as recommended contents, extraction and selection of contents suitable for recommendation can be performed in light of the nature of subsidiary contents being secondary creations using the primary contents as the source editing material. Also, the subsidiary contents selected as recommended contents are based on primary contents which the user holds, and accordingly will match the tastes of the individual user.

With this understanding, the basic recommendation order is first set according to the number of lacking contents (S902, S903) with the present embodiment. This allows the user to efficiently narrow down the presented recommended contents are compared with a case wherein recommended contents are simply presented without any recommendation order set.

Also, with the present embodiment, the basic recommendation order is corrected and the total recommendation order is obtained at the end. Accordingly, the ultimately obtained recommendation order (total recommendation order) is higher in reliability, and allows the recommended contents to be narrowed down even more efficiently.

Also, at the time of correcting the basic recommendation order, evaluation of subsidiary contents by users in general who are creators (S904), evaluation by the recommendation-receiving user regarding the held primary contents used as source editing material (S905, S906), newness of recommended contents (S907, S908), and evaluation of subsidiary contents by users in general as an audience (S909, S910), are used. Accordingly, a more accurate estimation order can be obtained as compared to a case of correcting the recommendation order with too much weight on a certain factor, for example.

However, correcting the basic recommendation order is not indispensable with the present embodiment. That is to say, the basic recommendation order set in step S903 may be used as the total recommendation order as it is, without correction. In this case, the procedures of steps S904 through S911 are omitted.

Also, even in cases of correcting the basic recommendation order to obtain a total recommendation order, the coefficients A1 through An, coefficients B1 through Bn, coefficients C1 through Cn, and coefficients D1 through Dn do not all have to be used. With the present embodiment, using at least one type, such as the coefficients A1 through An in accordance of evaluation of subsidiary contents from the perspective of a creator, is sufficient. Also, other coefficients obtained using conditions which can be used to correct the recommendation order may be applied besides the coefficients A1 through An, coefficients B1 through Bn, coefficients C1 through Cn, and coefficients D1 through Dn.

For example, a configuration may be made wherein, at the time of obtaining the coefficients A1 through An based on the generation related information, in step S904 in FIG. 39, generation related information for each of the recommended contents 1 through n, i.e., evaluation values based on the above-described first and/or second importance setting concepts, are obtained.

However, in actual practice, the subsidiary contents registered in the subsidiary content database 22a have to be searched over a wide range to obtain evaluation values for each subsidiary content, so the processing will be slow. Accordingly, obtaining the evaluation value for each step S904 will result in the operations being slow, and a recommended content list may not be speedily displayed.

Accordingly, with the present embodiment, the generation related information 22c is stored in the storage unit 22 as described above, and is updated each time the subsidiary content database 22a is updated in step S802-1 in FIG. 35, for example. With this arrangement, all that has to be done in step S904 is to read out the evaluation value corresponding to each recommended content 1 through n in the generation related information 22c, so the processing is very quick, and a recommended content list can also be displayed very fast.

Now, according to the example described above with reference to FIGS. 35 through 40, the user profile information of the recommendation-receiving user is used to extract a recommended content list and create recommended content list information at the subsidiary content server 2. Thereupon, the subsidiary content server 2 obtains user profile information from the user information server 8.

However, a system operation may be realized wherein the content creating/sharing application 100 transmits user profile information of the corresponding user and also requests recommended content information. In the case of such a configuration, an arrangement may be made wherein, in the same way as the example described above, the content creating/sharing application 100 of the user terminal device 4 accesses the recommending site of the communication server 3, and transmits user profile information instead of user ID at this time. In this case, the subsidiary content server 2 just has to extract the recommended contents using the user profile information transferred from the communication server 3, and create the recommended content list information.

Alternatively, an arrangement may be made wherein the content creating/sharing application 100 of the user terminal device 4 makes a request to the subsidiary content server 2 for the recommended content list information by directly transmitting user profile information thereto. In any case, if user profile information is to be transmitted from the user terminal device 4 for obtaining recommended content list information, user profile information does not have to be sent from the user information server 8. However, in actual practice, the user information server 8 is provided to centrally manage user profile information of all users, enabling various services which are valuable to user to be provided besides recommendation of contents for example, and user management at the system operating side, so the usefulness thereof is not lost.

Also, with the processing for recommending subsidiary contents described so far, extraction of recommended contents and setting of recommendation order are performed based on the user profile information of the recommendation-receiving user, thereby creating the recommended content list. The user profile information can be viewed as metadata regarding each held primary content, for example. Also, the recommended content list is made up of metadata of recommended contents, as described earlier. That is to say, we can say that processing for recommending subsidiary contents according to the present embodiment uses metadata as a key for extracting recommended contents, and also returns the extraction results in metadata relating to recommended contents.

Also, the subsidiary contents according to the present embodiment have been created by secondary usage of editing material contents. It should be noted that such subsidiary contents may include content of contents where multiple actual content data of source editing material data simultaneously, multiplexed, or superimposed, exist on a playing time axis. Also, the playing order of multiple source editing material contents (or even playing sections of actual content data of each source editing material content) such as with a so-called playlist, may be referred to as a single content. Such playlists may be provided with content of contents as with a case of a so-called compilation album.

Also, the configuration of the primary content server 1, subsidiary content server 2, communication server 3, user information server 8, and user terminal device 4 are but one example, and may actually be changed as appropriate. Also, a configuration may be made wherein at least one of the above servers is dispersed among multiple server, or conversely, where at least two or more of these servers are integrated.

The elements of the invention according to the embodiment of the present invention may be included in the subsidiary content server 2 in correspondence with the present embodiment, but other arrangements may be made wherein components corresponding to the elements of the invention are dispersed in other servers as appropriate, and the configuration of an information processing device according to the present invention is realized by cooperation with these servers.

Also, while no specific example of a GUI screen or the like has been shown for the content creating/sharing application 100 has been described so forth, various GUI configurations can be conceived for the content creating/sharing application 100.

Also, the functional configuration of the content creating/sharing application 100 also is not restricted to that described with reference to FIGS. 11 and 12, and so forth, and various configurations can be conceived.

Also, the structure of the subsidiary content files shown in FIGS. 13A through 17 is only an example, and a conceptual one at that, so various modifications and developments therefrom may be made based thereupon.

Also, the processing procedures shown in the flowcharts, i.e., program configurations, are only examples, and may be changed as appropriate in actual practice.

Also, the programs executed by the primary content server 1, subsidiary content server 2, communication server 3, user information server 8, and user terminal device 4, may be written to and stored in a storage region such as an internal HDD, storage unit, or the like, as described above, or may be stored in a removable storage medium and installed (including updates) from the storage medium to the storage region. Also, an arrangement may be conceived wherein programs can be installed under the control of other host devices via a predetermined data interface. Further, an arrangement may be conceived wherein programs are stored on a storage device on the network, and can be downloaded and obtained from the storage device by the networking functions of the primary content server 1, subsidiary content server 2, communication server 3, user information server 8, and user terminal device 4.

The present application contains subject matter related to that disclosed in Japanese Priority Patent Application JP 2008-146008 filed in the Japan Patent Office on Jun. 3, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
at least one processor executing stored program instructions;
derivative content storage means configured to store and manage derivative content which is created by secondary editing using at least one content object as editing material, said derivative content including:
a main unit portion comprising data for reproducing primary content that is referenced by the derivative content, wherein the primary content comprises audio and/or video, and
directly referenced content information indicating directly referenced content, which comprises content directly referenced at a time of creating the derivative content; and
importance setting means configured to set an indication of importance relating to the derivative content, based on a secondary usage state of the derivative content, the secondary usage state reflecting use of the directly referenced content by the derivative content and by at least one other derivative content different than the derivative content,
the secondary usage state indicating that the at least one other derivative content is also dependent on the directly referenced content for playing back audio and/or video, and
the secondary usage state determined based on said directly referenced content information, and
based on a held content list reflecting a list of directly referenced content objects held locally by a user.

2. The information processing device according to claim 1, wherein said importance setting means sets the indication of importance relating to the derivative content based on a number of the at least one other derivative content which are direct children of the derivative content regarding which said indication of importance is to be set, said number having been obtained using at least said directly referenced content information.

3. The information processing device according to claim 2, wherein the importance setting means obtains the number of the at least one other derivative content which are direct children of the derivative content by counting a plurality of derivative contents, which are direct children of the derivative content and which have a same creator, as being a single derivative content.

4. The information processing device according to claim 1, wherein said importance setting means sets the indication of importance for the derivative content based on a number of the at least one other derivative contents which are offspring of the derivative content regarding which said indication of importance is to be set, said number having been obtained using at least said directly used content information.

5. The information processing device according to claim 4, wherein the importance setting means obtains the number of the at least one other derivative content which are offspring of the derivative content by counting a plurality of derivative contents, which are direct children of the derivative content and which have a same creator, as being a single derivative content.

6. The information processing device according to claim 2, wherein the importance setting means obtains the number of the at least one other derivative content which are direct children of the derivative content by counting a plurality of derivative contents, which are direct children of the derivative content and which have a same creator as the derivative content, as not being part of the counted number.

7. The information processing device according to claim 4, wherein the importance setting means obtains the number of the at least one other derivative content which are offspring of the derivative content by counting a plurality of derivative contents, which are offspring of the derivative content and which have a same creator as the derivative content, as not being part of the counted number.

8. The information processing device of claim 1, wherein the importance setting means further sets the indication of importance based on a number of directly referenced content objects required to play back the derivative content and not present on the list of directly referenced content objects held locally by the user.

9. The information processing device of claim 1, wherein the importance setting means further sets the indication of importance based on rights to play back the directly referenced content objects.

10. An information processing method comprising:
- setting an indication of importance for at least a derivative content which is created by secondary editing using at least one content object as editing material, said derivative content including:
- a main unit portion comprising data for reproducing primary content that is referenced by the derivative content, wherein the primary content comprises audio and/or video, and
- directly referenced content information indicating directly referenced content, which comprises content directly referenced at a time of creating the derivative content, which is stored in a storage unit;
- wherein setting said indication of importance comprises setting the indication based on a secondary usage state of the derivative content, the secondary usage state reflecting use of the directly referenced content by at least one other derivative content different than the derivative content, the secondary usage state indicating that the at least one other derivative content is also dependent on the directly referenced content for playing back audio and/or video, the secondary usage state determined based on said directly used content information, and wherein setting the indication of importance further comprises setting the indication based on a held content list reflecting a list of directly referenced content objects held locally by a user.

11. The information processing method according to claim 10, wherein:
- setting said indication of importance further comprises setting the indication based, at least in part, on setting the indication of importance to be higher when the derivative content has a larger number of direct child derivative contents.

12. The information processing method according to claim 10, wherein:
- setting said indication of importance further comprises setting the indication based, at least in part, on setting the indication of importance to be higher when the derivative content is a parent of a child derivative content that has a larger number of direct child derivative contents.

13. The information processing method of claim 10, wherein: setting an indication of importance for the derivative content further comprises setting the indication based on a number of the at least one other derivative content which are direct children of the derivative content regarding which said indication of importance is to be set, and the method further comprises obtaining said number using at least said directly referenced content information,
- wherein obtaining the number of the at least one other derivative content which are direct children of the derivative content comprises counting a plurality of derivative contents, which are direct children of the derivative content and which have a same creator, as being a single derivative content.

14. The information processing method of claim 10, wherein: setting an indication of importance for the derivative content further comprises setting the indication based on a number of the at least one other derivative contents which are offspring of the derivative content regarding which said indication of importance is to be set, and the method further comprises obtaining said number using at least said directly referenced content information,
- wherein obtaining the number of the at least one other derivative content which are offspring of the derivative content comprises counting a plurality of derivative contents, which are offspring of the derivative content and which have a same creator, as being a single derivative content.

15. The information processing method of claim 10, wherein: setting an indication of importance for the derivative content further comprises setting the indication based on a number of the at least one other derivative content which are direct children of the derivative content regarding which said indication of importance is to be set, and the method further comprises obtaining said number using at least said directly used content information,
- wherein obtaining the number of the at least one other derivative content which are direct children of the derivative content comprises counting a plurality of derivative contents, which are direct children of the derivative content and which have a same creator as the derivative content, as not being part of the counted number.

16. The information processing method of claim 10, wherein: setting an indication of importance for the derivative content further comprises setting the indication based on a number of the at least one other derivative contents which are offspring of the derivative content regarding which said indication of importance is to be set, and the method further comprises obtaining said number using at least said directly referenced content information,
- wherein obtaining the number of the at least one other derivative content which are offspring of the derivative content comprises counting a plurality of derivative contents, which are offspring of the derivative content and which have a same creator as the derivative content, as not being part of the counted number.

17. At least one computer-readable non-transitory storage device storing computer-executable instructions that, when executed by at least one processor, cause an information processing device to execute:
- setting an indication of importance for at least a derivative content which is created by a secondary editing processing using at least one content as editing material, said derivative content including:
- a main unit portion which is data for reproducing an actual content of the derivative content, and
- directly used content information indicating a directly used content, which is a content directly used at a time of creating the derivative content, which is stored in a storage unit;
  - wherein setting said indication of importance comprises setting the indication based on a secondary usage state of the derivative content, the secondary usage state reflecting use of the directly used content by at least one derivative content different than the derivative content, the secondary usage state indicating that the at least one other derivative content is also dependent on the directly referenced content for playing back audio and/or video, the secondary usage state determined based on said directly referenced content information, and wherein setting the indication of importance further comprises setting the indication based also on a held content list reflecting a list of directly referenced content objects held locally by a user.

18. The at least one computer-readable non-transitory storage device storing computer-executable instructions according to claim 17, wherein:
- setting said indication of importance further comprises setting the indication based, at least in part, on setting the indication of importance to be higher when the derivative content has a larger number of direct child derivative contents.

19. The at least one computer-readable non-transitory storage device storing computer-executable instructions according to claim 17, wherein:
setting said indication of importance further comprises setting the indication based, at least in part, on setting the indication of importance to be higher when the derivative content is a parent of a child derivative content that has a larger number of direct child derivative contents.

20. The at least one computer-readable non-transitory storage device of claim 17, wherein: setting an indication of importance for the derivative content further comprises setting the indication based on a number of the at least one other derivative content which are direct children of the derivative content regarding which said indication of importance is to be set, and the method further comprises obtaining said number using at least said directly referenced content information,
wherein obtaining the number of the at least one other derivative content which are direct children of the derivative content comprises counting a plurality of derivative contents, which are direct children of the derivative content and which have a same creator, as being a single derivative content.

21. The at least one computer-readable non-transitory storage device of claim 17, wherein: setting an indication of importance for the derivative content further comprises setting the indication based on a number of the at least one other derivative contents which are offspring of the derivative content regarding which said indication of importance is to be set, and the method further comprises obtaining said number using at least said directly referenced content information,
wherein obtaining the number of the at least one other derivative content which are offspring of the derivative content comprises counting a plurality of derivative contents, which are offspring of the derivative content and which have a same creator, as being a single derivative content.

22. The at least one computer-readable non-transitory storage device of claim 17, wherein: setting an indication of importance for the derivative content further comprises setting the indication based on a number of the at least one other derivative content which are direct children of the derivative content regarding which said indication of importance is to be set, and the method further comprises obtaining said number using at least said directly referenced content information,
wherein obtaining the number of the at least one other derivative content which are direct children of the derivative content comprises counting a plurality of derivative contents, which are direct children of the derivative content and which have a same creator as the derivative content, as not being part of the counted number.

23. The at least one computer-readable non-transitory storage device of claim 17, wherein: setting an indication of importance for the derivative content further comprises setting the indication based on a number of the at least one other derivative contents which are offspring of the derivative content regarding which said indication of importance is to be set, and the method further comprises obtaining said number using at least said directly referenced content information,
wherein obtaining the number of the at least one other derivative content which are offspring of the derivative content comprises counting a plurality of derivative contents, which are offspring of the derivative content and which have a same creator as the derivative content, as not being part of the counted number.

24. An information processing device comprising:
at least one processor executing stored program instructions;
a derivative content storage unit configured to store and manage derivative content, said derivative content including
a main unit portion comprising data for reproducing primary content that is referenced by the derivative content, wherein the primary content comprises audio and/or video, and directly referenced content information indicating directly referenced content, which comprises content directly referenced at a time of creating the derivative content; and
an importance setting unit configured to set an indication of importance regarding the derivative content based on a secondary usage state of the derivative content and on a held content list reflecting a list of directly referenced content objects held locally by a user, the secondary usage state reflecting use of the directly referenced content by at least one other derivative content different than the derivative content, the secondary usage state determined based on said directly referenced content information.

* * * * *